United States Patent
Jhang et al.

(10) Patent No.: US 11,747,593 B2
(45) Date of Patent: Sep. 5, 2023

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Taichung (TW); Maozong Lin, Fujian (CN); JianPeng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 448 days.

(21) Appl. No.: 16/931,453

(22) Filed: Jul. 17, 2020

(65) Prior Publication Data

US 2021/0302694 A1 Sep. 30, 2021

(30) Foreign Application Priority Data

Mar. 31, 2020 (CN) .......................... 202010246138.5

(51) Int. Cl.
| | |
|---|---|
| *G02B 9/62* | (2006.01) |
| *G02B 13/18* | (2006.01) |
| *G02B 27/00* | (2006.01) |

(52) U.S. Cl.
CPC ............... *G02B 9/62* (2013.01); *G02B 13/18* (2013.01); *G02B 27/0081* (2013.01)

(58) Field of Classification Search
CPC ...... G02B 9/62; G02B 13/18; G02B 27/0081; G02B 13/0045; G02B 13/002; G02B 27/0025; G02B 13/04
USPC .......................... 359/713, 740, 752, 756, 761
See application file for complete search history.

(56) References Cited

U.S. PATENT DOCUMENTS

| | | | | |
|---|---|---|---|---|
| 8,687,292 B2* | 4/2014 | Tsai | ............... | G02B 13/0045 |
| | | | | 359/713 |
| 8,743,483 B2* | 6/2014 | Hsu | .................... | G02B 9/62 |
| | | | | 359/756 |
| 10,539,761 B2* | 1/2020 | Sato | .................... | G02B 1/041 |
| 10,564,394 B2* | 2/2020 | Sekine | ............ | G02B 13/0045 |
| 10,598,896 B2* | 3/2020 | Oinuma | .............. | G02B 9/62 |
| 10,641,990 B2* | 5/2020 | Oinuma | ............ | G02B 27/0025 |
| 10,712,538 B2* | 7/2020 | Zhang | .............. | G02B 13/0045 |
| 10,732,387 B2* | 8/2020 | Chen | .................... | G02B 9/62 |
| 10,816,768 B2* | 10/2020 | Kenji | ................... | G02B 9/62 |
| 10,816,773 B2* | 10/2020 | Oinuma | ............. | G02B 7/102 |
| 11,175,481 B2* | 11/2021 | Teranishi | ............ | G02B 9/62 |
| 11,194,127 B2* | 12/2021 | Chen | .................... | G02B 9/62 |
| 11,209,613 B2* | 12/2021 | Teranishi | ............ | G02B 9/62 |
| 11,209,620 B2* | 12/2021 | Kenji | ............. | G02B 13/0045 |

(Continued)

FOREIGN PATENT DOCUMENTS

| | | |
|---|---|---|
| CN | 110579863 | 12/2019 |
| CN | 110596864 | 12/2019 |

(Continued)

*Primary Examiner* — Mustak Choudhury
(74) *Attorney, Agent, or Firm* — JCIPRNET

(57) ABSTRACT

An optical imaging lens including a first lens element, an aperture stop, a second lens element, a third lens element, a fourth lens element, a fifth lens element, and a sixth lens element sequentially along an optical axis from an object-side to an image-side is provided. At least one of the object side surfaces and the image side surfaces of the first lens element to the sixth lens element is free form surface. The optical imaging lens satisfies the conditions of ImgH/(T1+G12+T2)≥4.200. Furthermore, other optical imaging lenses are also provided.

19 Claims, 83 Drawing Sheets

(56) References Cited

U.S. PATENT DOCUMENTS

| | | | | |
|---|---|---|---|---|
| 11,215,792 | B2* | 1/2022 | Chen | G02B 9/62 |
| 11,237,366 | B2* | 2/2022 | Dai | G02B 13/0045 |
| 11,249,283 | B2* | 2/2022 | Huang | G02B 13/005 |
| 11,262,534 | B2* | 3/2022 | Yamazaki | G02B 27/0012 |
| 11,353,687 | B2* | 6/2022 | Chen | G02B 13/006 |
| 11,378,782 | B2* | 7/2022 | Liao | G02B 9/62 |
| 11,391,914 | B2* | 7/2022 | Sekine | G02B 13/06 |
| 11,422,337 | B2* | 8/2022 | Sekine | G02B 13/0045 |
| 11,422,338 | B2* | 8/2022 | Sekine | G02B 9/62 |
| 11,422,341 | B2* | 8/2022 | Jia | G02B 9/62 |
| 11,442,247 | B2* | 9/2022 | Kubota | G02B 9/62 |
| 11,442,248 | B2* | 9/2022 | Kubota | G02B 13/0045 |
| 11,442,249 | B2* | 9/2022 | Kubota | G02B 9/62 |
| 11,460,678 | B2* | 10/2022 | Wang | G02B 13/0045 |
| 11,467,374 | B2* | 10/2022 | Ikeo | G02B 13/04 |
| 2014/0009844 | A1* | 1/2014 | Tsai | G02B 9/62 359/713 |
| 2014/0092491 | A1* | 4/2014 | Hsu | G02B 13/0045 359/761 |
| 2014/0368931 | A1* | 12/2014 | Noda | G02B 9/62 359/740 |
| 2015/0098135 | A1* | 4/2015 | Chung | G02B 13/18 359/713 |
| 2015/0177484 | A1* | 6/2015 | Hsu | G02B 9/62 359/740 |
| 2015/0212296 | A1* | 7/2015 | Huang | G02B 3/04 359/713 |
| 2015/0241659 | A1* | 8/2015 | Huang | G02B 13/0045 359/713 |
| 2016/0004042 | A1* | 1/2016 | Kubota | G02B 9/62 359/713 |
| 2016/0011403 | A1* | 1/2016 | Asami | G02B 9/62 359/740 |
| 2016/0033746 | A1* | 2/2016 | Chen | G02B 9/62 359/713 |
| 2016/0124187 | A1* | 5/2016 | Chen | G02B 13/0045 359/713 |
| 2019/0302415 | A1* | 10/2019 | Liao | G02B 9/62 |
| 2019/0302416 | A1* | 10/2019 | Chen | G02B 9/62 |
| 2019/0302418 | A1* | 10/2019 | Liao | G02B 13/0045 |
| 2019/0339494 | A1* | 11/2019 | Tsai | G02B 13/0045 |
| 2020/0018927 | A1* | 1/2020 | Chen | G02B 27/0025 |
| 2020/0018928 | A1* | 1/2020 | Chen | G02B 9/62 |
| 2020/0057253 | A1* | 2/2020 | Kenji | G02B 13/0045 |
| 2020/0057261 | A1* | 2/2020 | Takaaki | G02B 1/041 |
| 2020/0057262 | A1* | 2/2020 | Takaaki | G02B 1/041 |
| 2020/0057273 | A1* | 2/2020 | Teranishi | G02B 9/62 |
| 2020/0057275 | A1* | 2/2020 | Teranishi | G02B 7/102 |
| 2021/0364761 | A1* | 11/2021 | Nitta | G02B 13/04 |
| 2022/0082792 | A1* | 3/2022 | Chen | G02B 9/62 |
| 2022/0308315 | A1* | 9/2022 | Jhang | G02B 9/64 |

FOREIGN PATENT DOCUMENTS

| | | |
|---|---|---|
| CN | 110673305 | 1/2020 |
| TW | 201602630 | 1/2016 |
| TW | 201636672 | 10/2016 |
| TW | 202008024 | 2/2020 |
| TW | 202011073 | 3/2020 |
| WO | 2020048157 | 3/2020 |

* cited by examiner

| First embodiment |||||||
|---|---|---|---|---|---|---|
| Effective focal length (EFL)= 3.405 mm, half field of view (HFOV)= 55.635°, system length (TTL)= 7.176 mm, F-number (Fno)= 2.238 , image height (ImgH)= 5.233 mm. |||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -11.589 | 0.515 | 1.661 | 20.373 | -5.802 |
| | Image-side surface 16 | 5.915 | 0.050 | | | |
| Second lens element 2 | Object-side surface 25 | 2.088 | 0.419 | 1.661 | 20.373 | 6.149 |
| | Image-side surface 26 | 3.913 | 0.308 | | | |
| Aperture 0 | | Infinity | 0.046 | | | |
| Third lens element 3 | Object-side surface 35 | -63.902 | 0.949 | 1.535 | 55.690 | 3.890 |
| | Image-side surface 36 | -2.032 | 0.157 | | | |
| Fourth lens element 4 | Object-side surface 45 | 6.283 | 0.380 | 1.671 | 19.243 | -11.427 |
| | Image-side surface 46 | 3.384 | 0.703 | | | |
| Fifth lens element 5 | Object-side surface 55 | -3.536 | 1.177 | 1.535 | 55.690 | 2.590 |
| | Image-side surface 56 | -1.113 | 0.050 | | | |
| Sixth lens element 6 | Object-side surface 65 | 4.161 | 0.954 | 1.642 | 22.409 | -2.982 |
| | Image-side surface 66 | 1.200 | 0.900 | | | |
| Filter 9 | Object-side surface 95 | Infinity | 0.210 | 1.517 | 64.167 | |
| | Image-side surface 96 | Infinity | 0.359 | | | |
| | Image plane 99 | Infinity | 0.000 | | | |

FIG. 9

| Surface | K | $a_2$ | $a_4$ | $a_6$ | $a_8$ |
|---|---|---|---|---|---|
| 15 | 0.000000E+00 | 0.000000E+00 | 8.754665E-02 | -5.370399E-02 | 2.729025E-02 |
| 16 | 0.000000E+00 | 0.000000E+00 | 1.203486E-01 | -2.025029E-01 | 1.650819E-01 |
| 25 | -5.863368E+00 | 0.000000E+00 | 7.597283E-02 | -1.543045E-01 | 4.606549E-02 |
| 26 | 0.000000E+00 | 0.000000E+00 | 4.215422E-03 | 3.484532E-03 | -1.522577E-02 |
| 35 | 0.000000E+00 | 0.000000E+00 | -1.452474E-02 | -6.983116E-02 | 4.568796E-01 |
| 36 | 1.219481E+00 | 0.000000E+00 | -4.595731E-02 | 1.348594E-01 | -2.859719E-01 |
| 45 | 0.000000E+00 | 0.000000E+00 | -9.703801E-02 | 1.169961E-01 | -1.420251E-01 |
| 46 | -4.798106E+00 | 0.000000E+00 | -5.097340E-02 | 5.296464E-02 | -4.728477E-02 |
| 55 | 0.000000E+00 | 0.000000E+00 | 9.306791E-03 | 5.134781E-03 | -7.069237E-03 |
| 56 | -2.791413E+00 | 0.000000E+00 | -4.128439E-02 | -9.627223E-03 | 2.845588E-02 |
| Surface | $a_{10}$ | $a_{12}$ | $a_{14}$ | $a_{16}$ | $a_{18}$ |
| 15 | -9.808897E-03 | 2.296687E-03 | -3.074694E-04 | 1.792600E-05 | |
| 16 | -8.378850E-02 | 2.711160E-02 | -5.122165E-03 | 4.335915E-04 | |
| 25 | 7.010167E-02 | -7.472446E-02 | 2.865916E-02 | -4.026186E-03 | |
| 26 | -9.941792E-03 | 1.112859E-01 | -1.377347E-01 | 5.344450E-02 | |
| 35 | -1.841121E+00 | 3.858828E+00 | -4.131078E+00 | 1.749348E+00 | |
| 36 | 4.086378E-01 | -3.755473E-01 | 1.911706E-01 | -4.210135E-02 | |
| 45 | 1.183037E-01 | -6.258140E-02 | 1.848504E-02 | -2.359752E-03 | |
| 46 | 3.124438E-02 | -1.440656E-02 | 4.380557E-03 | -8.283313E-04 | 8.689571E-05 |
| 55 | 1.128881E-02 | -7.563238E-03 | 2.737112E-03 | -5.750325E-04 | 6.648424E-05 |
| 56 | -2.387180E-02 | 1.170623E-02 | -3.292758E-03 | 5.249533E-04 | -4.440599E-05 |

FIG. 10A

| Surface | $a_{20}$ |
|---|---|
| 15 | |
| 16 | |
| 25 | |
| 26 | |
| 35 | |
| 36 | |
| 45 | |
| 46 | -3.829676E+00 |
| 55 | -3.290830E-06 |
| 56 | 1.554706E-06 |

FIG. 10B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 9.535617E-07 | -1.682332E-05 | -4.137079E-02 | -8.274216E-02 | -4.136608E-02 | 4.128205E-03 |
| 66 | -4.863146E+00 | -2.412909E-06 | 4.496948E-05 | -1.808503E-02 | -3.616454E-02 | -1.808129E-02 | 3.232535E-03 |
| Surface | $x^4y^2$ | $x^2y^4$ | $x^0y^6$ | $x^8y^0$ | $x^6y^2$ | $x^4y^4$ | $x^2y^6$ |
| 65 | 1.238456E-02 | 1.238459E-02 | 4.128375E-03 | 3.427965E-04 | 1.371182E-03 | 2.056770E-03 | 1.371173E-03 |
| 66 | 9.698206E-03 | 9.698758E-03 | 3.233860E-03 | -4.358570E-04 | -1.743415E-03 | -2.615113E-03 | -1.743379E-03 |
| Surface | $x^0y^8$ | $x^{10}y^0$ | $x^8y^2$ | $x^6y^4$ | $x^4y^6$ | $x^2y^8$ | $x^0y^{10}$ |
| 65 | 3.427761E-04 | -2.465077E-04 | -2.465078E-03 | -2.465079E-03 | -1.232542E-03 | -2.465079E-03 | -2.465153E-04 |
| 66 | -4.357264E-04 | 4.160927E-05 | 2.080468E-04 | 4.160940E-04 | 2.080495E-04 | 4.160945E-04 | 4.161778E-05 |
| Surface | $x^{12}y^0$ | $x^{10}y^2$ | $x^8y^4$ | $x^6y^6$ | $x^4y^8$ | $x^2y^{10}$ | $x^0y^{12}$ |
| 65 | 4.623990E-05 | 2.774394E-04 | 6.935985E-04 | 9.247979E-04 | 6.935981E-04 | 2.774385E-04 | 4.623852E-05 |
| 66 | -2.856985E-06 | -1.714189E-05 | -4.285471E-05 | -5.713959E-05 | -4.285464E-05 | -1.714163E-05 | -2.856223E-06 |
| Surface | $x^{14}y^0$ | $x^{12}y^2$ | $x^{10}y^4$ | $x^8y^6$ | $x^6y^8$ | $x^4y^{10}$ | $x^2y^{12}$ |
| 65 | -4.446973E-06 | -3.112882E-05 | -9.338646E-05 | -1.556441E-04 | -1.556441E-04 | -9.338656E-05 | -3.112900E-05 |
| 66 | 1.407532E-07 | 9.852740E-07 | 2.955823E-06 | 4.926372E-06 | 4.926374E-06 | 2.955831E-06 | 9.853013E-07 |
| Surface | $x^0y^{14}$ | $x^{16}y^0$ | $x^{12}y^4$ | $x^{10}y^6$ | $x^8y^8$ | $x^{14}y^4$ | $x^6y^{10}$ |
| 65 | -4.447115E-06 | 2.348761E-07 | 1.879008E-06 | 6.576529E-06 | 1.315306E-05 | 1.644132E-05 | 1.315305E-05 |
| 66 | 1.408289E-07 | -3.877081E-08 | -1.356978E-07 | -2.713955E-07 | -2.713955E-07 | -3.392443E-07 | -2.713951E-07 |
| Surface | $x^4y^{12}$ | $x^2y^{14}$ | $x^{18}y^0$ | $x^{16}y^2$ | $x^{14}y^4$ | $x^{12}y^6$ |  |
| 65 | 6.576508E-06 | 1.878983E-06 | 2.348984E-07 | -6.415865E-09 | -5.774288E-08 | -2.309716E-07 | -5.389339E-07 |
| 66 | -1.356965E-07 | -3.876769E-08 | -4.836658E-09 | 1.060274E-10 | 9.542544E-10 | 3.817023E-09 | 8.906391E-09 |

FIG. 10C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | -8.084012E-07 | -8.084019E-07 | -5.389363E-07 | -2.309753E-07 | -5.774387E-08 | -6.396002E-09 | 6.938025E-11 |
| 66 | 1.335959E-08 | 1.335960E-08 | 8.906435E-09 | 3.817167E-09 | 9.546506E-10 | 1.070497E-10 | -1.098421E-12 |

| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
|---|---|---|---|---|---|---|---|
| 65 | 6.937857E-10 | 3.122018E-09 | 8.325363E-09 | 1.456935E-08 | 1.748315E-08 | 1.456913E-08 | 8.324909E-09 |
| 66 | -1.098367E-11 | -4.942612E-11 | -1.318027E-10 | -2.306545E-10 | -2.767850E-10 | -2.306529E-10 | -1.317969E-10 |

| Surface | $x^4y^{16}$ | $x^2y^{18}$ | $x^0y^{20}$ |
|---|---|---|---|
| 65 | 3.121626E-09 | 6.949654E-10 | 7.342324E-11 |
| 66 | -4.940974E-11 | -1.094380E-11 | -9.980079E-13 |

FIG. 10D

| Surface | X (mm) | Y (mm) | Sag (mm) |
|---|---|---|---|
| 65 | 3.000000 | 1.000000 | -0.239578 |
| 65 | -1.000000 | 3.000000 | -0.218416 |
| 66 | 3.000000 | 1.000000 | 0.715487 |
| 66 | -1.000000 | 3.000000 | 0.720583 |

FIG. 10E

| Second embodiment ||||||
|---|---|---|---|---|---|
| Effective focal length (EFL)= 3.358 mm, half field of view (HFOV)= 55.989°, system length (TTL)= 7.152 mm, F-number (Fno)= 2.257, image height (ImgH)= 5.233 mm. ||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -11.805 | 0.520 | 1.640 | 23.529 | -5.999 |
| | Image-side surface 16 | 5.850 | 0.050 | | | |
| Second lens element 2 | Object-side surface 25 | 2.092 | 0.426 | 1.661 | 20.373 | 6.529 |
| | Image-side surface 26 | 3.697 | 0.322 | | | |
| Aperture 0 | | Infinity | 0.038 | | | |
| Third lens element 3 | Object-side surface 35 | -149.156 | 0.947 | 1.535 | 55.690 | 3.784 |
| | Image-side surface 36 | -2.007 | 0.139 | | | |
| Fourth lens element 4 | Object-side surface 45 | 6.658 | 0.378 | 1.661 | 20.373 | -11.154 |
| | Image-side surface 46 | 3.434 | 0.683 | | | |
| Fifth lens element 5 | Object-side surface 55 | -3.584 | 1.189 | 1.535 | 55.690 | 2.571 |
| | Image-side surface 56 | -1.111 | 0.050 | | | |
| Sixth lens element 6 | Object-side surface 65 | 4.165 | 0.961 | 1.642 | 22.409 | -2.961 |
| | Image-side surface 66 | 1.194 | 0.900 | | | |
| Filter 9 | Object-side surface 95 | Infinity | 0.210 | 1.517 | 64.167 | |
| | Image-side surface 96 | Infinity | 0.338 | | | |
| | Image plane 99 | Infinity | 0.000 | | | |

FIG. 13

| Surface | K | $a_2$ | $a_4$ | $a_6$ | $a_8$ |
|---|---|---|---|---|---|
| 15 | 0.000000E+00 | 0.000000E+00 | 8.709173E-02 | -5.205416E-02 | 2.612087E-02 |
| 16 | 0.000000E+00 | 0.000000E+00 | 1.193851E-01 | -1.950744E-01 | 1.492412E-01 |
| 25 | -5.899677E+00 | 0.000000E+00 | 7.450494E-02 | -1.457148E-01 | 3.000063E-02 |
| 26 | 0.000000E+00 | 0.000000E+00 | 4.766328E-03 | -1.615385E-03 | 1.918724E-04 |
| 35 | 0.000000E+00 | 0.000000E+00 | -1.335345E-02 | -8.642275E-02 | 5.722034E-01 |
| 36 | 1.216001E+00 | 0.000000E+00 | -4.757973E-02 | 1.625094E-01 | -3.695654E-01 |
| 45 | 0.000000E+00 | 0.000000E+00 | -9.828413E-02 | 1.289184E-01 | -1.687095E-01 |
| 46 | -4.886935E+00 | 0.000000E+00 | -5.051360E-02 | 4.985429E-02 | -4.022740E-02 |
| 55 | 0.000000E+00 | 0.000000E+00 | 9.723149E-03 | 4.105158E-03 | -5.917668E-03 |
| 56 | -2.807841E+00 | 0.000000E+00 | -4.182556E-02 | -8.208807E-03 | 2.691293E-02 |
| Surface | $a_{10}$ | $a_{12}$ | $a_{14}$ | $a_{16}$ | $a_{18}$ |
| 15 | -9.373516E-03 | 2.214076E-03 | -3.013152E-04 | 1.792618E-05 | |
| 16 | -6.914768E-02 | 2.033455E-02 | -3.573171E-03 | 2.948728E-04 | |
| 25 | 8.163170E-02 | -7.678994E-02 | 2.770042E-02 | -3.705513E-03 | |
| 26 | -3.655252E-02 | 1.296413E-01 | -1.384514E-01 | 5.050440E-02 | |
| 35 | -2.354314E+00 | 5.106573E+00 | -5.691105E+00 | 2.526180E+00 | |
| 36 | 5.410609E-01 | -4.954181E-01 | 2.499096E-01 | -5.433842E-02 | |
| 45 | 1.476280E-01 | -8.023498E-02 | 2.404731E-02 | -3.077494E-03 | |
| 46 | 2.137018E-02 | -6.066370E-03 | 1.454648E-04 | 4.386292E-04 | -1.188178E-04 |
| 55 | 1.017145E-02 | -6.901465E-03 | 2.503422E-03 | -5.255564E-04 | 6.056075E-05 |
| 56 | -2.299529E-02 | 1.142050E-02 | -3.241928E-03 | 5.215851E-04 | -4.466232E-05 |

FIG. 14A

| Surface | $a_{20}$ |
|---|---|
| 15 | |
| 16 | |
| 25 | |
| 26 | |
| 35 | |
| 36 | |
| 45 | |
| 46 | 1.013422E-05 |
| 55 | -2.979802E-06 |
| 56 | 1.592422E-06 |

FIG. 14B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 6.068781E-06 | -1.301398E-05 | -3.950478E-02 | -7.900970E-02 | -3.950334E-02 | 3.236709E-03 |
| 66 | -4.858978E+00 | -3.045660E-04 | 1.865453E-04 | -1.771854E-02 | -3.542870E-02 | -1.770087E-02 | 3.120649E-03 |

| Surface | $x^4y^2$ | $x^0y^{14}$ | $x^8y^0$ | $x^2y^2$ | $x^4y^4$ | $x^6y^2$ | $x^2y^6$ |
|---|---|---|---|---|---|---|---|
| 65 | 9.710109E-03 | 9.710049E-03 | 3.236504E-03 | 6.477822E-04 | 3.886686E-03 | 2.591128E-03 | 2.591100E-03 |
| 66 | 9.362019E-03 | 9.362219E-03 | 3.121399E-03 | -4.143790E-04 | -2.486266E-03 | -1.657514E-03 | -1.657494E-03 |

| Surface | $x^8y^0$ | $x^0y^{10}$ | $x^6y^4$ | $x^4y^6$ | $x^2y^8$ | $x^4y^2$ | $x^0y^{10}$ |
|---|---|---|---|---|---|---|---|
| 65 | 6.477109E-04 | -3.072241E-04 | -3.072241E-03 | -3.072241E-03 | -1.536127E-03 | -1.536120E-03 | -3.072362E-04 |
| 66 | -4.143130E-04 | 3.950833E-05 | 1.975418E-04 | 3.950838E-04 | 1.975440E-04 | 3.950842E-04 | 3.951509E-05 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | 5.385561E-05 | 3.231337E-04 | 8.078341E-04 | 1.077112E-03 | 8.078336E-04 | 3.231322E-04 | 5.385400E-05 |
| 66 | -2.763971E-06 | -1.658382E-05 | -4.145953E-05 | -5.527937E-05 | -4.145947E-05 | -1.658357E-05 | -2.763265E-06 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | -5.111205E-06 | -3.577843E-05 | -1.073353E-04 | -1.788922E-04 | -1.788922E-04 | -1.073354E-04 | -3.577864E-05 |
| 66 | 1.407011E-07 | 9.849088E-07 | 2.954727E-06 | 4.924546E-06 | 4.924547E-06 | 2.954735E-06 | 9.849377E-07 |

| Surface | $x^0y^{14}$ | $x^{16}y^0$ | $x^{14}y^2$ | $x^{12}y^4$ | $x^{10}y^6$ | $x^8y^8$ | $x^6y^{10}$ |
|---|---|---|---|---|---|---|---|
| 65 | -5.111418E-06 | 2.753517E-07 | 2.202814E-06 | 7.709846E-06 | 1.541969E-05 | 1.927461E-05 | 1.541968E-05 |
| 66 | 1.407717E-07 | -4.993168E-09 | -3.994526E-08 | -1.398084E-07 | -2.796167E-07 | -3.495208E-07 | -2.796165E-07 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | 7.709829E-06 | 2.202807E-06 | 2.753408E-07 | -7.934829E-09 | -7.141355E-08 | -2.856544E-07 | -6.665272E-07 |
| 66 | -1.398074E-07 | -3.994194E-08 | -4.986260E-09 | 1.105789E-10 | 9.952168E-10 | 3.980872E-09 | 9.288706E-09 |

FIG. 14C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | -9.997910E-07 | -9.997915E-07 | -6.665285E-07 | -2.856545E-07 | -7.140253E-08 | -7.927086E-09 | 9.490384E-11 |
| 66 | 1.393306E-08 | 1.393306E-08 | 9.288724E-09 | 3.980976E-09 | 9.955788E-10 | 1.113013E-10 | -1.134446E-12 |
| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
| 65 | 9.490128E-10 | 4.270522E-09 | 1.138802E-08 | 1.992901E-08 | 2.391478E-08 | 1.992895E-08 | 1.138809E-08 |
| 66 | -1.134387E-11 | -5.104695E-11 | -1.361249E-10 | -2.382184E-10 | -2.858624E-10 | -2.382190E-10 | -1.361236E-10 |
| Surface | $x^4y^{16}$ | $x^2y^{18}$ | $x^0y^{20}$ | | | | |
| 65 | 4.271700E-09 | 9.551091E-10 | 9.939993E-11 | | | | |
| 66 | -5.103701E-11 | -1.130881E-11 | -1.054676E-12 | | | | |

FIG. 14D

| Surface | X (mm) | Y (mm) | Sag (mm) |
|---|---|---|---|
| 65 | 3.000000 | 1.000000 | -0.210832 |
| 65 | -1.000000 | 3.000000 | -0.193304 |
| 66 | 3.000000 | 1.000000 | 0.726168 |
| 66 | -1.000000 | 3.000000 | 0.734577 |

FIG. 14E

| Third embodiment | | | | | | |
|---|---|---|---|---|---|---|
| Effective focal length (EFL)= 3.633 mm, half field of view (HFOV)= 53.888°, system length (TTL)= 7.535 mm, F-number (Fno)= 2.257, image height (ImgH)= 5.233 mm. | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | -11.988 | 0.542 | 1.640 | 23.529 | -6.280 |
| | Image-side surface 16 | 6.220 | 0.067 | | | |
| Second lens element 2 | Object-side surface 25 | 2.141 | 0.637 | 1.661 | 20.373 | 6.865 |
| | Image-side surface 26 | 3.542 | 0.303 | | | |
| Aperture 0 | | Infinity | 0.076 | | | |
| Third lens element 3 | Object-side surface 35 | -35.281 | 0.712 | 1.535 | 55.690 | 4.111 |
| | Image-side surface 36 | -2.091 | 0.051 | | | |
| Fourth lens element 4 | Object-side surface 45 | 5.358 | 0.208 | 1.671 | 19.243 | -16.082 |
| | Image-side surface 46 | 3.535 | 0.827 | | | |
| Fifth lens element 5 | Object-side surface 55 | -3.834 | 1.521 | 1.535 | 55.690 | 2.429 |
| | Image-side surface 56 | -1.108 | 0.240 | | | |
| Sixth lens element 6 | Object-side surface 65 | 4.147 | 0.711 | 1.642 | 22.409 | -2.711 |
| | Image-side surface 66 | 1.150 | 1.000 | | | |
| Filter 9 | Object-side surface 95 | Infinity | 0.210 | 1.517 | 64.167 | |
| | Image-side surface 96 | Infinity | 0.431 | | | |
| | Image plane 99 | Infinity | 0.000 | | | |

FIG. 17

| Surface | K | $a_2$ | $a_4$ | $a_6$ | $a_8$ |
|---|---|---|---|---|---|
| 15 | 0.000000E+00 | 0.000000E+00 | 7.524965E-02 | -3.962055E-02 | 1.762856E-02 |
| 16 | 0.000000E+00 | 0.000000E+00 | 9.069499E-02 | -1.238181E-01 | 7.882994E-02 |
| 25 | -5.679149E+00 | 0.000000E+00 | 5.712671E-02 | -1.043632E-01 | 3.563978E-02 |
| 26 | 0.000000E+00 | 0.000000E+00 | 8.215906E-03 | -3.113642E-02 | 1.374484E-01 |
| 35 | 0.000000E+00 | 0.000000E+00 | -1.128547E-02 | -5.476819E-02 | 1.763093E-01 |
| 36 | 1.473021E+00 | 0.000000E+00 | -8.799292E-04 | -3.959669E-02 | 4.204543E-02 |
| 45 | 0.000000E+00 | 0.000000E+00 | -4.112578E-02 | -3.879873E-02 | 7.101415E-02 |
| 46 | -5.022358E+00 | 0.000000E+00 | -1.809336E-02 | -1.777886E-02 | 2.565984E-02 |
| 55 | 0.000000E+00 | 0.000000E+00 | 4.063999E-03 | 7.607207E-03 | -4.623469E-03 |
| 56 | -2.894305E+00 | 0.000000E+00 | -2.942694E-02 | -1.559937E-02 | 2.953301E-02 |
| Surface | $a_{10}$ | $a_{12}$ | $a_{14}$ | $a_{16}$ | $a_{18}$ |
| 15 | -5.524209E-03 | 1.142729E-03 | -1.369323E-04 | 7.254358E-06 | |
| 16 | -3.087318E-02 | 7.933866E-03 | -1.240153E-03 | 9.067314E-05 | |
| 25 | 8.185952E-03 | -8.637847E-03 | 2.246841E-03 | -2.108250E-04 | |
| 26 | -4.158029E-01 | 7.169504E-01 | -6.102082E-01 | 2.115741E-01 | |
| 35 | -5.391643E-01 | 9.093263E-01 | -8.202472E-01 | 2.947995E-01 | |
| 36 | 4.064827E-02 | -1.499467E-01 | 1.320580E-01 | -4.178594E-02 | |
| 45 | -6.122267E-02 | 3.072166E-02 | -8.335023E-03 | 9.122905E-04 | |
| 46 | -1.348036E-02 | 1.258418E-03 | 2.337845E-03 | -1.302808E-03 | 2.846026E-04 |
| 55 | 6.708229E-03 | -4.242348E-03 | 1.348536E-03 | -2.351744E-04 | 2.165215E-05 |
| 56 | -2.223493E-02 | 9.853535E-03 | -2.556669E-03 | 3.824435E-04 | -3.069226E-05 |

FIG. 18A

| Surface | $a_{20}$ |
|---|---|
| 15 | |
| 16 | |
| 25 | |
| 26 | |
| 35 | |
| 36 | |
| 45 | |
| 46 | -2.332298E-05 |
| 55 | -8.258999E-07 |
| 56 | 1.027305E-06 |

FIG. 18B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 7.258192E-07 | -1.354240E-06 | -2.976439E-02 | -5.952902E-02 | -2.976394E-02 | 2.639532E-03 |
| 66 | -4.569392E+00 | -6.358495E-06 | 1.743261E-05 | -1.037361E-02 | -2.074698E-02 | -1.037364E-02 | 6.900042E-04 |

| Surface | $x^4y^2$ | $x^2y^4$ | $x^0y^6$ | $x^8y^0$ | $x^6y^2$ | $x^4y^4$ | $x^2y^6$ |
|---|---|---|---|---|---|---|---|
| 65 | 7.918576E-03 | 7.918550E-03 | 2.639485E-03 | -4.081681E-04 | -1.632673E-03 | -2.449012E-03 | -1.632682E-03 |
| 66 | 2.070020E-03 | 2.070030E-03 | 6.900383E-04 | 4.207368E-04 | 1.682950E-04 | 2.524427E-04 | 1.682964E-04 |

| Surface | $x^0y^8$ | $x^{10}y^0$ | $x^8y^2$ | $x^6y^4$ | $x^4y^6$ | $x^2y^8$ | $x^0y^{10}$ |
|---|---|---|---|---|---|---|---|
| 65 | -4.081865E-04 | 1.390900E-04 | 6.954501E-04 | 1.390900E-03 | 6.954479E-04 | 1.390900E-03 | 1.390858E-04 |
| 66 | 4.207818E-05 | -1.421980E-05 | -7.109901E-05 | -1.421980E-04 | -7.109886E-05 | -1.421980E-04 | -1.421932E-05 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | -2.948894E-05 | -1.769336E-04 | -4.423340E-04 | -5.897787E-04 | -4.423342E-04 | -1.769341E-04 | -2.948973E-05 |
| 66 | 1.535499E-06 | 9.212993E-06 | 2.303248E-05 | 3.070998E-05 | 2.303249E-05 | 9.213008E-06 | 1.535548E-06 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | 3.372519E-06 | 2.360764E-05 | 7.082519E-05 | 1.180382E-04 | 1.180382E-04 | 7.082287E-05 | 2.360754E-05 |
| 66 | -9.723411E-08 | -6.806388E-07 | -2.041917E-06 | -3.403194E-06 | -3.403194E-06 | -2.041916E-06 | -6.806374E-07 |

| Surface | $x^0y^{14}$ | $x^{16}y^0$ | $x^{14}y^2$ | $x^{12}y^4$ | $x^{10}y^6$ | $x^8y^8$ | $x^6y^{10}$ |
|---|---|---|---|---|---|---|---|
| 65 | 3.372399E-06 | -2.131412E-07 | -1.705129E-06 | -5.967953E-06 | -1.193591E-05 | -1.491988E-05 | -1.193591E-05 |
| 66 | -9.722936E-08 | 3.766886E-09 | 3.013508E-08 | 1.054728E-07 | 2.109456E-07 | 2.636820E-07 | 2.109456E-07 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | -5.967962E-06 | -1.705148E-06 | -2.131503E-07 | 7.070783E-09 | 6.363714E-08 | 2.545485E-07 | 5.939465E-07 |
| 66 | 1.054728E-07 | 3.013520E-08 | 3.767311E-09 | -8.105327E-11 | -7.294797E-10 | -2.917919E-09 | -6.808477E-09 |

FIG. 18C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | 8.909197E-07 | 8.909195E-07 | 5.939457E-07 | 2.545467E-07 | 6.363448E-08 | 7.073947E-09 | -9.683264E-11 |
| 66 | -1.021272E-08 | -1.021272E-08 | -6.808482E-09 | -2.917924E-09 | -7.294735E-10 | -8.102367E-11 | 7.302554E-13 |
| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
| 65 | -9.683148E-10 | -4.357419E-09 | -1.161979E-08 | -2.033464E-08 | -2.440159E-08 | -2.033471E-08 | -1.161997E-08 |
| 66 | 7.302532E-12 | 3.286141E-11 | 8.763042E-11 | 1.533532E-10 | 1.840237E-10 | 1.535527E-10 | 8.762946E-11 |
| Surface | $x^4y^{16}$ | $x^2y^{18}$ | $x^0y^{20}$ | | | | |
| 65 | -4.357712E-09 | -9.684444E-10 | -9.468585E-11 | | | | |
| 66 | 3.286021E-11 | 7.302031E-12 | 7.303050E-13 | | | | |

FIG. 18D

| Surface | X (mm) | Y (mm) | Sag (mm) |
|---|---|---|---|
| 65 | 3.000000 | 1.000000 | -0.020797 |
| 65 | -1.000000 | 3.000000 | -0.014244 |
| 66 | 3.000000 | 1.000000 | 0.899806 |
| 66 | -1.000000 | 3.000000 | 0.900160 |

FIG. 18E

| Fourth embodiment | | | | | | |
|---|---|---|---|---|---|---|
| Effective focal length (EFL)= 3.394 mm, half field of view (HFOV)= 55.751°, system length (TTL)= 7.421 mm, F-number (Fno)= 2.257, image height (ImgH)= 5.233 mm. | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | -13.815 | 0.555 | 1.640 | 23.529 | -5.964 |
| | Image-side surface 16 | 5.410 | 0.052 | | | |
| Second lens element 2 | Object-side surface 25 | 2.040 | 0.292 | 1.661 | 20.373 | 6.434 |
| | Image-side surface 26 | 3.667 | 0.423 | | | |
| Aperture 0 | | Infinity | 0.037 | | | |
| Third lens element 3 | Object-side surface 35 | 348.636 | 0.968 | 1.535 | 55.690 | 3.745 |
| | Image-side surface 36 | -2.019 | 0.139 | | | |
| Fourth lens element 4 | Object-side surface 45 | 6.418 | 0.326 | 1.671 | 19.243 | -13.770 |
| | Image-side surface 46 | 3.724 | 0.593 | | | |
| Fifth lens element 5 | Object-side surface 55 | -4.763 | 1.744 | 1.535 | 55.690 | 2.695 |
| | Image-side surface 56 | -1.251 | 0.050 | | | |
| Sixth lens element 6 | Object-side surface 65 | 3.771 | 0.937 | 1.642 | 22.409 | -2.869 |
| | Image-side surface 66 | 1.123 | 0.900 | | | |
| Filter 9 | Object-side surface 95 | Infinity | 0.210 | 1.517 | 64.167 | |
| | Image-side surface 96 | Infinity | 0.196 | | | |
| | Image plane 99 | Infinity | 0.000 | | | |

FIG. 21

| Surface | K | $a_2$ | $a_4$ | $a_6$ | $a_8$ |
|---|---|---|---|---|---|
| 15 | 0.000000E+00 | 0.000000E+00 | 7.526134E-02 | -4.071209E-02 | 1.942918E-02 |
| 16 | 0.000000E+00 | 0.000000E+00 | 9.704165E-02 | -1.457505E-01 | 1.070931E-01 |
| 25 | -5.251091E+00 | 0.000000E+00 | 6.648851E-02 | -1.159240E-01 | 3.643304E-02 |
| 26 | 0.000000E+00 | 0.000000E+00 | 4.639919E-03 | 1.710875E-02 | -6.452190E-02 |
| 35 | 0.000000E+00 | 0.000000E+00 | -1.499834E-02 | -7.438516E-02 | 3.572136E-01 |
| 36 | 1.202189E+00 | 0.000000E+00 | -4.208619E-02 | 9.295517E-02 | -1.775502E-01 |
| 45 | 0.000000E+00 | 0.000000E+00 | -8.378606E-02 | 7.227713E-02 | -8.182153E-02 |
| 46 | -4.941995E+00 | 0.000000E+00 | -3.291758E-02 | 1.431879E-02 | -1.139259E-03 |
| 55 | 0.000000E+00 | 0.000000E+00 | 1.907637E-02 | -1.082222E-02 | 1.045933E-02 |
| 56 | -3.089430E+00 | 0.000000E+00 | -4.014827E-02 | 9.074509E-03 | 1.564847E-03 |
| Surface | $a_{10}$ | $a_{12}$ | $a_{14}$ | $a_{16}$ | $a_{18}$ |
| 15 | -6.648311E-03 | 1.516326E-03 | -2.019754E-04 | 1.181335E-05 | |
| 16 | -5.062457E-02 | 1.603569E-02 | -3.126467E-03 | 2.851767E-04 | |
| 25 | 1.609397E-03 | 5.855428E-03 | -5.531732E-03 | 1.118891E-03 | |
| 26 | 7.159968E-02 | -3.384355E-02 | 1.019213E-02 | -6.710901E-04 | |
| 35 | -1.226956E+00 | 2.298022E+00 | -2.288844E+00 | 9.244295E-01 | |
| 36 | 2.401261E-01 | -2.145088E-01 | 1.079878E-01 | -2.390770E-02 | |
| 45 | 6.657540E-02 | -3.457169E-02 | 1.004264E-02 | -1.260688E-03 | |
| 46 | -7.401626E-03 | 8.460989E-03 | -4.802899E-03 | 1.534521E-03 | -2.620716E-04 |
| 55 | -3.046412E-03 | -4.169728E-04 | 5.448461E-04 | -1.688116E-04 | 2.489811E-05 |
| 56 | -2.205382E-03 | 9.747086E-04 | -1.886442E-04 | 1.355480E-05 | 2.541798E-07 |

FIG. 22A

| Surface | $a_{20}$ |
|---|---|
| 15 | |
| 16 | |
| 25 | |
| 26 | |
| 35 | |
| 36 | |
| 45 | |
| 46 | 1.853264E-05 |
| 55 | -1.488583E-06 |
| 56 | -5.429218E-08 |

FIG. 22B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | -1.595501E-06 | 2.375400E-05 | -6.209502E-02 | -1.241908E-01 | -6.208399E-02 | 1.123250E-02 |
| 66 | -3.980639E+00 | -8.155177E-05 | 4.149761E-05 | -2.377937E-02 | -4.754830E-02 | -2.377772E-02 | 5.233078E-03 |

| Surface | $x^4y^2$ | $x^2y^4$ | $x^0y^6$ | $x^8y^0$ | $x^6y^2$ | $x^4y^4$ | $x^2y^6$ |
|---|---|---|---|---|---|---|---|
| 65 | 3.369724E-02 | 3.369726E-02 | 1.123312E-02 | -1.740362E-03 | -6.961488E-03 | -1.044225E-02 | -6.961526E-03 |
| 66 | 1.571021E-02 | 1.572035E-02 | 5.252068E-03 | -8.206192E-04 | -3.282423E-03 | -4.923601E-03 | -3.282300E-03 |

| Surface | $x^0y^8$ | $x^{10}y^0$ | $x^8y^2$ | $x^6y^4$ | $x^4y^6$ | $x^2y^8$ | $x^0y^{10}$ |
|---|---|---|---|---|---|---|---|
| 65 | -1.740386E-03 | 2.354026E-04 | 1.177008E-03 | 2.354014E-03 | 1.176997E-03 | 4.527337E-04 | 2.353851E-04 |
| 66 | -8.203372E-04 | 9.054512E-05 | 4.527270E-04 | 9.054547E-04 | 4.527547E-04 | 9.054562E-04 | 9.056167E-05 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | -3.538021E-05 | -2.122818E-04 | -5.307049E-04 | -7.076070E-04 | -5.307063E-04 | -2.122838E-04 | -3.538447E-05 |
| 66 | -6.946709E-06 | -4.168020E-05 | -1.042005E-04 | -1.389339E-04 | -1.042003E-04 | -4.167965E-05 | -6.945310E-06 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | 5.115361E-06 | 3.580747E-05 | 1.074224E-04 | 1.790372E-04 | 1.790371E-04 | 1.074221E-04 | 3.580752E-05 |
| 66 | 3.600479E-07 | 2.520338E-06 | 7.561014E-06 | 1.260170E-05 | 1.260170E-05 | 7.561032E-06 | 2.520391E-06 |

| Surface | $x^0y^{14}$ | $x^{16}y^0$ | $x^{14}y^2$ | $x^{12}y^4$ | $x^{10}y^6$ | $x^8y^8$ | $x^6y^{10}$ |
|---|---|---|---|---|---|---|---|
| 65 | 5.114589E-06 | -4.944874E-07 | -3.955904E-06 | -1.384567E-05 | -2.769135E-05 | -3.461420E-05 | -2.769138E-05 |
| 66 | 3.601845E-07 | -1.196448E-08 | -9.571575E-08 | -3.350050E-07 | -6.700100E-07 | -8.375124E-07 | -6.700094E-07 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | -1.384569E-05 | -3.955666E-06 | -4.946176E-07 | 2.583421E-08 | 2.325076E-07 | 9.300296E-07 | 2.170068E-06 |
| 66 | -3.350031E-07 | -9.571028E-08 | -1.195020E-08 | 2.290551E-10 | 2.061503E-09 | 8.246015E-09 | 1.924070E-08 |

FIG. 22C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | 3.255100E-06 | 3.255097E-06 | 2.170064E-06 | 9.300504E-07 | 2.326523E-07 | 2.579453E-08 | -5.519951E-10 |
| 66 | 2.886106E-08 | 2.886108E-08 | 1.924078E-08 | 8.246236E-09 | 2.062088E-09 | 2.306057E-10 | -1.915915E-12 |
| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
| 65 | -5.519932E-09 | -2.483984E-08 | -6.623977E-08 | -1.159198E-07 | -1.391042E-07 | -1.159203E-07 | -6.623807E-08 |
| 66 | -1.915877E-11 | -8.621422E-11 | -2.299044E-10 | -4.023325E-10 | -4.827983E-10 | -4.023295E-10 | -2.298951E-10 |
| Surface | $x^4y^{16}$ | $x^2y^{18}$ | $x^0y^{20}$ | | | | |
| 65 | -2.482457E-08 | -5.453484E-09 | -5.745411E-10 | | | | |
| 66 | -8.618897E-11 | -1.909482E-11 | -1.744122E-12 | | | | |

FIG. 22D

| Surface | X (mm) | Y (mm) | Sag (mm) |
|---|---|---|---|
| 65 | 2.500000 | 1.000000 | -0.264384 |
| 65 | -1.000000 | 2.500000 | -0.265972 |
| 66 | 2.500000 | 1.000000 | 0.809514 |
| 66 | -1.000000 | 2.500000 | 0.816019 |

FIG. 22E

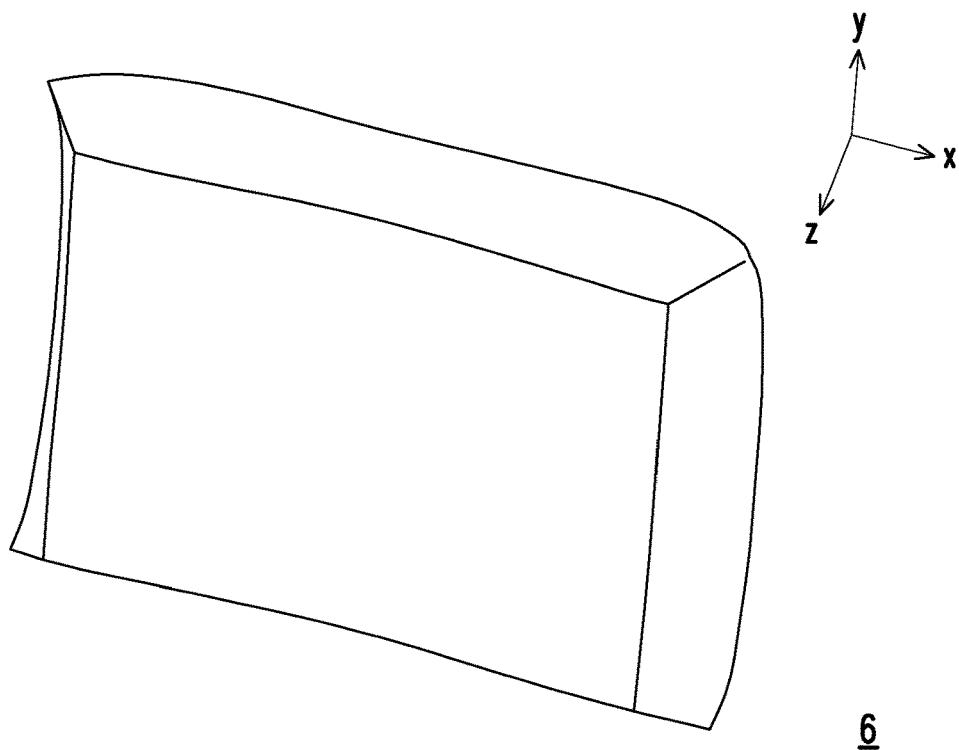
FIG. 23C
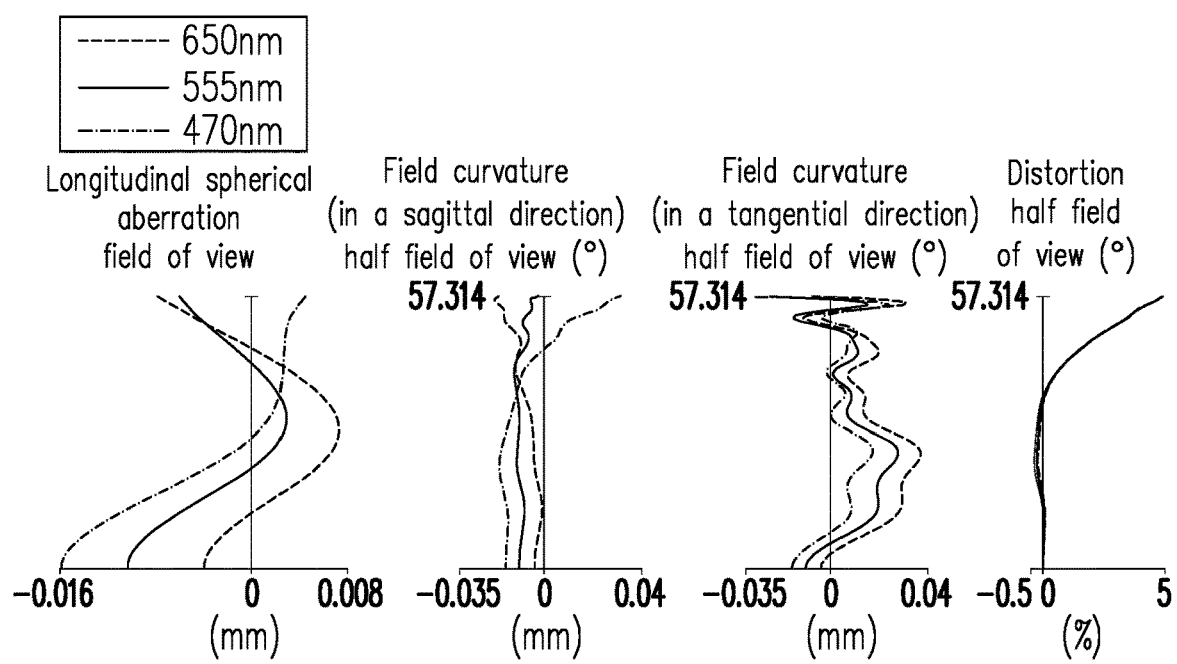
FIG. 24A
FIG. 24B
FIG. 24C
FIG. 24D

| Fifth embodiment ||||||
|---|---|---|---|---|---|
| Effective focal length (EFL)= 3.193 mm, half field of view (HFOV)= 57.314°, system length (TTL)= 7.059 mm, F-number (Fno)= 2.241, image height (ImgH)= 5.233 mm. ||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -11.934 | 0.594 | 1.640 | 23.529 | -7.998 |
| | Image-side surface 16 | 9.253 | 0.157 | | | |
| Second lens element 2 | Object-side surface 25 | 2.059 | 0.494 | 1.661 | 20.373 | 9.153 |
| | Image-side surface 26 | 2.808 | 0.241 | | | |
| Aperture 0 | | Infinity | 0.023 | | | |
| Third lens element 3 | Object-side surface 35 | 16.995 | 0.877 | 1.535 | 55.690 | 3.437 |
| | Image-side surface 36 | -2.031 | 0.381 | | | |
| Fourth lens element 4 | Object-side surface 45 | -9.053 | 0.373 | 1.671 | 19.243 | -8.314 |
| | Image-side surface 46 | 15.157 | 0.306 | | | |
| Fifth lens element 5 | Object-side surface 55 | -2.571 | 1.011 | 1.535 | 55.690 | 2.768 |
| | Image-side surface 56 | -1.071 | 0.050 | | | |
| Seventh lens element 7 | Object-side surface 75 | 9.425 | 0.508 | 1.535 | 55.690 | 86.607 |
| | Image-side surface 76 | 11.600 | 0.062 | | | |
| Sixth lens element 6 | Object-side surface 65 | 4.301 | 0.676 | 1.642 | 22.409 | -3.389 |
| | Image-side surface 66 | 1.363 | 0.900 | | | |
| Filter 9 | Object-side surface 95 | Infinity | 0.210 | 1.517 | 64.167 | |
| | Image-side surface 96 | Infinity | 0.195 | | | |
| | Image plane 99 | Infinity | 0.000 | | | |

FIG. 25

| Surface | K | $a_2$ | $a_4$ | $a_6$ | $a_8$ |
|---|---|---|---|---|---|
| 15 | 0.000000E+00 | 0.000000E+00 | 6.965219E-02 | -3.393080E-02 | 1.345010E-02 |
| 16 | 0.000000E+00 | 0.000000E+00 | 1.081724E-01 | -1.245758E-01 | 8.083401E-02 |
| 25 | 0.000000E+00 | 0.000000E+00 | 1.454257E-02 | -9.960570E-02 | 4.840957E-02 |
| 26 | 7.640011E+00 | 0.000000E+00 | -1.534836E-02 | -6.274291E-02 | 6.929494E-02 |
| 35 | 0.000000E+00 | 0.000000E+00 | -1.459105E-02 | -2.923262E-02 | 8.152524E-02 |
| 36 | 0.000000E+00 | 0.000000E+00 | -6.856206E-02 | 2.129501E-02 | -6.734516E-02 |
| 45 | 0.000000E+00 | 0.000000E+00 | -1.658853E-01 | 1.161948E-01 | -1.120339E-01 |
| 46 | 0.000000E+00 | 0.000000E+00 | -1.284366E-01 | 9.964879E-02 | -4.896388E-02 |
| 55 | 0.000000E+00 | 0.000000E+00 | -1.579141E-02 | -2.926423E-02 | 1.440606E-01 |
| 56 | -1.807842E+00 | 0.000000E+00 | -3.289127E-02 | 2.222599E-02 | -3.898457E-02 |
| 75 | 0.000000E+00 | 0.000000E+00 | -5.812157E-02 | 6.880770E-02 | -3.530947E-02 |
| 76 | 0.000000E+00 | 0.000000E+00 | -2.151639E-02 | 2.150901E-02 | -7.755018E-03 |
| Surface | $a_{10}$ | $a_{12}$ | $a_{14}$ | $a_{16}$ | $a_{18}$ |
| 15 | -3.753980E-03 | 6.851592E-04 | -7.227907E-05 | 3.368320E-06 | |
| 16 | -3.540594E-02 | 1.053985E-02 | -1.895224E-03 | 1.543004E-04 | |
| 25 | -2.133274E-02 | 1.431328E-02 | -5.149461E-03 | 6.723968E-04 | |
| 26 | -2.048079E-01 | 3.390832E-01 | -3.262720E-01 | 1.331886E-01 | |
| 35 | -3.652452E-01 | 8.642679E-01 | -1.099745E+00 | 5.700720E-01 | |
| 36 | 1.210822E-01 | -1.708371E-01 | 1.182897E-01 | -3.531495E-02 | |
| 45 | 1.074137E-01 | -6.636272E-02 | 2.213493E-02 | -3.158894E-03 | |
| 46 | 1.945615E-02 | -5.906125E-03 | 1.132415E-03 | -1.005778E-04 | |
| 55 | -1.506060E-01 | 8.471269E-02 | -2.873694E-02 | 5.839884E-03 | -6.497022E-04 |
| 56 | 5.502522E-02 | -4.084181E-02 | 1.723191E-02 | -4.138757E-03 | 5.262746E-04 |
| 75 | 1.053179E-02 | -2.064081E-03 | 2.683140E-04 | -2.212446E-05 | 1.041924E-06 |
| 76 | 1.154018E-03 | -4.291415E-05 | -8.929456E-06 | 1.280770E-06 | -6.629404E-08 |

FIG. 26A

| Surface | $a_{20}$ |
|---|---|
| 15 | |
| 16 | |
| 25 | |
| 26 | |
| 35 | |
| 36 | |
| 45 | |
| 46 | |
| 55 | 2.995891E-05 |
| 56 | -2.751204E-05 |
| 75 | -2.124641E-08 |
| 76 | 1.264117E-09 |

FIG. 26B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 3.322106E-06 | 1.066092E-06 | 8.968277E-03 | 1.793586E-02 | 8.970198E-03 | -2.291057E-02 |
| 66 | -4.456073E+00 | -8.134404E-06 | -2.073763E-06 | -4.090486E-03 | -8.177158E-03 | -4.095503E-03 | -5.677378E-03 |

| Surface | $x^4y^2$ | $x^2y^4$ | $x^0y^6$ | $x^8y^0$ | $x^6y^2$ | $x^4y^4$ | $x^2y^6$ |
|---|---|---|---|---|---|---|---|
| 65 | -6.873174E-02 | -6.873175E-02 | -2.291046E-02 | 6.643451E-03 | 2.657380E-02 | 3.986070E-02 | 2.657380E-02 |
| 66 | -1.703218E-02 | -1.703234E-02 | -5.677450E-03 | 1.873081E-03 | 7.492332E-03 | 1.123850E-02 | 7.492336E-03 |

| Surface | $x^0y^8$ | $x^{10}y^0$ | $x^8y^2$ | $x^6y^4$ | $x^4y^6$ | $x^2y^8$ | $x^0y^{10}$ |
|---|---|---|---|---|---|---|---|
| 65 | 6.643451E-03 | -9.326104E-04 | -9.326104E-03 | -4.663052E-03 | -9.326104E-03 | -4.663053E-03 | -9.326168E-04 |
| 66 | 1.873081E-03 | -2.855036E-04 | -2.855036E-03 | -1.427518E-03 | -2.855036E-03 | -1.427518E-03 | -2.855035E-04 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | 7.140813E-05 | 4.284487E-04 | 1.428162E-03 | 1.071122E-03 | 4.284486E-04 | 1.071122E-03 | 7.140780E-05 |
| 66 | 2.528373E-05 | 1.517024E-04 | 5.056746E-04 | 3.792560E-04 | 1.517024E-04 | 3.792560E-04 | 2.528374E-05 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | -2.810960E-06 | -1.967672E-05 | -5.903015E-05 | -9.838359E-05 | -9.838360E-05 | -5.903017E-05 | -1.967674E-05 |
| 66 | -1.369885E-06 | -9.589196E-06 | -2.876759E-05 | -4.794598E-05 | -4.794598E-05 | -2.876758E-05 | -9.589182E-06 |

| Surface | $x^{16}y^0$ | $x^{14}y^2$ | $x^{12}y^4$ | $x^{10}y^6$ | $x^8y^8$ | $x^6y^{10}$ | $x^{12}y^{12}$ |
|---|---|---|---|---|---|---|---|
| 65 | -2.810995E-06 | 3.304958E-08 | 2.643961E-07 | 9.253862E-07 | 1.850772E-06 | 2.313465E-06 | 1.850770E-06 |
| 66 | -1.369875E-06 | 4.465604E-08 | 3.572484E-07 | 1.250369E-06 | 2.500739E-06 | 3.125924E-06 | 2.500739E-06 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | 9.253822E-07 | 2.643896E-07 | 3.304664E-08 | 1.170728E-09 | 1.053648E-08 | 4.214590E-08 | 9.834040E-08 |
| 66 | 1.250370E-06 | 3.572490E-07 | 4.465642E-08 | -8.021438E-10 | -7.219290E-09 | -2.887716E-08 | -6.738004E-08 |

FIG. 26C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | 1.475106E-07 | 1.475104E-07 | 9.834002E-08 | 4.214515E-08 | 1.053532E-08 | 1.169148E-09 | -3.148312E-11 |
| 66 | -1.010701E-07 | -1.010700E-07 | -6.737996E-08 | -2.887698E-08 | -7.218931E-09 | -8.020901E-10 | 6.077563E-12 |

| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
|---|---|---|---|---|---|---|---|
| 65 | -3.148401E-10 | -1.416785E-09 | -3.778097E-09 | -6.611671E-09 | -7.934015E-09 | -6.611686E-09 | -3.778172E-09 |
| 66 | 6.077587E-11 | 2.734916E-10 | 7.293109E-10 | 1.276294E-09 | 1.531554E-09 | 1.276301E-09 | 7.293156E-10 |

| Surface | $x^4y^{16}$ | $x^2y^{18}$ | $x^0y^{20}$ |
|---|---|---|---|
| 65 | -1.416923E-09 | -3.150347E-10 | -3.169207E-11 |
| 66 | 2.735008E-10 | 6.083288E-11 | 6.085143E-12 |

FIG. 26D

| Surface | X (mm) | Y (mm) | Sag (mm) |
|---|---|---|---|
| 65 | 3.000000 | 1.000000 | 0.005065 |
| 65 | -1.000000 | 3.000000 | 0.002879 |
| 66 | 3.000000 | 1.000000 | 0.754878 |
| 66 | -1.000000 | 3.000000 | 0.754641 |

FIG. 26E

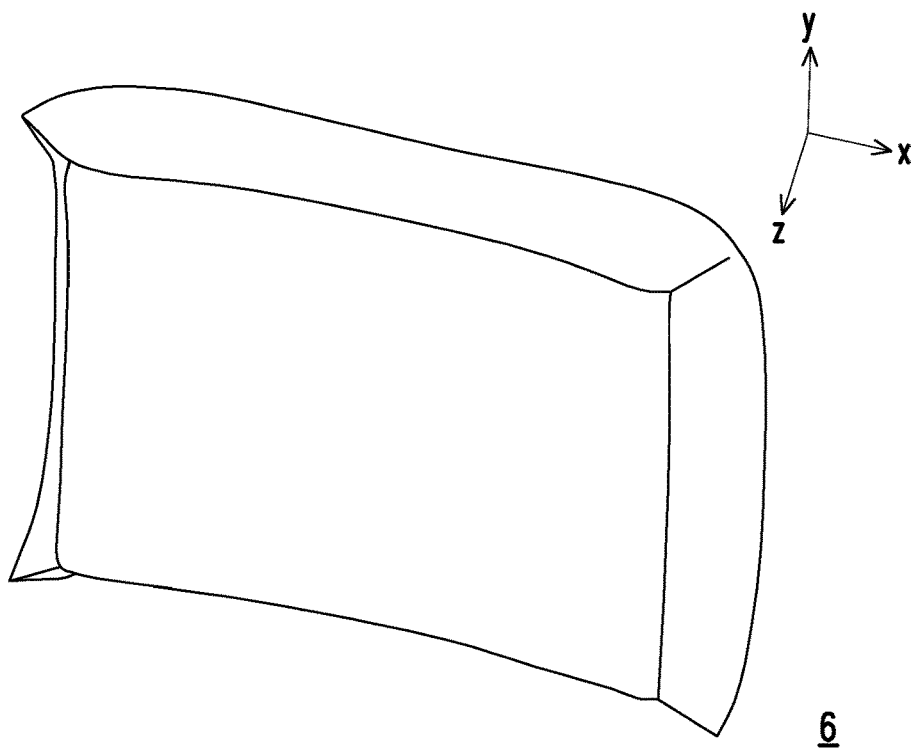
FIG. 27C
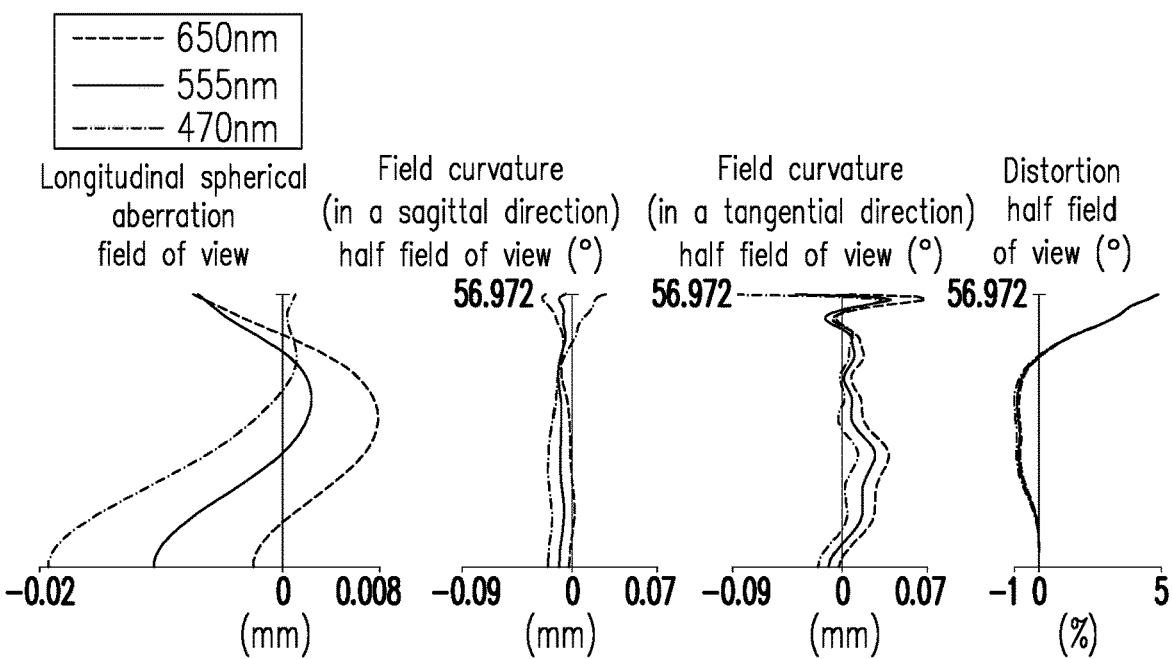
FIG. 28A
FIG. 28B
FIG. 28C
FIG. 28D

| Sixth embodiment |||||||
|---|---|---|---|---|---|---|
| Effective focal length (EFL)= 3.235 mm, half field of view (HFOV)= 56.972°, system length (TTL)= 7.076 mm, F-number (Fno)= 2.241, image height (ImgH)= 5.233 mm. |||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -11.426 | 0.510 | 1.640 | 23.529 | -7.930 |
| | Image-side surface 16 | 9.412 | 0.155 | | | |
| Second lens element 2 | Object-side surface 25 | 2.110 | 0.564 | 1.661 | 20.373 | 9.052 |
| | Image-side surface 26 | 2.898 | 0.238 | | | |
| Aperture 0 | | Infinity | 0.024 | | | |
| Third lens element 3 | Object-side surface 35 | 17.485 | 0.865 | 1.535 | 55.690 | 3.511 |
| | Image-side surface 36 | -2.075 | 0.381 | | | |
| Fourth lens element 4 | Object-side surface 45 | -10.166 | 0.394 | 1.671 | 19.243 | -9.108 |
| | Image-side surface 46 | 15.951 | 0.309 | | | |
| Fifth lens element 5 | Object-side surface 55 | -2.565 | 1.001 | 1.535 | 55.690 | 2.812 |
| | Image-side surface 56 | -1.079 | 0.087 | | | |
| Seventh lens element 7 | Object-side surface 75 | 10.019 | 0.842 | 1.535 | 55.690 | 61.869 |
| | Image-side surface 76 | 13.928 | 0.080 | | | |
| Sixth lens element 6 | Object-side surface 65 | 4.323 | 0.417 | 1.642 | 22.409 | -3.174 |
| | Image-side surface 66 | 1.340 | 0.850 | | | |
| Filter 9 | Object-side surface 95 | Infinity | 0.210 | 1.517 | 64.167 | |
| | Image-side surface 96 | Infinity | 0.149 | | | |
| | Image plane 99 | Infinity | 0.000 | | | |

FIG. 29

| Surface | K | $a_2$ | $a_4$ | $a_6$ | $a_8$ |
|---|---|---|---|---|---|
| 15 | 0.000000E+00 | 0.000000E+00 | 7.812485E-02 | -4.093725E-02 | 1.731649E-02 |
| 16 | 0.000000E+00 | 0.000000E+00 | 1.052915E-01 | -1.171704E-01 | 7.229857E-02 |
| 25 | 0.000000E+00 | 0.000000E+00 | 2.110110E-03 | -7.949843E-02 | 3.285124E-02 |
| 26 | 7.807822E+00 | 0.000000E+00 | -1.631989E-02 | -7.179355E-02 | 2.134098E-01 |
| 35 | 0.000000E+00 | 0.000000E+00 | -1.453482E-02 | -4.366110E-02 | 1.973457E-01 |
| 36 | 0.000000E+00 | 0.000000E+00 | -7.096103E-02 | 3.565543E-02 | -1.129530E-01 |
| 45 | 0.000000E+00 | 0.000000E+00 | -1.563348E-01 | 9.718156E-02 | -7.978549E-02 |
| 46 | 0.000000E+00 | 0.000000E+00 | -1.196942E-01 | 8.119487E-02 | -3.112391E-02 |
| 55 | 0.000000E+00 | 0.000000E+00 | -1.740657E-02 | -2.256112E-02 | 1.270712E-01 |
| 56 | -1.821137E+00 | 0.000000E+00 | -3.786979E-02 | 2.753945E-02 | -3.676032E-02 |
| 75 | 0.000000E+00 | 0.000000E+00 | -4.874052E-02 | 6.381414E-02 | -3.636409E-02 |
| 76 | 0.000000E+00 | 0.000000E+00 | -2.242514E-02 | 2.377683E-02 | -9.545373E-03 |
| Surface | $a_{10}$ | $a_{12}$ | $a_{14}$ | $a_{16}$ | $a_{18}$ |
| 15 | -5.164050E-03 | 1.006898E-03 | -1.132771E-04 | 5.614402E-06 | |
| 16 | -2.993538E-02 | 8.464931E-03 | -1.459403E-03 | 1.150080E-04 | |
| 25 | -6.076523E-03 | 3.202750E-03 | -1.650019E-03 | 3.184887E-04 | |
| 26 | -7.294183E-01 | 1.375812E+00 | -1.374293E+00 | 5.645153E-01 | |
| 35 | -8.947539E-01 | 2.162387E+00 | -2.719612E+00 | 1.368379E+00 | |
| 36 | 2.103942E-01 | -2.797733E-01 | 1.923353E-01 | -5.657741E-02 | |
| 45 | 7.151589E-02 | -4.441239E-02 | 1.578654E-02 | -2.503302E-03 | |
| 46 | 9.129520E-03 | -2.326744E-03 | 4.610232E-04 | -4.838351E-05 | |
| 55 | -1.296388E-01 | 7.050721E-02 | -2.310524E-02 | 4.533701E-03 | -4.855403E-04 |
| 56 | 4.858688E-02 | -3.594166E-02 | 1.518745E-02 | -3.648188E-03 | 4.636135E-04 |
| 75 | 1.208948E-02 | -2.631428E-03 | 3.766132E-04 | -3.387816E-05 | 1.725834E-06 |
| 76 | 1.923250E-03 | -2.239797E-04 | 1.553142E-05 | -6.177029E-07 | 1.242634E-08 |

FIG. 30A

| Surface | $a_{20}$ |
|---|---|
| 15 | |
| 16 | |
| 25 | |
| 26 | |
| 35 | |
| 36 | |
| 45 | |
| 46 | |
| 55 | 2.136383E-05 |
| 56 | -2.422450E-05 |
| 75 | -3.778569E-08 |
| 76 | -8.725615E-11 |

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 1.093939E-06 | -1.560019E-05 | 8.395482E-03 | 1.678837E-02 | 8.399820E-03 | -2.341956E-02 |
| 66 | -3.894385E+00 | -1.741420E-05 | 1.371243E-05 | -4.533886E-03 | -9.019573E-03 | -4.574357E-03 | -7.530324E-03 |

| Surface | $x^4y^2$ | $x^2y^4$ | $x^0y^6$ | $x^8y^0$ | $x^6y^2$ | $x^4y^4$ | $x^2y^6$ |
|---|---|---|---|---|---|---|---|
| 65 | -7.025872E-02 | -7.025878E-02 | -2.341937E-02 | 6.853321E-03 | 2.741328E-02 | 4.111992E-02 | 2.741327E-02 |
| 66 | -2.258974E-02 | -2.258949E-02 | -7.532616E-03 | 2.428547E-03 | 9.714208E-03 | 1.457133E-02 | 9.714246E-03 |

| Surface | $x^0y^8$ | $x^{10}y^0$ | $x^8y^2$ | $x^6y^4$ | $x^4y^6$ | $x^2y^8$ | $x^0y^{10}$ |
|---|---|---|---|---|---|---|---|
| 65 | 6.853308E-03 | -9.742742E-04 | -9.742743E-03 | -9.742744E-03 | -4.871371E-03 | -4.871374E-03 | -9.742804E-04 |
| 66 | 2.428594E-03 | -3.581828E-04 | -3.581825E-03 | -3.581825E-03 | -1.790913E-03 | -1.790912E-03 | -3.581842E-04 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | 7.618508E-05 | 4.571104E-04 | 1.523701E-03 | 1.142776E-03 | 1.142776E-03 | 4.571100E-04 | 7.618402E-05 |
| 66 | 3.050831E-05 | 1.830499E-04 | 6.101664E-04 | 4.576248E-04 | 4.576247E-04 | 1.830500E-04 | 3.050825E-05 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | -3.142349E-06 | -2.199645E-05 | -1.099823E-04 | -1.099823E-04 | -6.598936E-05 | -6.598938E-05 | -2.199650E-05 |
| 66 | -1.583854E-06 | -1.108697E-05 | -5.543486E-05 | -5.543486E-05 | -3.326092E-05 | -3.326092E-05 | -1.108696E-05 |

| Surface | $x^0y^{14}$ | $x^{16}y^0$ | $x^{14}y^2$ | $x^{12}y^4$ | $x^{10}y^6$ | $x^8y^8$ | $x^6y^{10}$ |
|---|---|---|---|---|---|---|---|
| 65 | -3.142490E-06 | 4.696637E-08 | 3.757300E-07 | 1.315055E-06 | 2.630109E-06 | 3.287636E-06 | 2.630106E-06 |
| 66 | -1.583716E-06 | 4.929187E-08 | 3.943352E-07 | 1.380173E-06 | 2.760347E-06 | 3.450433E-06 | 2.760347E-06 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | 1.315048E-06 | 3.757174E-07 | 4.693102E-08 | 8.389316E-10 | 7.550255E-09 | 3.020097E-08 | 7.046889E-08 |
| 66 | 1.380173E-06 | 3.943346E-07 | 4.929185E-08 | -8.409840E-10 | -7.568842E-09 | -3.027536E-08 | -7.064249E-08 |

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | 1.057033E-07 | 1.057031E-07 | 7.046836E-08 | 3.019988E-08 | 7.548205E-09 | 8.328056E-10 | -2.794484E-11 |
| 66 | -1.059637E-07 | -1.059637E-07 | -7.064247E-08 | -3.027528E-08 | -7.568711E-09 | -8.409671E-10 | 6.001343E-12 |

| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
|---|---|---|---|---|---|---|---|
| 65 | -2.794655E-10 | -1.257600E-09 | -3.353606E-09 | -5.868818E-09 | -7.042589E-09 | -5.868858E-09 | -3.353705E-09 |
| 66 | 6.001460E-11 | 2.700663E-10 | 7.201771E-10 | 1.260310E-09 | 1.512373E-09 | 1.260311E-09 | 7.201799E-10 |

| Surface | $x^4y^{16}$ | $x^2y^{18}$ | $x^0y^{20}$ |
|---|---|---|---|
| 65 | -1.257803E-09 | -2.798178E-10 | -2.902347E-11 |
| 66 | 2.700742E-10 | 6.002520E-11 | 6.005892E-12 |

FIG. 30D

| Surface | X (mm) | Y (mm) | Sag (mm) |
|---|---|---|---|
| 65 | 3.000000 | 1.000000 | -0.081260 |
| 65 | -1.000000 | 3.000000 | -0.090647 |
| 66 | 3.000000 | 1.000000 | 0.754426 |
| 66 | -1.000000 | 3.000000 | 0.750722 |

FIG. 30E

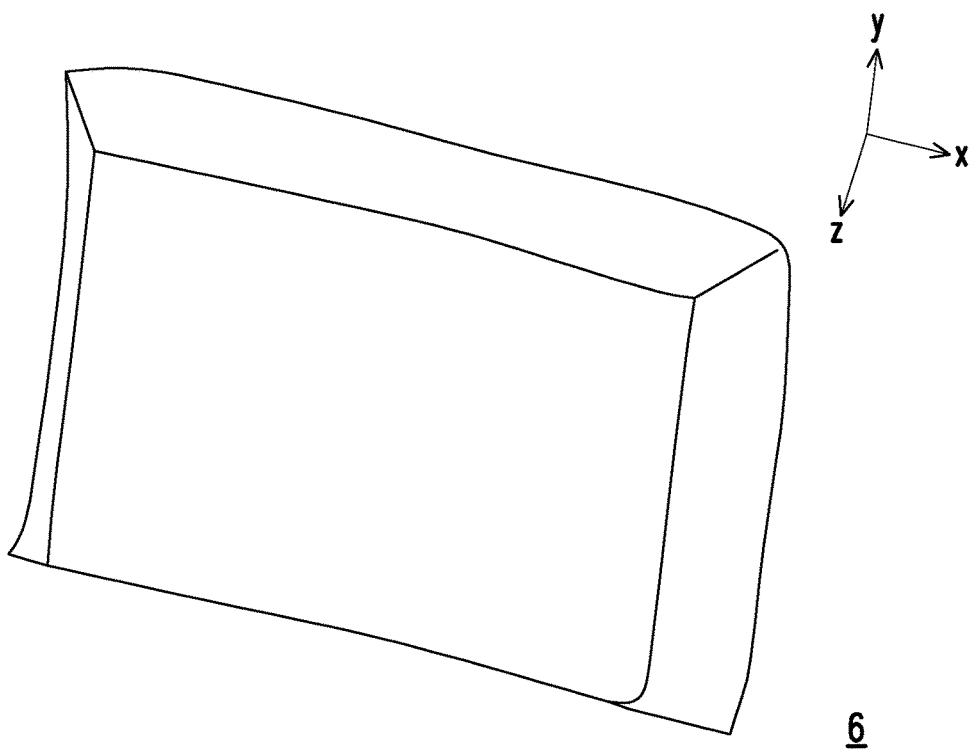
FIG. 31C
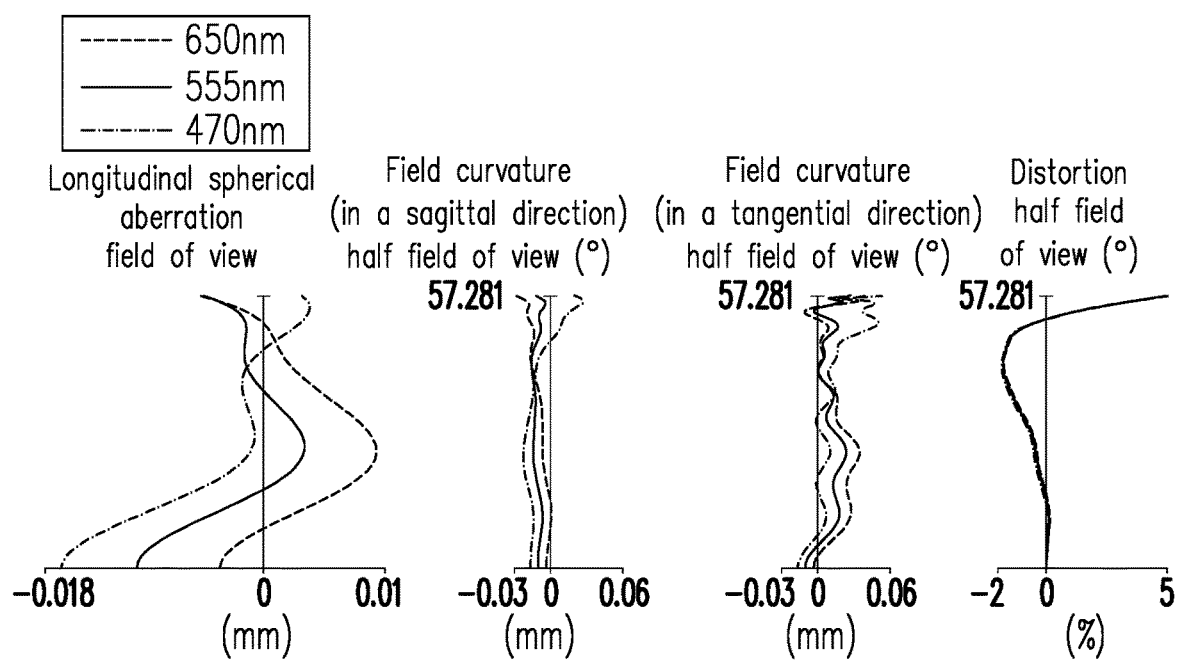
FIG. 32A
FIG. 32B
FIG. 32C
FIG. 32D

| Seventh embodiment | | | | | | |
|---|---|---|---|---|---|---|
| Effective focal length (EFL)= 3.197 mm, half field of view (HFOV)= 57.281°, system length (TTL)= 7.095 mm, F-number (Fno)= 2.241, image height (ImgH)= 5.233 mm. | | | | | | |
| Element | Surface | Radius (mm) | Thickness (mm) | Refractive index | Abbe number | Focal length (mm) |
| Object | | Infinity | Infinity | | | |
| First lens element 1 | Object-side surface 15 | -13.002 | 0.712 | 1.640 | 23.529 | -9.340 |
| | Image-side surface 16 | 11.453 | 0.081 | | | |
| Second lens element 2 | Object-side surface 25 | 2.135 | 0.453 | 1.661 | 20.373 | 9.796 |
| | Image-side surface 26 | 2.902 | 0.197 | | | |
| Aperture 0 | | Infinity | 0.017 | | | |
| Third lens element 3 | Object-side surface 35 | 41.256 | 0.871 | 1.535 | 55.690 | 3.467 |
| | Image-side surface 36 | -1.934 | 0.389 | | | |
| Fourth lens element 4 | Object-side surface 45 | -6.079 | 0.350 | 1.671 | 19.243 | -7.743 |
| | Image-side surface 46 | 39.182 | 0.218 | | | |
| Fifth lens element 5 | Object-side surface 55 | -2.680 | 1.212 | 1.535 | 55.690 | 2.735 |
| | Image-side surface 56 | -1.098 | 0.050 | | | |
| Seventh lens element 7 | Object-side surface 75 | 7.651 | 0.474 | 1.535 | 55.690 | 59.572 |
| | Image-side surface 76 | 9.842 | 0.187 | | | |
| Sixth lens element 6 | Object-side surface 65 | 4.301 | 0.591 | 1.642 | 22.409 | -3.346 |
| | Image-side surface 66 | 1.363 | 1.000 | | | |
| Filter 9 | Object-side surface 95 | Infinity | 0.210 | 1.517 | 64.167 | |
| | Image-side surface 96 | Infinity | 0.084 | | | |
| | Image plane 99 | Infinity | 0.000 | | | |

FIG. 33

| Surface | K | $a_2$ | $a_4$ | $a_6$ | $a_8$ |
|---|---|---|---|---|---|
| 15 | 0.000000E+00 | 0.000000E+00 | 5.904903E-02 | -2.576572E-02 | 9.305362E-03 |
| 16 | 0.000000E+00 | 0.000000E+00 | 1.399691E-01 | -2.127142E-01 | 1.820961E-01 |
| 25 | 0.000000E+00 | 0.000000E+00 | 5.471391E-02 | -1.745621E-01 | 5.674547E-02 |
| 26 | 8.228393E+00 | 0.000000E+00 | -1.750475E-02 | -6.076342E-02 | 9.169365E-02 |
| 35 | 0.000000E+00 | 0.000000E+00 | -1.966158E-02 | -2.399292E-02 | 2.195356E-02 |
| 36 | 0.000000E+00 | 0.000000E+00 | -5.964197E-02 | -3.264810E-02 | 1.218804E-01 |
| 45 | 0.000000E+00 | 0.000000E+00 | -1.719153E-01 | 1.034253E-01 | -9.141018E-02 |
| 46 | 0.000000E+00 | 0.000000E+00 | -1.323834E-01 | 8.046953E-02 | -1.153020E-02 |
| 55 | 0.000000E+00 | 0.000000E+00 | -1.400693E-02 | -3.063109E-02 | 1.327813E-01 |
| 56 | -1.793688E+00 | 0.000000E+00 | -2.320132E-02 | 1.120769E-02 | -2.878445E-02 |
| 75 | 0.000000E+00 | 0.000000E+00 | -4.436802E-02 | 5.094372E-02 | -2.413701E-02 |
| 76 | 0.000000E+00 | 0.000000E+00 | -1.699384E-02 | 1.774377E-02 | -6.187830E-03 |
| Surface | $a_{10}$ | $a_{12}$ | $a_{14}$ | $a_{16}$ | $a_{18}$ |
| 15 | -2.360824E-03 | 3.994163E-04 | -4.069235E-05 | 1.933334E-06 | |
| 16 | -9.971058E-02 | 3.455293E-02 | -6.875364E-03 | 6.018353E-04 | |
| 25 | 9.424728E-02 | -1.335491E-01 | 7.305920E-02 | -1.487925E-02 | |
| 26 | -5.374902E-01 | 1.584731E+00 | -2.232234E+00 | 1.241607E+00 | |
| 35 | -1.250790E-01 | 3.409780E-01 | -5.508736E-01 | 3.842341E-01 | |
| 36 | -2.662935E-01 | 2.623203E-01 | -1.331622E-01 | 2.230347E-02 | |
| 45 | 9.611197E-02 | -7.099603E-02 | 3.016317E-02 | -5.668921E-03 | |
| 46 | -7.616878E-03 | 3.949928E-03 | -7.025182E-04 | 3.968035E-05 | |
| 55 | -1.221400E-01 | 5.940470E-02 | -1.734670E-02 | 3.012744E-03 | -2.796820E-04 |
| 56 | 4.400896E-02 | -3.363735E-02 | 1.453701E-02 | -3.548736E-03 | 4.545183E-04 |
| 75 | 6.366003E-03 | -1.071049E-03 | 1.179316E-04 | -8.223215E-06 | 3.288324E-07 |
| 76 | 6.640282E-04 | 6.376662E-05 | -2.389369E-05 | 2.544335E-06 | -1.240695E-07 |

FIG. 34A

| Surface | $a_{20}$ |
|---|---|
| 15 | |
| 16 | |
| 25 | |
| 26 | |
| 35 | |
| 36 | |
| 45 | |
| 46 | |
| 55 | 1.015087E-05 |
| 56 | -2.372873E-05 |
| 75 | -5.726401E-09 |
| 76 | 2.357016E-09 |

FIG. 34B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 2.928930E-05 | -4.869668E-05 | 9.045268E-03 | 1.808314E-02 | 9.092710E-03 | -2.349553E-02 |
| 66 | -4.078978E+00 | 2.055182E-05 | 1.300510E-04 | -2.996964E-03 | -5.956953E-03 | -2.991267E-03 | -7.308431E-03 |
| Surface | | $x^4y^2$ | $x^2y^4$ | $x^0y^6$ | $x^6y^2$ | $x^4y^4$ | $x^2y^6$ |
| 65 | | -7.048693E-02 | -2.349262E-02 | 6.792843E-03 | 2.717135E-02 | 4.075701E-02 | 2.717133E-02 |
| 66 | | -2.192437E-02 | -7.308604E-03 | 2.311849E-03 | 9.247423E-03 | 1.387116E-02 | 9.247478E-03 |
| Surface | | $x^0y^8$ | $x^8y^2$ | $x^6y^4$ | $x^4y^6$ | $x^2y^8$ | $x^0y^{10}$ |
| 65 | | 6.792918E-03 | -9.535012E-04 | -4.767508E-03 | -9.535018E-03 | -9.535020E-03 | -4.767511E-03 | -9.535023E-04 |
| 66 | | 2.311852E-03 | -3.391902E-04 | -1.695950E-03 | -3.391899E-03 | -3.391896E-03 | -1.695942E-03 | -3.391896E-04 |
| Surface | | $x^{10}y^2$ | $x^8y^4$ | $x^6y^6$ | $x^4y^8$ | $x^2y^{10}$ | $x^0y^{12}$ |
| 65 | | 7.334062E-05 | 4.400435E-04 | 1.100109E-03 | 1.466811E-03 | 1.100108E-03 | 4.400432E-04 | 7.334027E-05 |
| 66 | | 2.872790E-05 | 1.723674E-04 | 4.309186E-04 | 5.745583E-04 | 4.309190E-04 | 1.723682E-04 | 2.872791E-05 |
| Surface | | $x^{12}y^2$ | $x^{10}y^4$ | $x^8y^6$ | $x^6y^8$ | $x^4y^{10}$ | $x^2y^{12}$ |
| 65 | | -2.935791E-06 | -2.055056E-05 | -6.165168E-05 | -1.027528E-04 | -1.027528E-04 | -6.151173E-05 | -2.055056E-05 |
| 66 | | -1.481000E-06 | -1.036700E-05 | -3.110099E-05 | -5.183498E-05 | -5.183496E-05 | -3.110094E-05 | -1.036692E-05 |
| Surface | | $x^{14}y^2$ | $x^{12}y^4$ | $x^{10}y^6$ | $x^8y^8$ | $x^6y^{10}$ |
| 65 | | 1.084840E-06 | 3.874485E-08 | 3.099564E-07 | 1.084846E-06 | 2.169692E-06 | 2.712113E-06 | 2.169687E-06 |
| 66 | | 1.282089E-06 | 4.578870E-08 | 3.663097E-07 | 1.282084E-06 | 2.564168E-06 | 3.205210E-06 | 2.564170E-06 |
| Surface | | $x^{16}y^2$ | $x^{14}y^4$ | $x^{12}y^6$ |
| 65 | | -2.935791E-06 | 3.099738E-07 | 3.874853E-08 | 1.007219E-09 | 9.064657E-09 | 3.625848E-08 | 8.460303E-08 |
| 66 | | 1.282089E-06 | 3.663187E-07 | 4.578883E-08 | -7.780480E-10 | -7.002428E-09 | -2.800971E-08 | -6.535598E-08 |

FIG. 34C

| Surface | $x^{10}y^{8}$ | $x^{8}y^{10}$ | $x^{6}y^{12}$ | $x^{4}y^{14}$ | $x^{2}y^{16}$ | $x^{0}y^{18}$ | $x^{20}y^{0}$ |
|---|---|---|---|---|---|---|---|
| 65 | 1.269045E-07 | 1.269041E-07 | 8.460242E-08 | 3.625860E-08 | 9.069633E-09 | 1.006375E-09 | -2.937731E-11 |
| 66 | -9.803395E-08 | -9.803388E-08 | -6.535571E-08 | -2.800917E-08 | -7.001565E-09 | -7.780270E-10 | 5.558776E-12 |
| Surface | $x^{18}y^{2}$ | $x^{16}y^{4}$ | $x^{14}y^{6}$ | $x^{12}y^{8}$ | $x^{10}y^{10}$ | $x^{8}y^{12}$ | $x^{6}y^{14}$ |
| 65 | -2.938077E-10 | -1.322153E-09 | -3.525755E-09 | -6.170082E-09 | -7.404109E-09 | -6.170055E-09 | -3.525680E-09 |
| 66 | 5.558816E-11 | 2.501468E-10 | 6.670583E-10 | 1.167352E-09 | 1.400826E-09 | 1.167364E-09 | 6.670856E-10 |
| Surface | $x^{4}y^{16}$ | $x^{2}y^{18}$ | $x^{0}y^{20}$ | | | | |
| 65 | -1.321642E-09 | -2.920359E-10 | -2.869235E-11 | | | | |
| 66 | 2.502017E-10 | 5.568712E-11 | 5.563002E-12 | | | | |

FIG. 34D

| Surface | X (mm) | Y (mm) | Sag (mm) |
|---|---|---|---|
| 65 | 3.000000 | 1.000000 | -0.056327 |
| 65 | -1.000000 | 3.000000 | -0.047674 |
| 66 | 3.000000 | 1.000000 | 0.779399 |
| 66 | -1.000000 | 3.000000 | 0.781019 |

FIG. 34E

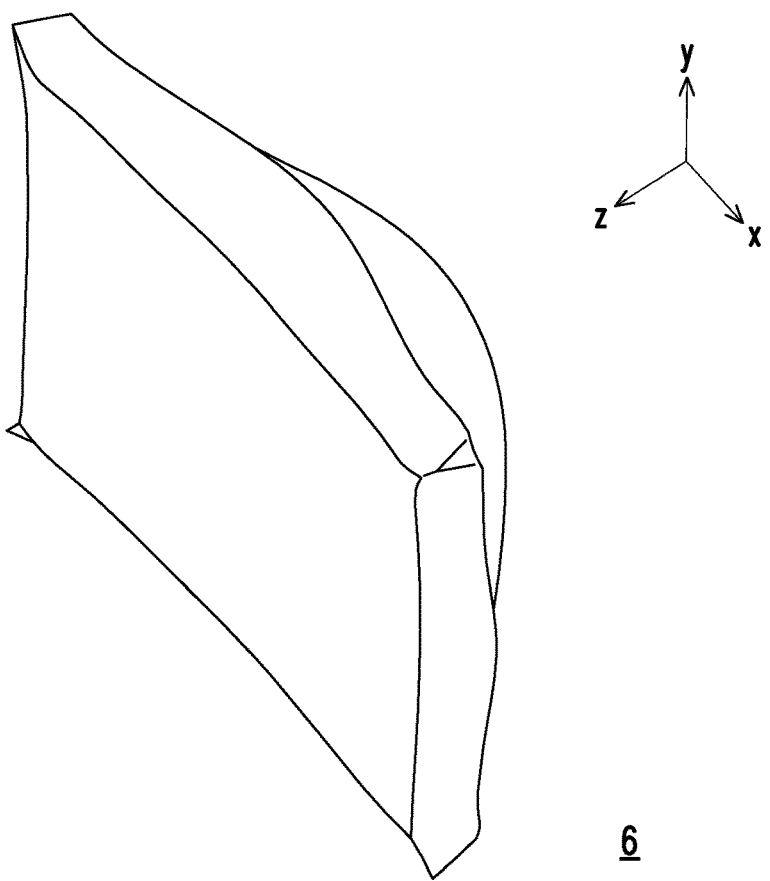
FIG. 35C
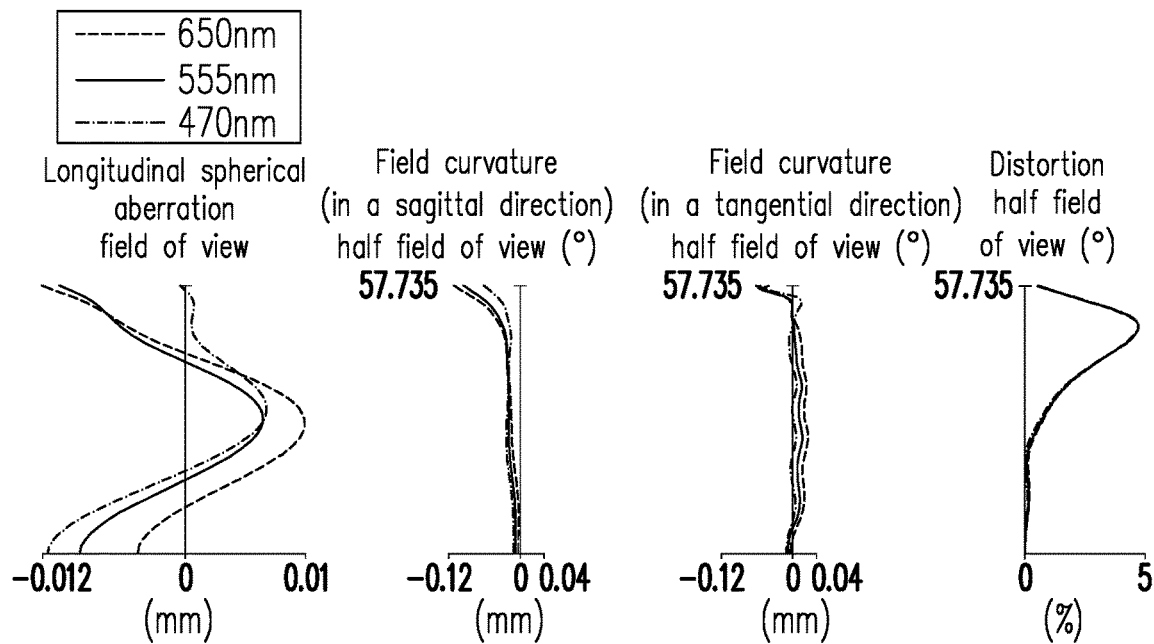
FIG. 36A
FIG. 36B
FIG. 36C
FIG. 36D

| Eighth embodiment |||||||
|---|---|---|---|---|---|---|
| Effective focal length (EFL)= 3.281mm, half field of view (HFOV)= 57.735°, system length (TTL)= 7.143 mm, F-number (Fno)= 2.241 , image height (ImgH)= 5.233 mm. |||||||
| Element | Surface | Radius (mm) | Thickness (mm) | Refractive index | Abbe number | Focal length (mm) |
| Object | | Infinity | Infinity | | | |
| First lens element 1 | Object-side surface 15 | 463.232 | 0.621 | 1.640 | 23.529 | -10.297 |
| | Image-side surface 16 | 6.540 | 0.157 | | | |
| Second lens element 2 | Object-side surface 25 | 2.042 | 0.323 | 1.661 | 20.373 | 11.139 |
| | Image-side surface 26 | 2.637 | 0.256 | | | |
| Aperture 0 | | Infinity | 0.016 | | | |
| Third lens element 3 | Object-side surface 35 | 26.637 | 0.958 | 1.535 | 55.690 | 3.347 |
| | Image-side surface 36 | -1.902 | 0.350 | | | |
| Fourth lens element 4 | Object-side surface 45 | -6.680 | 0.481 | 1.671 | 19.243 | -7.499 |
| | Image-side surface 46 | 21.838 | 0.308 | | | |
| Fifth lens element 5 | Object-side surface 55 | -2.539 | 1.073 | 1.535 | 55.690 | 2.853 |
| | Image-side surface 56 | -1.096 | 0.050 | | | |
| Seventh lens element 7 | Object-side surface 75 | 9.029 | 0.509 | 1.535 | 55.690 | 81.117 |
| | Image-side surface 76 | 11.168 | 0.125 | | | |
| Sixth lens element 6 | Object-side surface 65 | 4.394 | 0.659 | 1.642 | 22.409 | -3.399 |
| | Image-side surface 66 | 1.380 | 0.900 | | | |
| Filter 9 | Object-side surface 95 | Infinity | 0.210 | 1.517 | 64.167 | |
| | Image-side surface 96 | Infinity | 0.147 | | | |
| | Image plane 99 | Infinity | 0.000 | | | |

FIG. 37

| Surface | K | $a_2$ | $a_4$ | $a_6$ | $a_8$ |
|---|---|---|---|---|---|
| 15 | 0.000000E+00 | 0.000000E+00 | 5.526965E-02 | -2.413529E-02 | 8.877844E-03 |
| 16 | 0.000000E+00 | 0.000000E+00 | 1.110283E-01 | -1.220632E-01 | 6.358712E-02 |
| 25 | 0.000000E+00 | 0.000000E+00 | 4.485019E-02 | -1.068419E-01 | 1.545725E-02 |
| 26 | 6.736692E+00 | 0.000000E+00 | -5.601992E-04 | -5.296466E-02 | -9.566917E-02 |
| 35 | 0.000000E+00 | 0.000000E+00 | -2.088223E-02 | 8.330590E-03 | -2.470760E-01 |
| 36 | 0.000000E+00 | 0.000000E+00 | -7.002698E-02 | 2.615242E-02 | -6.271670E-02 |
| 45 | 0.000000E+00 | 0.000000E+00 | -1.520967E-01 | 9.626658E-02 | -8.174802E-02 |
| 46 | 0.000000E+00 | 0.000000E+00 | -1.112474E-01 | 7.402063E-02 | -3.071838E-02 |
| 75 | 0.000000E+00 | 0.000000E+00 | -5.870447E-02 | 6.627422E-02 | -3.363956E-02 |
| 76 | 0.000000E+00 | 0.000000E+00 | -2.092093E-02 | 2.118472E-02 | -7.993148E-03 |
| 65 | 0.000000E+00 | 0.000000E+00 | 8.144990E-03 | -2.068399E-02 | 5.683449E-03 |
| 66 | -4.148797E+00 | 0.000000E+00 | -7.478113E-03 | -3.279383E-03 | 1.136156E-03 |
| Surface | $a_{10}$ | $a_{12}$ | $a_{14}$ | $a_{16}$ | $a_{18}$ |
| 15 | -2.386811E-03 | 4.460326E-04 | -5.047251E-05 | 2.598919E-06 | |
| 16 | -1.800909E-02 | 2.558428E-03 | -9.922536E-05 | -7.785239E-06 | |
| 25 | -1.733575E-02 | 4.733622E-02 | -2.534796E-02 | 4.128240E-03 | |
| 26 | 2.712274E-01 | -5.312021E-01 | 5.521656E-01 | -2.396399E-01 | |
| 35 | 1.074184E+00 | -2.544332E+00 | 3.002640E+00 | -1.394497E+00 | |
| 36 | 1.095506E-01 | -1.483375E-01 | 9.610600E-02 | -2.669326E-02 | |
| 45 | 8.143644E-02 | -5.392322E-02 | 1.869739E-02 | -2.666966E-03 | |
| 46 | 1.104612E-02 | -3.187987E-03 | 5.730393E-04 | -4.666057E-05 | |
| 75 | 1.000793E-02 | -1.954170E-03 | 2.507051E-04 | -2.015814E-05 | 9.163716E-07 |
| 76 | 1.466738E-03 | -1.453621E-04 | 7.232270E-06 | -9.125005E-08 | -5.954834E-09 |
| 65 | -7.399352E-04 | 4.983638E-05 | -1.402733E-06 | -1.892483E-08 | 2.125271E-09 |
| 66 | -1.646415E-04 | 1.353598E-05 | -6.688722E-07 | 1.942073E-08 | -2.995282E-10 |

FIG. 38A

| Surface | $a_{20}$ |
|---|---|
| 15 | |
| 16 | |
| 25 | |
| 26 | |
| 35 | |
| 36 | |
| 45 | |
| 46 | |
| 75 | -1.791814E-08 |
| 76 | 1.839508E-10 |
| 65 | -3.729563E-11 |
| 66 | 1.830286E-12 |

FIG. 38B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 55 | 0.000000E+00 | 1.394457E-04 | -4.072470E-04 | -1.853676E-02 | -3.436780E-02 | -1.961298E-02 | -1.810866E-02 |
| 56 | -1.771236E+00 | 5.262861E-06 | -1.423842E-04 | -3.491818E-02 | -6.762389E-02 | -3.560599E-02 | 2.804937E-02 |
| Surface | | $x^4y^2$ | $x^2y^4$ | $x^8y^0$ | $x^6y^2$ | $x^4y^4$ | $x^2y^6$ |
| 55 | | -5.432167E-02 | -1.786661E-02 | 1.066557E-01 | 4.265819E-01 | 6.393767E-01 | 4.263208E-01 |
| 56 | | 8.344806E-02 | 2.803936E-02 | -3.762193E-02 | -1.503876E-01 | -2.254963E-01 | -1.512092E-01 |
| Surface | | $x^0y^8$ | $x^{10}y^0$ | $x^8y^2$ | $x^6y^4$ | $x^4y^6$ | $x^2y^8$ |
| 55 | | -1.079141E-01 | -5.395522E-01 | -1.079124E+00 | -1.079347E+00 | -5.398655E-01 | -1.076820E-01 |
| 56 | | 4.286295E-02 | 2.143307E-01 | 4.288394E-01 | 4.286468E-01 | 2.142953E-01 | 4.291842E-02 |
| Surface | | $x^{10}y^2$ | $x^8y^4$ | $x^6y^6$ | $x^4y^8$ | $x^2y^{10}$ | $x^0y^{12}$ |
| 55 | | 3.554180E-01 | 1.184660E+00 | 8.885984E-01 | 8.884282E-01 | 3.554867E-01 | 5.934997E-02 |
| 56 | | -1.664807E-01 | -5.548878E-01 | -4.161541E-01 | -4.162133E-01 | -1.662845E-01 | -2.771611E-02 |
| Surface | | $x^{12}y^2$ | $x^{10}y^4$ | $x^8y^6$ | $x^6y^8$ | $x^4y^{10}$ | $x^2y^{12}$ |
| 55 | | -1.389569E-01 | -4.168293E-01 | -6.947453E-01 | -6.948009E-01 | -4.169095E-01 | -1.388650E-01 |
| 56 | | 7.297537E-02 | 2.189386E-01 | 3.648929E-01 | 3.648795E-01 | 2.188820E-01 | 7.312790E-02 |
| Surface | | $x^{16}y^0$ | $x^{14}y^2$ | $x^{12}y^4$ | $x^{10}y^6$ | $x^8y^8$ | $x^6y^{10}$ |
| 55 | | 4.040384E-03 | 3.231492E-02 | 1.131170E-01 | 2.262445E-01 | 2.828229E-01 | 2.262609E-01 |
| 56 | | -2.244473E-03 | -1.795616E-02 | -6.284593E-02 | -1.256922E-01 | -1.571160E-01 | -1.257157E-01 |
| Surface | | $x^2y^{14}$ | $x^0y^{16}$ | $x^{18}y^0$ | $x^{16}y^2$ | $x^{14}y^4$ | $x^{12}y^6$ |
| 55 | | 3.237972E-02 | 4.010525E-03 | -4.590395E-04 | -4.134084E-03 | -1.653467E-02 | -3.857873E-02 |
| 56 | | -1.792940E-02 | -2.242590E-03 | 2.561355E-04 | 2.305372E-03 | 9.220656E-03 | 2.151473E-02 |

FIG. 38C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 55 | -5.785481E-02 | -5.782284E-02 | -3.855971E-02 | -1.661958E-02 | -4.139186E-03 | -4.805959E-04 | 2.231679E-05 |
| 56 | 3.227406E-02 | 3.227167E-02 | 2.149812E-02 | 9.219066E-03 | 2.290860E-03 | 2.558362E-04 | -1.199231E-05 |

| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
|---|---|---|---|---|---|---|---|
| 55 | 2.241724E-04 | 1.007642E-03 | 2.684796E-03 | 4.692364E-03 | 5.632372E-03 | 4.706696E-03 | 2.670149E-03 |
| 56 | -1.199815E-04 | -5.402777E-04 | -1.440505E-03 | -2.519582E-03 | -3.021628E-03 | -2.519205E-03 | -1.437592E-03 |

| Surface | $x^4y^{16}$ | $x^2y^{18}$ | $x^0y^{20}$ |
|---|---|---|---|
| 55 | 1.049932E-03 | 2.196292E-04 | 2.797533E-05 |
| 56 | -5.329024E-04 | -1.263234E-04 | -1.235015E-05 |

FIG. 38D

| Surface | X (mm) | Y (mm) | Sag (mm) |
|---|---|---|---|
| 55 | 1.000000 | 0.500000 | -0.239737 |
| 55 | -0.500000 | 1.000000 | -0.240009 |
| 56 | 1.000000 | 0.500000 | -0.515104 |
| 56 | -0.500000 | 1.000000 | -0.515886 |

FIG. 38E

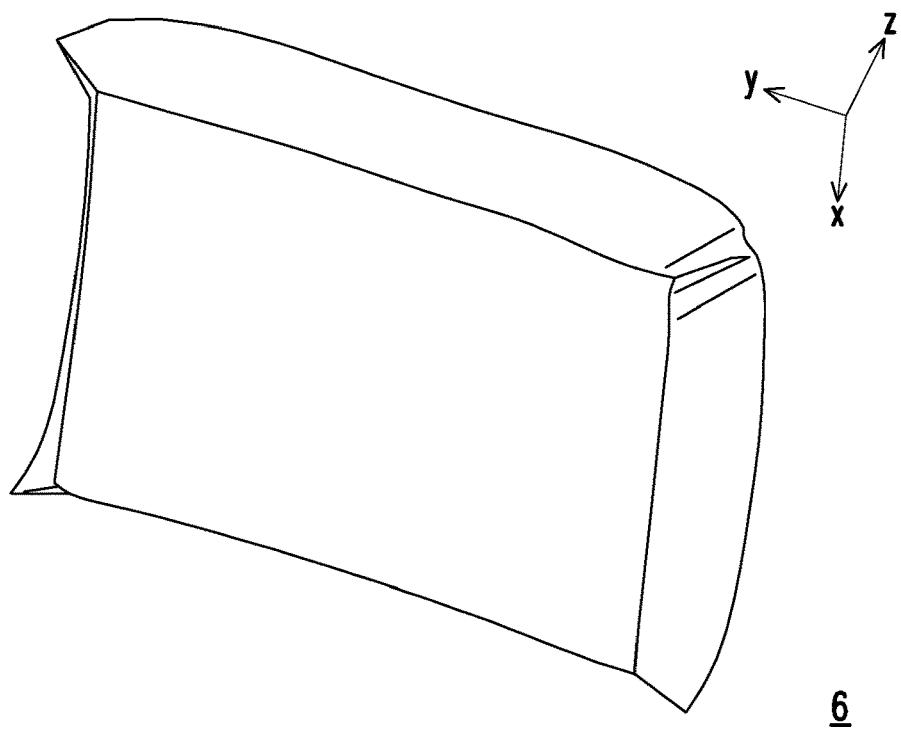
FIG. 39C
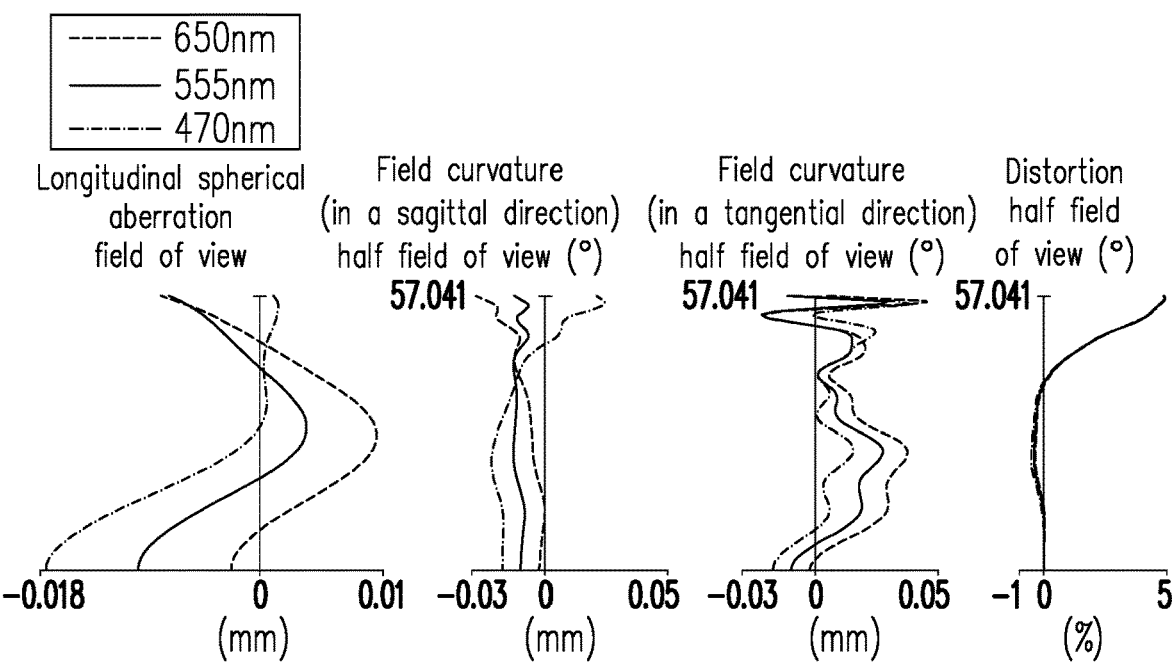
FIG. 40A
FIG. 40B
FIG. 40C
FIG. 40D

| Ninth embodiment |||||||
|---|---|---|---|---|---|---|
| Effective focal length (EFL)= 3.227mm, half field of view (HFOV)= 57.041°, system length (TTL)= 7.041 mm, F-number (Fno)= 2.241, image height (ImgH)= 5.233 mm. |||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -12.251 | 0.557 | 1.640 | 23.529 | -8.210 |
| | Image-side surface 16 | 9.482 | 0.133 | | | |
| Second lens element 2 | Object-side surface 25 | 2.051 | 0.476 | 1.661 | 20.373 | 9.101 |
| | Image-side surface 26 | 2.809 | 0.250 | | | |
| Aperture 0 | | Infinity | 0.025 | | | |
| Third lens element 3 | Object-side surface 35 | 20.866 | 0.862 | 1.535 | 55.690 | 3.592 |
| | Image-side surface 36 | -2.093 | 0.367 | | | |
| Fourth lens element 4 | Object-side surface 45 | -10.775 | 0.377 | 1.671 | 19.243 | -8.973 |
| | Image-side surface 46 | 14.150 | 0.295 | | | |
| Fifth lens element 5 | Object-side surface 55 | -2.594 | 1.081 | 1.535 | 55.690 | 2.692 |
| | Image-side surface 56 | -1.063 | 0.050 | | | |
| Seventh lens element 7 | Object-side surface 75 | 10.418 | 0.229 | 1.535 | 55.690 | 226.724 |
| | Image-side surface 76 | 11.306 | 0.050 | | | |
| Eighth lens element 8 | Object-side surface 85 | 10.425 | 0.256 | 1.535 | 55.690 | 219.026 |
| | Image-side surface 86 | 11.341 | 0.070 | | | |
| Sixth lens element 6 | Object-side surface 65 | 4.332 | 0.628 | 1.642 | 22.409 | -3.332 |
| | Image-side surface 66 | 1.358 | 1.000 | | | |
| Filter 9 | Object-side surface 95 | Infinity | 0.210 | 1.517 | 64.167 | |
| | Image-side surface 96 | Infinity | 0.126 | | | |
| | Image plane 99 | Infinity | 0.000 | | | |

FIG. 41

| Surface | K | $a_2$ | $a_4$ | $a_6$ | $a_8$ |
|---|---|---|---|---|---|
| 15 | 0.000000E+00 | 0.000000E+00 | 7.555571E-02 | -3.909974E-02 | 1.655147E-02 |
| 16 | 0.000000E+00 | 0.000000E+00 | 1.169522E-01 | -1.444140E-01 | 9.958929E-02 |
| 25 | 0.000000E+00 | 0.000000E+00 | 1.560843E-02 | -1.016196E-01 | 2.735084E-02 |
| 26 | 7.536305E+00 | 0.000000E+00 | -1.879661E-02 | -3.554854E-02 | -8.399509E-02 |
| 35 | 0.000000E+00 | 0.000000E+00 | -1.634732E-02 | -2.345682E-02 | 3.480574E-02 |
| 36 | 0.000000E+00 | 0.000000E+00 | -7.301663E-02 | 3.013325E-02 | -9.177506E-02 |
| 45 | 0.000000E+00 | 0.000000E+00 | -1.662868E-01 | 1.192604E-01 | -1.208607E-01 |
| 46 | 0.000000E+00 | 0.000000E+00 | -1.286816E-01 | 1.018153E-01 | -5.271764E-02 |
| 55 | 0.000000E+00 | 0.000000E+00 | -2.007518E-02 | -2.080934E-02 | 1.369390E-01 |
| 56 | -1.801318E+00 | 0.000000E+00 | -3.159308E-02 | 2.655745E-02 | -4.670106E-02 |
| 75 | 0.000000E+00 | 0.000000E+00 | -7.200332E-02 | 8.861640E-02 | -4.871888E-02 |
| 76 | 0.000000E+00 | 0.000000E+00 | -2.889096E-02 | 4.460360E-02 | -2.810501E-02 |
| 85 | 0.000000E+00 | 0.000000E+00 | 9.525172E-04 | 1.352317E-02 | -1.024836E-02 |
| 86 | 0.000000E+00 | 0.000000E+00 | -1.516594E-02 | 1.618574E-02 | -5.498392E-03 |
| Surface | $a_{10}$ | $a_{12}$ | $a_{14}$ | $a_{16}$ | $a_{18}$ |
| 15 | -4.944867E-03 | 9.690103E-04 | -1.102082E-04 | 5.540092E-06 | |
| 16 | -4.511799E-02 | 1.347415E-02 | -2.392236E-03 | 1.914272E-04 | |
| 25 | 2.731528E-02 | -2.820958E-02 | 1.175869E-02 | -1.880144E-03 | |
| 26 | 2.792642E-01 | -5.036304E-01 | 4.425702E-01 | -1.632839E-01 | |
| 35 | -1.723810E-01 | 4.268068E-01 | -5.955817E-01 | 3.314966E-01 | |
| 36 | 1.704583E-01 | -2.300816E-01 | 1.567207E-01 | -4.590293E-02 | |
| 45 | 1.175220E-01 | -7.249532E-02 | 2.421017E-02 | -3.463863E-03 | |
| 46 | 2.270502E-02 | -7.438033E-03 | 1.501092E-03 | -1.358864E-04 | |
| 55 | -1.480777E-01 | 8.550928E-02 | -2.989344E-02 | 6.288773E-03 | -7.266841E-04 |
| 56 | 5.988924E-02 | -4.239932E-02 | 1.741267E-02 | -4.109192E-03 | 5.162380E-04 |
| 75 | 1.570790E-02 | -3.288136E-03 | 4.482229E-04 | -3.813355E-05 | 1.832054E-06 |
| 76 | 9.512070E-03 | -1.948596E-03 | 2.467256E-04 | -1.883070E-05 | 7.938896E-07 |
| 85 | 3.283760E-03 | -5.936316E-04 | 6.378485E-05 | -4.017379E-06 | 1.366358E-07 |
| 86 | 5.930071E-04 | 4.451129E-05 | -1.751765E-05 | 1.792077E-06 | -8.298276E-08 |

FIG. 42A

| Surface | $a_{20}$ |
|---|---|
| 15 | |
| 16 | |
| 25 | |
| 26 | |
| 35 | |
| 36 | |
| 45 | |
| 46 | |
| 55 | 3.489244E-05 |
| 56 | -2.676567E-05 |
| 75 | -3.786320E-08 |
| 76 | -1.420556E-08 |
| 85 | -1.931789E-09 |
| 86 | 1.490858E-09 |

FIG. 42B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 1.183825E-05 | -3.474579E-05 | 7.253079E-03 | 1.450165E-02 | 7.278221E-03 | -2.185396E-02 |
| 66 | -4.281590E+00 | -1.035808E-05 | 3.180133E-05 | -5.433095E-03 | -1.075830E-02 | -5.405389E-03 | -4.847713E-03 |

| Surface | $x^4y^2$ | $x^2y^4$ | $x^0y^6$ | $x^8y^0$ | $x^6y^2$ | $x^4y^4$ | $x^2y^6$ |
|---|---|---|---|---|---|---|---|
| 65 | -6.556209E-02 | -6.556215E-02 | -2.185248E-02 | 6.541445E-03 | 2.616577E-02 | 3.924864E-02 | 2.616575E-02 |
| 66 | -1.454233E-02 | -1.454188E-02 | -4.847787E-03 | 1.558690E-03 | 6.234782E-03 | 9.352196E-03 | 6.234841E-03 |

| Surface | $x^0y^8$ | $x^{10}y^0$ | $x^8y^2$ | $x^6y^4$ | $x^4y^6$ | $x^2y^8$ | $x^0y^{10}$ |
|---|---|---|---|---|---|---|---|
| 65 | 6.541477E-03 | -9.729759E-04 | -4.864880E-03 | -9.729762E-03 | -9.729763E-03 | -4.864884E-03 | -9.729788E-04 |
| 66 | 1.558688E-03 | -2.192753E-04 | -1.096376E-03 | -2.192750E-03 | -2.192748E-03 | -1.096369E-03 | -2.192750E-04 |

| Surface | $x^{12}y^0$ | $x^{10}y^2$ | $x^8y^4$ | $x^6y^6$ | $x^4y^8$ | $x^2y^{10}$ | $x^0y^{12}$ |
|---|---|---|---|---|---|---|---|
| 65 | 8.376353E-05 | 5.025811E-04 | 1.256453E-03 | 1.675269E-03 | 1.256451E-03 | 5.025807E-04 | 8.376296E-05 |
| 66 | 1.716871E-05 | 1.030123E-04 | 2.575309E-04 | 3.433746E-04 | 2.575312E-04 | 1.030130E-04 | 1.716873E-05 |

| Surface | $x^{14}y^0$ | $x^{12}y^2$ | $x^{10}y^4$ | $x^8y^6$ | $x^6y^8$ | $x^4y^{10}$ | $x^2y^{12}$ |
|---|---|---|---|---|---|---|---|
| 65 | -4.291230E-06 | -3.003863E-05 | -9.011589E-05 | -1.501589E-04 | -1.501932E-04 | -9.011591E-05 | -3.003865E-05 |
| 66 | -7.782183E-07 | -5.447525E-06 | -1.634257E-05 | -2.723762E-05 | -2.723761E-05 | -1.634254E-05 | -5.447448E-06 |

| Surface | $x^0y^{14}$ | $x^{16}y^0$ | $x^{14}y^2$ | $x^{12}y^4$ | $x^{10}y^6$ | $x^8y^8$ | $x^6y^{10}$ |
|---|---|---|---|---|---|---|---|
| 65 | -4.291305E-06 | 1.249729E-07 | 9.997816E-07 | 3.499235E-06 | 6.998470E-06 | 8.748086E-06 | 6.998466E-06 |
| 66 | -7.782148E-07 | 1.936498E-08 | 1.549201E-07 | 5.422204E-07 | 1.084441E-06 | 1.355552E-06 | 1.084443E-06 |

| Surface | $x^4y^{12}$ | $x^2y^{14}$ | $x^0y^{16}$ | $x^{18}y^0$ | $x^{16}y^2$ | $x^{14}y^4$ | $x^{12}y^6$ |
|---|---|---|---|---|---|---|---|
| 65 | 9.997840E-07 | 1.249766E-07 | -1.759267E-09 | -1.583364E-08 | -6.333462E-08 | -1.477808E-07 |
| 66 | 1.549296E-07 | 1.936551E-08 | -2.171463E-10 | -1.954301E-09 | -7.817196E-09 | -1.824012E-08 |

| Surface | $x^4y^{12}$ | | | | | | |
|---|---|---|---|---|---|---|---|
| 65 | 3.499229E-06 |
| 66 | 5.422253E-07 |

FIG. 42C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | -2.216713E-07 | -2.216713E-07 | -1.477809E-07 | -6.333438E-08 | -1.583241E-08 | -1.757590E-09 | 6.527347E-12 |
| 66 | -2.736015E-08 | -2.736007E-08 | -1.823984E-08 | -7.816602E-09 | -1.953185E-09 | -2.170660E-10 | 4.242269E-13 |
| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
| 65 | 6.524979E-11 | 2.936057E-10 | 7.829368E-10 | 1.370134E-09 | 1.644155E-09 | 1.370145E-09 | 7.829826E-10 |
| 66 | 4.243594E-12 | 1.909680E-11 | 5.092517E-11 | 8.912043E-11 | 1.069477E-10 | 8.913342E-11 | 5.095781E-11 |
| Surface | $x^4y^{16}$ | $x^2y^{18}$ | $x^0y^{20}$ | | | | |
| 65 | 2.938163E-10 | 6.600606E-11 | 7.091667E-12 | | | | |
| 66 | 1.916328E-11 | 4.375532E-12 | 4.363458E-13 | | | | |

FIG. 42D

| Surface | X (mm) | Y (mm) | Sag (mm) |
|---|---|---|---|
| 65 | 3.000000 | 1.000000 | 0.013884 |
| 65 | -1.000000 | 3.000000 | 0.019028 |
| 66 | 3.000000 | 1.000000 | 0.759693 |
| 66 | -1.000000 | 3.000000 | 0.762678 |

FIG. 42E

| Tenth embodiment ||||||
|---|---|---|---|---|---|
| Effective focal length (EFL)= 3.292mm, half field of view (HFOV)= 56.508°, system length (TTL)= 7.162 mm, F-number (Fno)= 2.241 , image height (ImgH)= 5.233 mm. ||||||
| Element | Surface | Radius (mm) | Thickness (mm) | Refractive index | Abbe number | Focal length (mm) |
| Object | | Infinity | Infinity | | | |
| First lens element 1 | Object-side surface 15 | -12.465 | 0.551 | 1.640 | 23.529 | -8.627 |
| | Image-side surface 16 | 10.214 | 0.112 | | | |
| Second lens element 2 | Object-side surface 25 | 2.079 | 0.520 | 1.661 | 20.373 | 9.108 |
| | Image-side surface 26 | 2.844 | 0.226 | | | |
| Aperture 0 | | Infinity | 0.021 | | | |
| Third lens element 3 | Object-side surface 35 | 26.113 | 0.900 | 1.535 | 55.690 | 3.522 |
| | Image-side surface 36 | -2.013 | 0.353 | | | |
| Fourth lens element 4 | Object-side surface 45 | -9.623 | 0.370 | 1.671 | 19.243 | -9.428 |
| | Image-side surface 46 | 19.297 | 0.298 | | | |
| Fifth lens element 5 | Object-side surface 55 | -2.499 | 0.940 | 1.535 | 55.690 | 2.751 |
| | Image-side surface 56 | -1.050 | 0.050 | | | |
| Seventh lens element 7 | Object-side surface 75 | -1.118 | 0.282 | 1.535 | 55.690 | 37.477 |
| | Image-side surface 76 | -1.153 | 0.050 | | | |
| Eighth lens element 8 | Object-side surface 85 | 9.212 | 0.484 | 1.535 | 55.690 | 78.321 |
| | Image-side surface 86 | 11.581 | 0.051 | | | |
| Sixth lens element 6 | Object-side surface 65 | 4.303 | 0.635 | 1.642 | 22.409 | -3.276 |
| | Image-side surface 66 | 1.338 | 1.000 | | | |
| Filter 9 | Object-side surface 95 | Infinity | 0.210 | 1.517 | 64.167 | |
| | Image-side surface 96 | Infinity | 0.108 | | | |
| | Image plane 99 | Infinity | 0.000 | | | |

FIG. 45

| Surface | K | $a_2$ | $a_4$ | $a_6$ | $a_8$ |
|---|---|---|---|---|---|
| 15 | 0.000000E+00 | 0.000000E+00 | 7.432758E-02 | -3.800268E-02 | 1.603177E-02 |
| 16 | 0.000000E+00 | 0.000000E+00 | 1.160653E-01 | -1.441762E-01 | 9.962373E-02 |
| 25 | 0.000000E+00 | 0.000000E+00 | 1.542372E-02 | -9.847559E-02 | 2.321746E-02 |
| 26 | 7.689767E+00 | 0.000000E+00 | -2.403122E-02 | -1.807303E-02 | -1.124971E-01 |
| 35 | 0.000000E+00 | 0.000000E+00 | -1.575976E-02 | -3.285718E-02 | 7.723533E-02 |
| 36 | 0.000000E+00 | 0.000000E+00 | -6.986176E-02 | 2.485601E-02 | -7.012719E-02 |
| 45 | 0.000000E+00 | 0.000000E+00 | -1.701012E-01 | 1.397814E-01 | -1.674193E-01 |
| 46 | 0.000000E+00 | 0.000000E+00 | -1.342196E-01 | 1.211893E-01 | -8.239051E-02 |
| 55 | 0.000000E+00 | 0.000000E+00 | -2.555152E-02 | 5.660802E-03 | 9.910158E-02 |
| 56 | -1.857759E+00 | 0.000000E+00 | -1.973193E-02 | 2.822417E-03 | -1.747068E-02 |
| 75 | -1.861712E+00 | 0.000000E+00 | -2.286106E-02 | -5.656421E-03 | 3.572272E-03 |
| 76 | -1.754383E+00 | 0.000000E+00 | -2.549301E-02 | 4.969969E-03 | -3.335100E-03 |
| 85 | 0.000000E+00 | 0.000000E+00 | -5.281803E-02 | 5.919378E-02 | -2.890979E-02 |
| 86 | 0.000000E+00 | 0.000000E+00 | -1.649474E-02 | 1.626915E-02 | -5.822498E-03 |
| Surface | $a_{10}$ | $a_{12}$ | $a_{14}$ | $a_{16}$ | $a_{18}$ |
| 15 | -4.802102E-03 | 9.520094E-04 | -1.105355E-04 | 5.703720E-06 | |
| 16 | -4.466784E-02 | 1.305256E-02 | -2.257658E-03 | 1.761983E-04 | |
| 25 | 3.414969E-02 | -3.470677E-02 | 1.469769E-02 | -2.411270E-03 | |
| 26 | 2.481392E-01 | -2.627366E-01 | 5.906290E-02 | 5.725004E-02 | |
| 35 | -2.975281E-01 | 6.836747E-01 | -9.053525E-01 | 5.042366E-01 | |
| 36 | 1.301675E-01 | -1.851561E-01 | 1.295912E-01 | -3.835589E-02 | |
| 45 | 1.722064E-01 | -1.107460E-01 | 3.923947E-02 | -5.958031E-03 | |
| 46 | 4.457438E-02 | -1.588637E-02 | 3.167573E-03 | -2.694656E-04 | |
| 55 | -1.243134E-01 | 7.910708E-02 | -2.977654E-02 | 6.575629E-03 | -7.755932E-04 |
| 56 | 3.785573E-02 | -3.220442E-02 | 1.458334E-02 | -3.674723E-03 | 4.863259E-04 |
| 75 | 1.443538E-02 | -1.622882E-02 | 7.792110E-03 | -1.937346E-03 | 2.434550E-04 |
| 76 | 1.031499E-02 | -9.046235E-03 | 3.926576E-03 | -9.086764E-04 | 1.070915E-04 |
| 85 | 8.266003E-03 | -1.551287E-03 | 1.918392E-04 | -1.493283E-05 | 6.593519E-07 |
| 86 | 8.533610E-04 | -3.314712E-05 | -5.842971E-06 | 8.404025E-07 | -4.272338E-08 |

FIG. 46A

| Surface | $a_{20}$ |
|---|---|
| 15 | |
| 16 | |
| 25 | |
| 26 | |
| 35 | |
| 36 | |
| 45 | |
| 46 | |
| 55 | 3.685343E-05 |
| 56 | -2.639986E-05 |
| 75 | -1.224530E-05 |
| 76 | -5.062987E-06 |
| 85 | -1.253871E-08 |
| 86 | 7.966861E-10 |

FIG. 46B

| Surface | K | $x^2y^0$ | $x^0y^2$ | $x^4y^0$ | $x^2y^2$ | $x^0y^4$ | $x^6y^0$ |
|---|---|---|---|---|---|---|---|
| 65 | 0.000000E+00 | 2.688603E-06 | -2.002978E-05 | 8.418061E-03 | 1.683487E-02 | 8.436655E-03 | -2.200882E-02 |
| 66 | -4.069333E+00 | -1.227633E-05 | 1.015057E-05 | -7.048059E-03 | -1.408852E-02 | -7.045784E-03 | -4.405455E-03 |
| Surface | | $x^2y^4$ | $x^0y^6$ | $x^8y^0$ | $x^6y^2$ | $x^4y^4$ | $x^2y^6$ |
| 65 | -6.602651E-02 | -6.602651E-02 | -2.200828E-02 | 6.246952E-03 | 2.498780E-02 | 3.748170E-02 | 2.498780E-02 |
| 66 | -1.321642E-02 | -1.321662E-02 | -4.405456E-03 | 1.563411E-03 | 6.253664E-03 | 9.380499E-03 | 6.253670E-03 |
| Surface | | $x^{10}y^0$ | $x^8y^2$ | $x^6y^4$ | $x^4y^6$ | $x^2y^8$ | $x^0y^{10}$ |
| 65 | 6.246978E-03 | -8.429300E-04 | -4.214651E-03 | -8.429302E-03 | -8.429303E-03 | -4.214652E-03 | -8.429284E-04 |
| 66 | 1.563414E-03 | -2.354023E-04 | -1.177011E-03 | -2.354023E-03 | -2.354022E-03 | -1.177011E-03 | -2.354024E-04 |
| Surface | | $x^{10}y^2$ | $x^8y^4$ | $x^6y^6$ | $x^4y^8$ | $x^2y^{10}$ | $x^0y^{12}$ |
| 65 | 5.910950E-05 | 3.546569E-04 | -3.695212E-05 | 1.182190E-03 | 8.866422E-04 | 3.546569E-04 | 5.910975E-05 |
| 66 | 1.996811E-05 | 1.198087E-04 | 2.952217E-04 | 3.993623E-04 | 2.995218E-04 | 1.198088E-04 | 1.996811E-05 |
| Surface | | $x^{12}y^2$ | $x^{10}y^4$ | $x^8y^6$ | $x^6y^8$ | $x^4y^{10}$ | $x^2y^{12}$ |
| 65 | -1.759624E-06 | -1.231737E-05 | -3.695212E-05 | -6.158687E-05 | -6.158688E-05 | -3.695213E-05 | -1.231737E-05 |
| 66 | -1.013251E-06 | -7.092754E-06 | -2.127826E-05 | -3.546377E-05 | -3.546377E-05 | -2.127825E-05 | -7.092718E-06 |
| Surface | | $x^{16}y^0$ | $x^{14}y^2$ | $x^{12}y^4$ | $x^{10}y^6$ | $x^8y^8$ | $x^6y^{10}$ |
| 65 | -1.759537E-06 | -2.144106E-08 | -1.715291E-07 | -6.003523E-07 | -1.200705E-06 | -1.500882E-06 | -1.200706E-06 |
| 66 | -1.013250E-06 | 3.022565E-08 | 2.418053E-07 | 8.463186E-07 | 1.692637E-06 | 2.115797E-06 | 1.692638E-06 |
| Surface | | $x^4y^{12}$ | $x^2y^{14}$ | $x^{18}y^0$ | $x^{16}y^2$ | $x^{14}y^4$ | $x^{12}y^6$ |
| 65 | -6.003539E-07 | -1.715260E-07 | -2.151503E-08 | 2.737122E-09 | 2.463385E-08 | 9.853535E-08 | 2.299158E-07 |
| 66 | 8.463205E-07 | 2.418089E-07 | 3.022585E-08 | -4.822573E-10 | -4.340312E-09 | -1.736125E-08 | -4.050956E-08 |

FIG. 46C

| Surface | $x^{10}y^8$ | $x^8y^{10}$ | $x^6y^{12}$ | $x^4y^{14}$ | $x^2y^{16}$ | $x^0y^{18}$ | $x^{20}y^0$ |
|---|---|---|---|---|---|---|---|
| 65 | 3.448736E-07 | 3.448736E-07 | 2.299156E-07 | 9.853534E-08 | 2.463503E-08 | 2.740061E-09 | -5.066172E-11 |
| 66 | -6.076428E-08 | -6.076423E-08 | -4.050928E-08 | -1.736063E-08 | -4.339752E-09 | -4.822226E-10 | 3.103776E-12 |

| Surface | $x^{18}y^2$ | $x^{16}y^4$ | $x^{14}y^6$ | $x^{12}y^8$ | $x^{10}y^{10}$ | $x^8y^{12}$ | $x^6y^{14}$ |
|---|---|---|---|---|---|---|---|
| 65 | -5.066428E-10 | -2.279910E-09 | -6.079752E-09 | -1.063957E-08 | -1.276749E-08 | -1.063958E-08 | -6.079749E-09 |
| 66 | 3.103840E-11 | 1.396729E-10 | 3.724613E-10 | 6.518077E-10 | 7.821705E-10 | 6.518137E-10 | 3.724736E-10 |

| Surface | $x^4y^{16}$ | $x^2y^{18}$ | $x^0y^{20}$ |
|---|---|---|---|
| 65 | -2.279806E-09 | -5.061337E-10 | -4.991834E-11 |
| 66 | 1.396983E-10 | 3.108548E-11 | 3.110748E-12 |

FIG. 46D

| Surface | X (mm) | Y (mm) | Sag (mm) |
|---|---|---|---|
| 65 | 3.000000 | 1.000000 | -0.006285 |
| 65 | -1.000000 | 3.000000 | -0.003997 |
| 66 | 3.000000 | 1.000000 | 0.811426 |
| 66 | -1.000000 | 3.000000 | 0.811942 |

FIG. 46E

| Conditional expression | First embodiment | Second embodiment | Third embodiment | Fourth embodiment | Fifth embodiment |
|---|---|---|---|---|---|
| T1 | 0.515 | 0.520 | 0.542 | 0.555 | 0.594 |
| G12 | 0.050 | 0.050 | 0.067 | 0.052 | 0.157 |
| T2 | 0.419 | 0.426 | 0.637 | 0.292 | 0.494 |
| G23 | 0.354 | 0.359 | 0.378 | 0.459 | 0.263 |
| T3 | 0.949 | 0.947 | 0.712 | 0.968 | 0.877 |
| G34 | 0.157 | 0.139 | 0.051 | 0.139 | 0.381 |
| T4 | 0.380 | 0.378 | 0.208 | 0.326 | 0.373 |
| G45 | 0.703 | 0.683 | 0.827 | 0.593 | 0.306 |
| T5 | 1.177 | 1.189 | 1.521 | 1.744 | 1.011 |
| G56 | 0.050 | 0.050 | 0.240 | 0.050 | 0.620 |
| T6 | 0.954 | 0.961 | 0.711 | 0.937 | 0.676 |
| G6F | 0.900 | 0.900 | 1.000 | 0.900 | 0.900 |
| TF | 0.210 | 0.210 | 0.210 | 0.210 | 0.210 |
| GFP | 0.359 | 0.338 | 0.431 | 0.196 | 0.195 |
| BFL | 1.469 | 1.448 | 1.641 | 1.306 | 1.305 |
| EFL | 3.405 | 3.358 | 3.633 | 3.394 | 3.193 |
| TTL | 7.176 | 7.152 | 7.535 | 7.421 | 7.059 |
| TL | 5.707 | 5.704 | 5.894 | 6.115 | 5.754 |
| ALT | 4.393 | 4.422 | 4.330 | 4.822 | 4.026 |
| AAG | 1.314 | 1.282 | 1.564 | 1.293 | 1.728 |
| ImgH | 5.233 | 5.233 | 5.233 | 5.233 | 5.233 |

FIG. 47

| Conditional expression | First embodiment | Second embodiment | Third embodiment | Fourth embodiment | Fifth embodiment |
|---|---|---|---|---|---|
| ImgH/(T1+G12+T2) | 5.321 | 5.250 | 4.201 | 5.821 | 4.201 |
| ImgH/(G12+T2+T4) | 6.167 | 6.124 | 5.737 | 7.819 | 5.110 |
| (T5+T6)/T4 | 5.614 | 5.687 | 10.728 | 8.231 | 4.528 |
| EFL/(G23+G45) | 3.223 | 3.221 | 3.013 | 3.226 | 5.608 |
| V1+V3+V4 | 95.306 | 99.592 | 98.462 | 98.462 | 98.462 |
| (G23+T3)/T1 | 2.533 | 2.510 | 2.014 | 2.571 | 1.919 |
| T6/(G12+G23) | 2.362 | 2.348 | 1.594 | 1.833 | 1.607 |
| (G45+T5)/G23 | 5.307 | 5.209 | 6.204 | 5.088 | 5.001 |
| (AAG+BFL)/T3 | 2.931 | 2.883 | 4.499 | 2.684 | 3.456 |
| ALT/(T1+G34) | 6.543 | 6.704 | 7.312 | 6.945 | 4.126 |
| TL/(G56+T6) | 5.683 | 5.640 | 6.200 | 6.198 | 4.440 |
| (T3+T5)/G23 | 6.004 | 5.944 | 5.900 | 5.905 | 7.171 |
| TTL/(AAG+T4) | 4.238 | 4.308 | 4.253 | 4.585 | 3.360 |
| (T1+T5)/(G12+T2) | 3.606 | 3.588 | 2.929 | 6.692 | 2.465 |
| AAG/(T2+G34) | 2.280 | 2.266 | 2.275 | 3.000 | 1.974 |
| T5/(G12+G23) | 2.912 | 2.904 | 3.410 | 3.413 | 2.403 |
| (T4+G45)/G23 | 3.056 | 2.953 | 2.736 | 2.000 | 2.577 |
| ALT/(G45+G56) | 5.838 | 6.031 | 4.057 | 7.500 | 4.349 |
| T5/T1 | 2.287 | 2.285 | 2.808 | 3.140 | 1.701 |

FIG. 48

| Conditional expression | Sixth embodiment | Seventh embodiment | Eighth embodiment | Ninth embodiment | Tenth embodiment |
|---|---|---|---|---|---|
| T1 | 0.510 | 0.712 | 0.621 | 0.557 | 0.551 |
| G12 | 0.155 | 0.081 | 0.157 | 0.133 | 0.112 |
| T2 | 0.564 | 0.453 | 0.323 | 0.476 | 0.520 |
| G23 | 0.262 | 0.214 | 0.272 | 0.275 | 0.247 |
| T3 | 0.865 | 0.871 | 0.958 | 0.862 | 0.900 |
| G34 | 0.381 | 0.389 | 0.350 | 0.367 | 0.353 |
| T4 | 0.394 | 0.350 | 0.481 | 0.377 | 0.370 |
| G45 | 0.309 | 0.218 | 0.308 | 0.295 | 0.298 |
| T5 | 1.001 | 1.212 | 1.073 | 1.081 | 0.940 |
| G56 | 1.009 | 0.711 | 0.683 | 0.654 | 0.917 |
| T6 | 0.417 | 0.591 | 0.659 | 0.628 | 0.635 |
| G6F | 0.850 | 1.000 | 0.900 | 1.000 | 1.000 |
| TF | 0.210 | 0.210 | 0.210 | 0.210 | 0.210 |
| GFP | 0.149 | 0.084 | 0.147 | 0.126 | 0.108 |
| BFL | 1.209 | 1.294 | 1.257 | 1.336 | 1.318 |
| EFL | 3.235 | 3.197 | 3.281 | 3.227 | 3.292 |
| TTL | 7.076 | 7.095 | 7.143 | 7.041 | 7.162 |
| TL | 5.867 | 5.802 | 5.885 | 5.705 | 5.843 |
| ALT | 3.751 | 4.188 | 4.115 | 3.980 | 3.916 |
| AAG | 2.116 | 1.613 | 1.770 | 1.724 | 1.927 |
| ImgH | 5.233 | 5.233 | 5.233 | 5.233 | 5.233 |

FIG. 49

| Conditional expression | Sixth embodiment | Seventh embodiment | Eighth embodiment | Ninth embodiment | Tenth embodiment |
|---|---|---|---|---|---|
| ImgH/(T1+G12+T2) | 4.260 | 4.201 | 4.753 | 4.491 | 4.424 |
| ImgH/(G12+T2+T4) | 4.705 | 5.925 | 5.448 | 5.309 | 5.220 |
| (T5+T6)/T4 | 3.601 | 5.153 | 3.600 | 4.529 | 4.252 |
| EFL/(G23+G45) | 5.661 | 7.401 | 5.657 | 5.656 | 6.041 |
| V1+V3+V4 | 98.462 | 98.462 | 98.462 | 98.462 | 98.462 |
| (G23+T3)/T1 | 2.212 | 1.523 | 1.980 | 2.043 | 2.084 |
| T6/(G12+G23) | 1.001 | 2.004 | 1.537 | 1.538 | 1.767 |
| (G45+T5)/G23 | 5.001 | 6.675 | 5.076 | 5.001 | 5.001 |
| (AAG+BFL)/T3 | 3.842 | 3.338 | 3.159 | 3.549 | 3.604 |
| ALT/(T1+G34) | 4.211 | 3.802 | 4.238 | 4.311 | 4.335 |
| TL/(G56+T6) | 4.113 | 4.455 | 4.384 | 4.449 | 3.764 |
| (T3+T5)/G23 | 7.123 | 9.724 | 7.467 | 7.061 | 7.438 |
| TTL/(AAG+T4) | 2.819 | 3.614 | 3.173 | 3.350 | 3.117 |
| (T1+T5)/(G12+T2) | 2.103 | 3.608 | 3.533 | 2.691 | 2.358 |
| AAG/(T2+G34) | 2.241 | 1.916 | 2.632 | 2.048 | 2.208 |
| T5/(G12+G23) | 2.401 | 4.109 | 2.501 | 2.648 | 2.613 |
| (T4+G45)/G23 | 2.684 | 2.651 | 2.901 | 2.444 | 2.700 |
| ALT/(G45+G56) | 2.845 | 4.508 | 4.151 | 4.191 | 3.225 |
| T5/T1 | 1.963 | 1.701 | 1.726 | 1.942 | 1.707 |

FIG. 50

OPTICAL IMAGING LENS

CROSS-REFERENCE TO RELATED APPLICATION

This application claims the priority benefit of China application serial no. 202010246138.5, filed on Mar. 31, 2020. The entirety of the above-mentioned patent application is hereby incorporated by reference herein and made a part of this specification.

BACKGROUND

Technical Field

The disclosure relates to an optical element, and in particular, to an optical imaging lens.

Description of Related Art

In recent years, an optical imaging lens has been continuously improved. The optical imaging lens is required to be light, thin, small, and with large field of view angle. However, the distortion aberration also tends to get worse as the field of view angle becomes larger. Therefore, it has always been a goal to design an optical imaging lens with good imaging quality and short system length.

SUMMARY

The disclosure provides an optical imaging lens, which has a shorter length, a relatively large field of view and maintains desired imaging quality with a smaller distortion aberration.

An embodiment of the disclosure provides an optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through. The first lens element is arranged to be a lens element in a first order from the object side to the image side and the first lens element has negative refracting power. The second lens element is arranged to be a lens element in a second order from the object side to the image side. The third lens element is arranged to be a lens element in a third order from the object side to the image side. The fourth lens element is arranged to be a lens element in a fourth order from the object side to the image side. The fifth lens element is arranged to be a lens element in a fifth order from the object side to the image side. The sixth lens element is arranged to be a lens element in a first order from the image side to the object side. Wherein at least one of the object-side surfaces and the image-side surfaces of the first lens element to the sixth lens element is a free form surface, the free form surface is crossed by a first reference plane at a first curve, wherein the first reference plane contains the optical axis. The free form surface is crossed by a second reference plane at a second curve, wherein the second reference plane contains the optical axis. And the first reference plane and the second reference plane intersect at the optical axis without overlapping, and when the first curve on the first reference plane is rotated onto the second reference plane with the optical axis as the rotation axis, the first curve and the second curve do not coincide. The optical imaging lens satisfies the following conditional expression: $ImgH/(T1+G12+T2) \geq 4.200$, wherein ImgH is an image height of the optical imaging lens, T1 is a thickness of the first lens element along the optical axis, G12 is a distance from the image-side surface of the first lens element to the object-side surface of the second lens element along the optical axis, and T2 is a thickness of the second lens element along the optical axis.

An embodiment of the disclosure provides an optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through. The first lens element is arranged to be a lens element in a first order from the object side to the image side. The second lens element is arranged to be a lens element in a second order from the object side to the image side. The third lens element is arranged to be a lens element in a third order from the object side to the image side. The fourth lens element is arranged to be a lens element in a fourth order from the object side to the image side and the fourth lens element has negative refracting power. The fifth lens element is arranged to be a lens element in a fifth order from the object side to the image side. The sixth lens element is arranged to be a lens element in a first order from the image side to the object side. Wherein at least one of the object-side surfaces and the image-side surfaces of the first lens element to the sixth lens element is a free form surface, the free form surface is crossed by a first reference plane at a first curve, wherein the first reference plane contains the optical axis. The free form surface is crossed by a second reference plane at a second curve, wherein the second reference plane contains the optical axis. And the first reference plane and the second reference plane intersect at the optical axis without overlapping, and when the first curve on the first reference plane is rotated onto the second reference plane with the optical axis as the rotation axis, the first curve and the second curve do not coincide. The optical imaging lens satisfies the following conditional expression: $ImgH/(T1+G12+T2) \geq 4.200$, wherein ImgH is an image height of the optical imaging lens, T1 is a thickness of the first lens element along the optical axis, G12 is a distance from the image-side surface of the first lens element to the object-side surface of the second lens element along the optical axis, T2 is a thickness of the second lens element along the optical axis.

An embodiment of the disclosure provides an optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through. The first lens element is arranged to be a lens element in a first order from the object side to the image side and the first lens element has negative refracting power. The second lens element is arranged to be a lens element in a second order from the object side to the image side. The third lens element is arranged to be a lens element in a third order from the object side to the image side. The fourth lens element is arranged to be a lens element in a fourth order from the object side to the image side. The fifth lens element is arranged to be a lens element in a fifth order from the object side to the image side. The sixth lens element is arranged to be a lens element in a first order from the image side to the object side. Wherein at least one of the object-side surfaces and the image-side surfaces of the first lens element to the sixth lens element is a free form surface, the free form surface is crossed by a first reference plane at a first curve, wherein the first reference plane contains the optical axis. The free form surface is crossed by a second reference plane at a second curve, wherein the second reference plane contains the optical axis. And the first reference plane and the second reference plane intersect at the optical axis without overlapping, and when the first curve on the first reference plane is rotated onto the second reference plane with the optical axis as the rotation axis, the first curve and the second curve do not coincide. The optical imaging lens satisfies the following conditional expression: ImgH/(G12+T2+T4)≥4.700, wherein ImgH is an image height of the optical imaging lens, G12 is a distance from the image-side surface of the first lens element to the object-side surface of the second lens element along the optical axis, T2 is a thickness of the second lens element along the optical axis, T4 is a thickness of the fourth lens element along the optical axis.

Based on the above, the optical imaging lens in the embodiments of the disclosure has the following beneficial effects: as designed to satisfy the foregoing concave-convex surface and free form surface arrangement of lens elements and refracting power conditions and satisfy the foregoing conditional expressions, the optical imaging lens can have a relatively large field of view and maintains desired imaging quality with a smaller distortion aberration, and this may also contribute to shorten the system length of the optical imaging lens while maintaining a large image height.

In order to make the aforementioned features and advantages of the disclosure comprehensible, embodiments accompanied with accompanying drawings are described in detail below.

BRIEF DESCRIPTION OF THE DRAWINGS

FIG. 9 shows detailed optical data of the optical imaging lens according to the first embodiment of the disclosure.

FIG. 10A and FIG. 10B show an aspheric surface parameter of the optical imaging lens according to the first embodiment of the disclosure.

FIG. 10C and FIG. 10D show parameters of the $X'''Y''$ of the optical imaging lens according to the first embodiment of the disclosure.

FIG. 10E shows Sag values corresponding to two selected coordinate values on the XY plane of the sixth lens element according to the first embodiment of the disclosure.

FIG. 13 shows detailed optical data of the optical imaging lens according to the second embodiment of the disclosure.

FIG. 14A and FIG. 14B show an aspheric surface parameter of the optical imaging lens according to the second embodiment of the disclosure.

FIG. 14C and FIG. 14D show parameters of the $X'''Y''$ of the optical imaging lens according to the second embodiment of the disclosure.

FIG. 14E shows Sag values corresponding to two selected coordinate values on the XY plane of the sixth lens element according to the second embodiment of the disclosure.

FIG. 17 shows detailed optical data of the optical imaging lens according to the third embodiment of the disclosure.

FIG. 18A and FIG. 18B show an aspheric surface parameter of the optical imaging lens according to the third embodiment of the disclosure.

FIG. 18C and FIG. 18D show parameters of the $X'''Y''$ of the optical imaging lens according to the third embodiment of the disclosure.

FIG. 18E shows Sag values corresponding to two selected coordinate values on the XY plane of the sixth lens element according to the third embodiment of the disclosure.

FIG. 21 shows detailed optical data of the optical imaging lens according to the fourth embodiment of the disclosure.

FIG. 22A and FIG. 22B show an aspheric surface parameter of the optical imaging lens according to the fourth embodiment of the disclosure.

FIG. 22C and FIG. 22D show parameters of the $X'''Y''$ of the optical imaging lens according to the fourth embodiment of the disclosure.

FIG. 22E shows Sag values corresponding to two selected coordinate values on the XY plane of the sixth lens element according to the fourth embodiment of the disclosure.

FIG. 23C is a schematic diagram of the appearance of the sixth lens element of FIG. 23A.

FIG. 24A to FIG. 24D are diagrams of longitudinal spherical aberrations and astigmatic aberrations of the optical imaging lens according to the fifth embodiment.

FIG. 25 shows detailed optical data of the optical imaging lens according to the fifth embodiment of the disclosure.

FIG. 26A and FIG. 26B show an aspheric surface parameter of the optical imaging lens according to the fifth embodiment of the disclosure.

FIG. 26C and FIG. 26D show parameters of the $X'''Y''$ of the optical imaging lens according to the fifth embodiment of the disclosure.

FIG. 26E shows Sag values corresponding to two selected coordinate values on the XY plane of the sixth lens element according to the fifth embodiment of the disclosure.

FIG. 27C is a schematic diagram of the appearance of the sixth lens element of FIG. 27A.

FIG. 28A to FIG. 28D are diagrams of longitudinal spherical aberrations and astigmatic aberrations of the optical imaging lens according to the sixth embodiment.

FIG. 29 shows detailed optical data of the optical imaging lens according to the sixth embodiment of the disclosure.

FIG. 30A and FIG. 30B show an aspheric surface parameter of the optical imaging lens according to the sixth embodiment of the disclosure.

FIG. 30C and FIG. 30D show parameters of the $X'''Y''$ of the optical imaging lens according to the sixth embodiment of the disclosure.

FIG. 30E shows Sag values corresponding to two selected coordinate values on the XY plane of the sixth lens element according to the sixth embodiment of the disclosure.

FIG. 31C is a schematic diagram of the appearance of the sixth lens element of FIG. 31A.

FIG. 32A to FIG. 32D are diagrams of longitudinal spherical aberrations and astigmatic aberrations of the optical imaging lens according to the seventh embodiment.

FIG. 33 shows detailed optical data of the optical imaging lens according to the seventh embodiment of the disclosure.

FIG. 34A and FIG. 34B show an aspheric surface parameter of the optical imaging lens according to the seventh embodiment of the disclosure.

FIG. 34C and FIG. 34D show parameters of the $X'''Y''$ of the optical imaging lens according to the seventh embodiment of the disclosure.

FIG. 34E shows Sag values corresponding to two selected coordinate values on the XY plane of the sixth lens element according to the seventh embodiment of the disclosure.

FIG. 35C is a schematic diagram of the appearance of the fifth lens element of FIG. 35A.

FIG. 36A to FIG. 36D are diagrams of longitudinal spherical aberrations and astigmatic aberrations of the optical imaging lens according to the eighth embodiment.

FIG. 37 shows detailed optical data of the optical imaging lens according to the eighth embodiment of the disclosure.

FIG. 38A and FIG. 38B show an aspheric surface parameter of the optical imaging lens according to the eighth embodiment of the disclosure.

FIG. 38C and FIG. 38D show parameters of the $X'''Y''$ of the optical imaging lens according to the eighth embodiment of the disclosure.

FIG. 38E shows Sag values corresponding to two selected coordinate values on the XY plane of the fifth lens element according to the eighth embodiment of the disclosure.

FIG. 39C is a schematic diagram of the appearance of the sixth lens element of FIG. 39A.

FIG. 40A to FIG. 40D are diagrams of longitudinal spherical aberrations and astigmatic aberrations of the optical imaging lens according to the ninth embodiment.

FIG. 41 shows detailed optical data of the optical imaging lens according to the ninth embodiment of the disclosure.

FIG. 42A and FIG. 42B show an aspheric surface parameter of the optical imaging lens according to the ninth embodiment of the disclosure.

FIG. 42C and FIG. 42D show parameters of the $X'''Y''$ of the optical imaging lens according to the ninth embodiment of the disclosure.

FIG. 42E shows Sag values corresponding to two selected coordinate values on the XY plane of the sixth lens element according to the ninth embodiment of the disclosure.

FIG. 45 shows detailed optical data of the optical imaging lens according to the tenth embodiment of the disclosure.

FIG. 46A and FIG. 46B show an aspheric surface parameter of the optical imaging lens according to the tenth embodiment of the disclosure.

FIG. 46C and FIG. 46D show parameters of the $X'''Y''$ of the optical imaging lens according to the tenth embodiment of the disclosure.

FIG. 46E shows Sag values corresponding to two selected coordinate values on the XY plane of the sixth lens element according to the tenth embodiment of the disclosure.

FIG. 47 and FIG. 48 show numerical values of important parameters and relational expressions of the optical imaging lens of the first to fifth embodiments of the disclosure.

FIG. 49 and FIG. 50 show numerical values of important parameters and relational expressions of the optical imaging lens of the sixth to tenth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
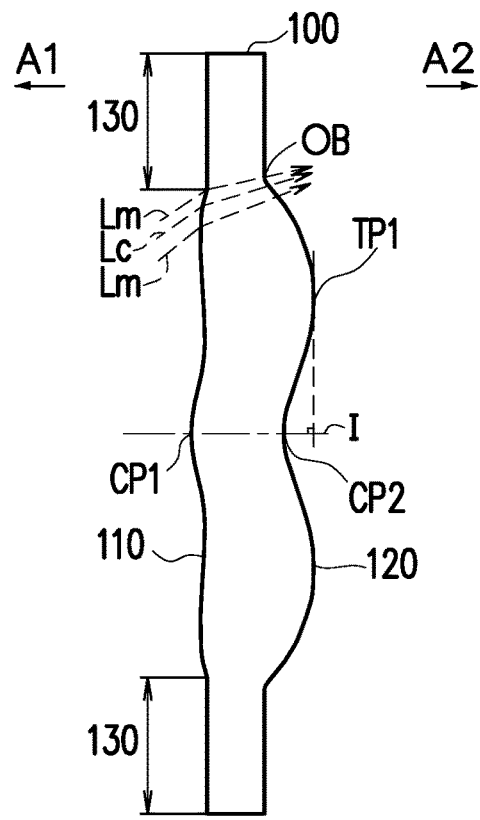
FIG. 1 is a schematic diagram to describe a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
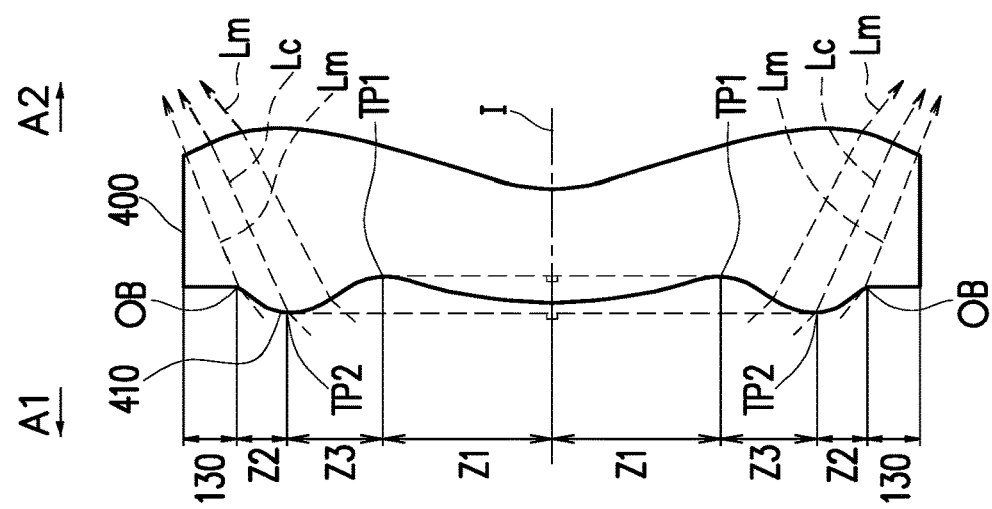
FIG. 4 is a schematic diagram to describe a surface structure of a lens element in an example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
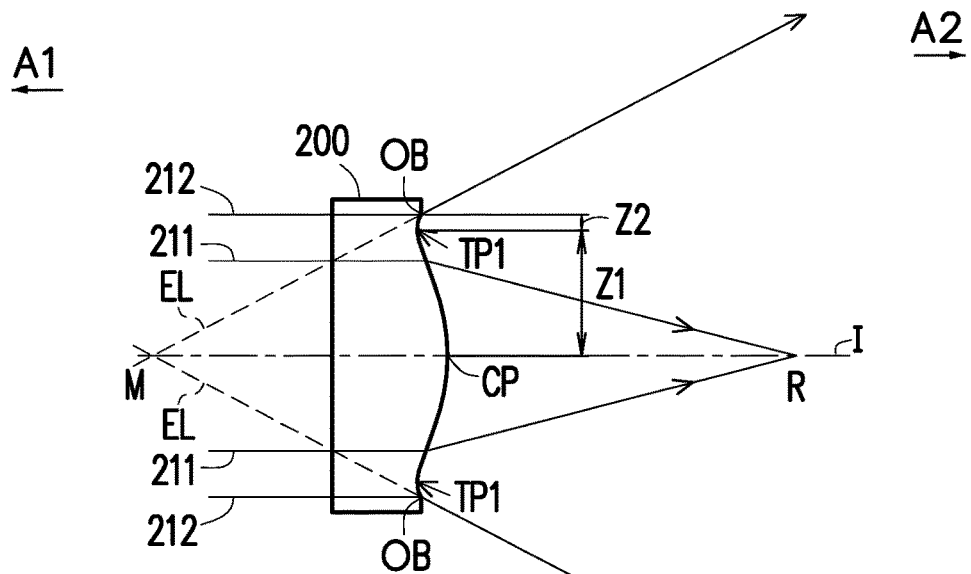
FIG. 2 is a schematic diagram to describe a concave-convex surface structure and a ray focus of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
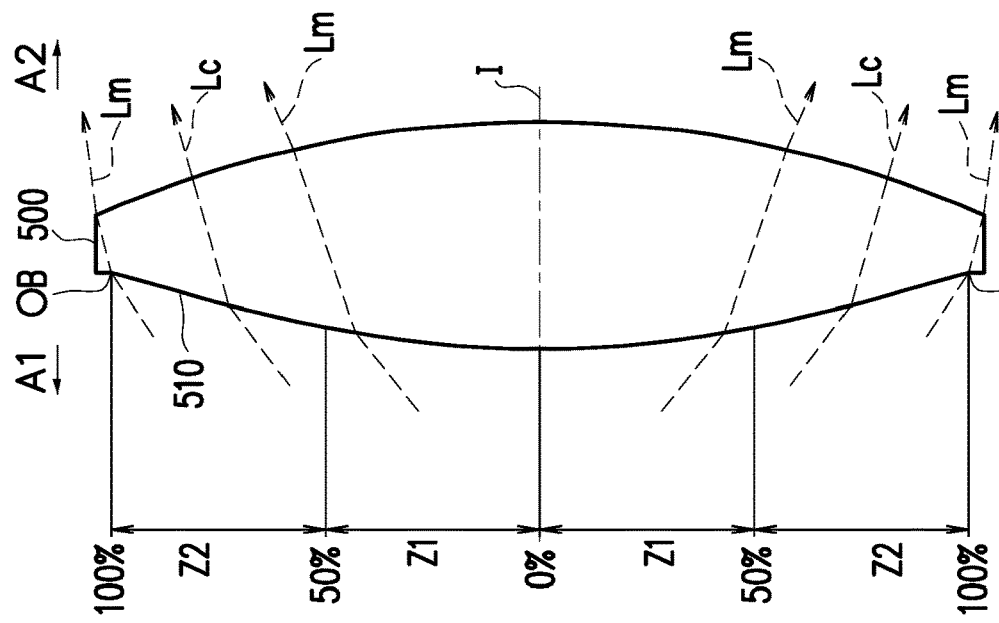
FIG. 5 is a schematic diagram to describe a surface structure of a lens element in an example 3.
Figure 3:
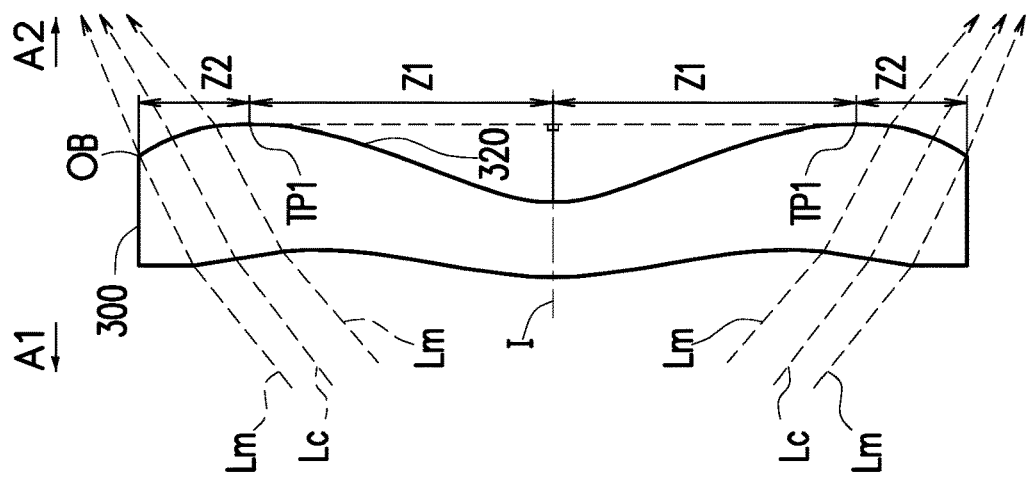
FIG. 3 is a schematic diagram to describe a surface structure of a lens element in an example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6A:
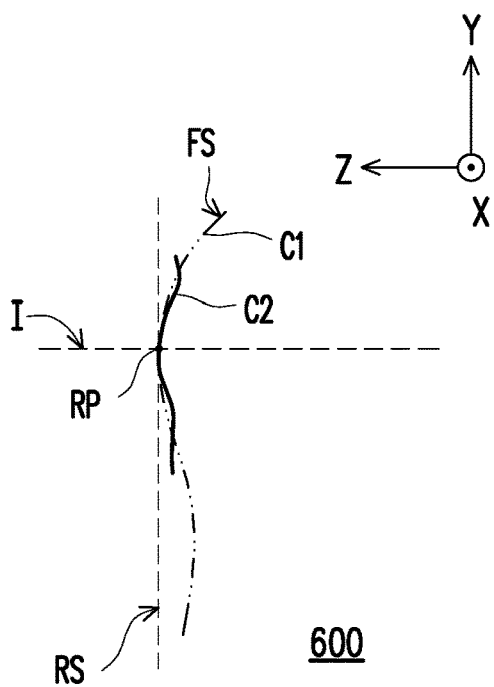
FIG. 6A is a radial cross-sectional view of the free form surface of the free-form lens element.
Figure 6B:
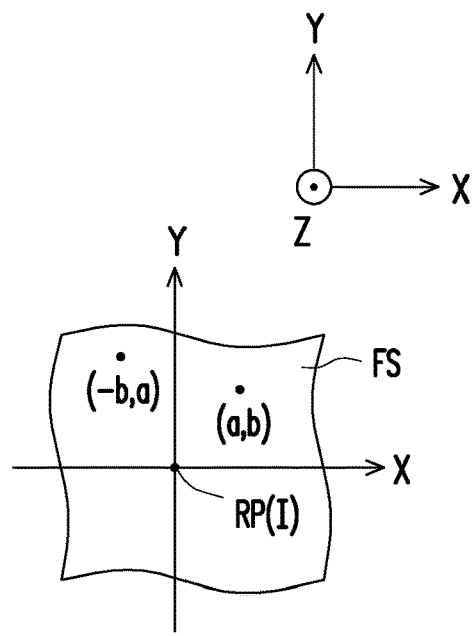
FIG. 6B is a schematic front view of the free-form lens element of FIG. 6A viewed from the Z-axis direction.
Figure 6C:
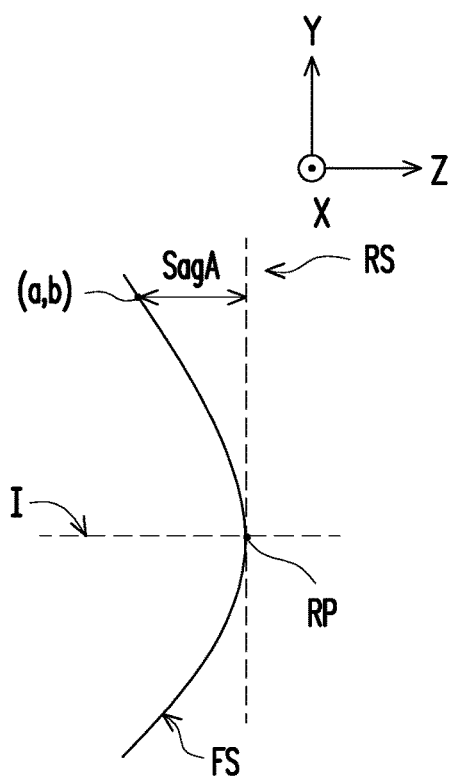
FIG. 6C and FIG. 6D are partial cross-sectional schematic views of the free form surface of FIG. 6B at coordinates (−b, a) and coordinates (a, b), respectively.
Figure 6D:
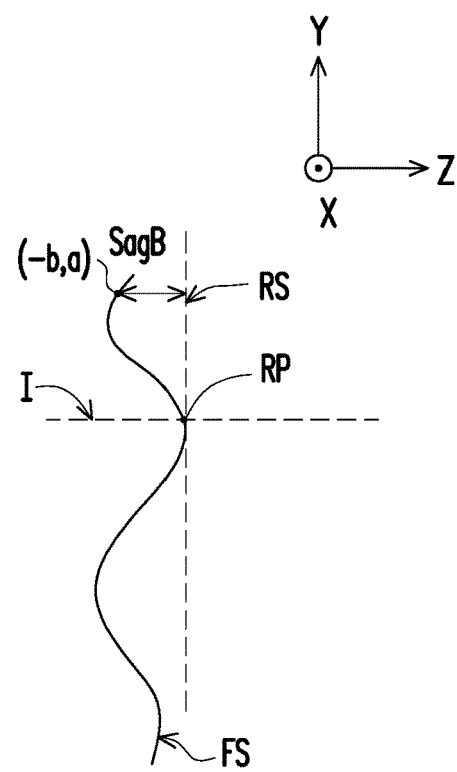

FIG. 6A is a radial cross-sectional view of the free form surface of the free-form lens element. FIG. 6B is a schematic front view of the free-form lens element of FIG. 6A viewed from the Z-axis direction. FIG. 6C and FIG. 6D are partial cross-sectional schematic views of the free form surface of FIG. 6B at coordinates (−b, a) and coordinates (a, b), respectively.

For convenience of explanation, the free-form lens element 600 can be regarded as being in the space formed by the X-axis, Y-axis, and Z-axis, the X-axis, the Y-axis, and the Z-axis are perpendicular to each other, and the Z-axis coincides with the optical axis I, and the free-form lens element 600 has a free form surface FS. Please refer to FIG. 6A. First, a first reference plane and a second reference plane are defined. The first reference plane and the second reference plane are different from each other. The first reference plane and the second reference plane each contains the optical axis I. That is, the optical axis I falls completely in the first reference plane, and the optical axis I falls completely in the second reference plane. And the first reference plane, for example, further includes the X-axis, and the second reference plane, for example, further includes the Y-axis, in other words, the first reference plane can be regarded as parallel to the XZ plane formed by the X-axis and the Z-axis, the second reference plane can be regarded as parallel to the YZ plane formed by the Y-axis and the Z-axis, the first reference plane and the second reference plane intersect at the optical axis I without overlapping. The free form surface FS of free-form lens element 600 contains first curve C1 and second curve C2, the first curve C1 is the curve where the free form surface FS is crossed by the first reference plane, and the second curve C2 is the curve where the free form surface FS is crossed by the second reference plane. The characteristics of the free form surface FS of the embodiment of the present disclosure are: if the first curve C1 in the first reference plane is rotated to the second reference plane with the optical axis I as the rotation axis, the first curve C1 is at least partially offset from the second curve C2, and vice versa. In other words, when rotating to the same plane, the first and second curves C1, C2 will not completely overlap (or do not coincide).

The free form surface FS of the embodiment of the present disclosure may have further characteristics. From another point of view, define a reference point RP and a reference plane RS, the reference point RP is the point where the free form surface FS intersects the optical axis I, and the normal vector of the reference plane RS is in the Z direction and the reference plane RS includes the reference point RP. Please refer to FIG. 6B. Select a first coordinate value and a second coordinate value on the XY plane. The first coordinate value is X=a, Y=b, and the second coordinate value is X=−b, Y=a. The connection line between the first coordinate value and the reference point RP and the connection line between the second coordinate value and the reference point RP are perpendicular to each other on the XY plane. Please refer to FIG. 6C. When X=a and Y=b, the distance between free form surface FS and reference plane RS in the z-axis direction is SagA. Please refer to FIG. 6D. And when X=−b, Y=a, the distance between free form surface FS and reference plane RS in the z-axis direction is SagB. SagB represents the vertical distance between the point at X=−b and Y=a and the reference plane RS. The free form surface FS of the embodiment of the present disclosure has the following characteristic: SagA is not equal to SagB.

In addition, it should be noted that, for convenience of explanation, the curves shown in FIG. 6C and FIG. 6D are only schematics, and the present disclosure is not limited thereto.

Figure 7A:
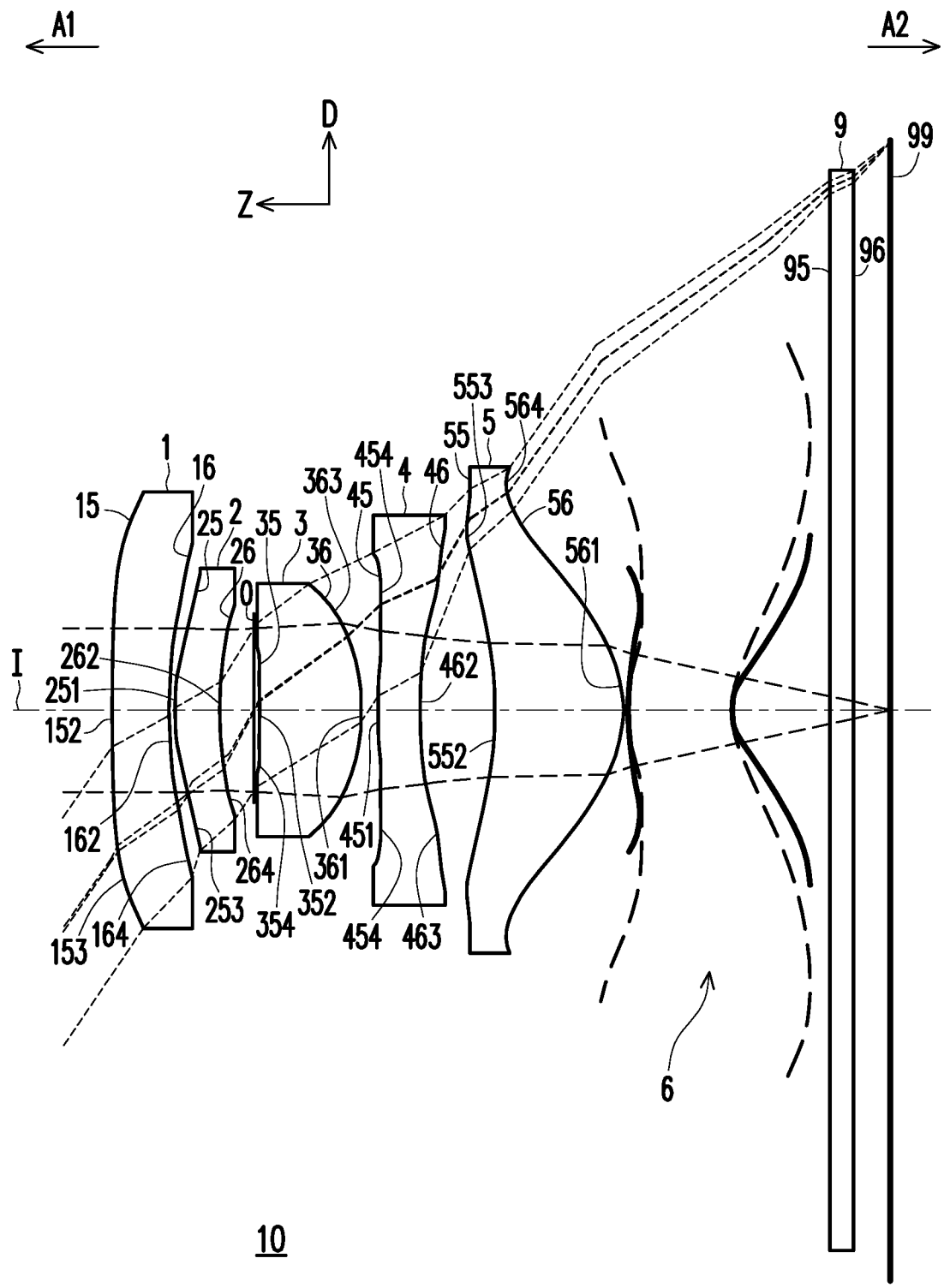
FIG. 7A is a schematic diagram of an optical imaging lens according to a first embodiment of the disclosure.
Figure 7B:
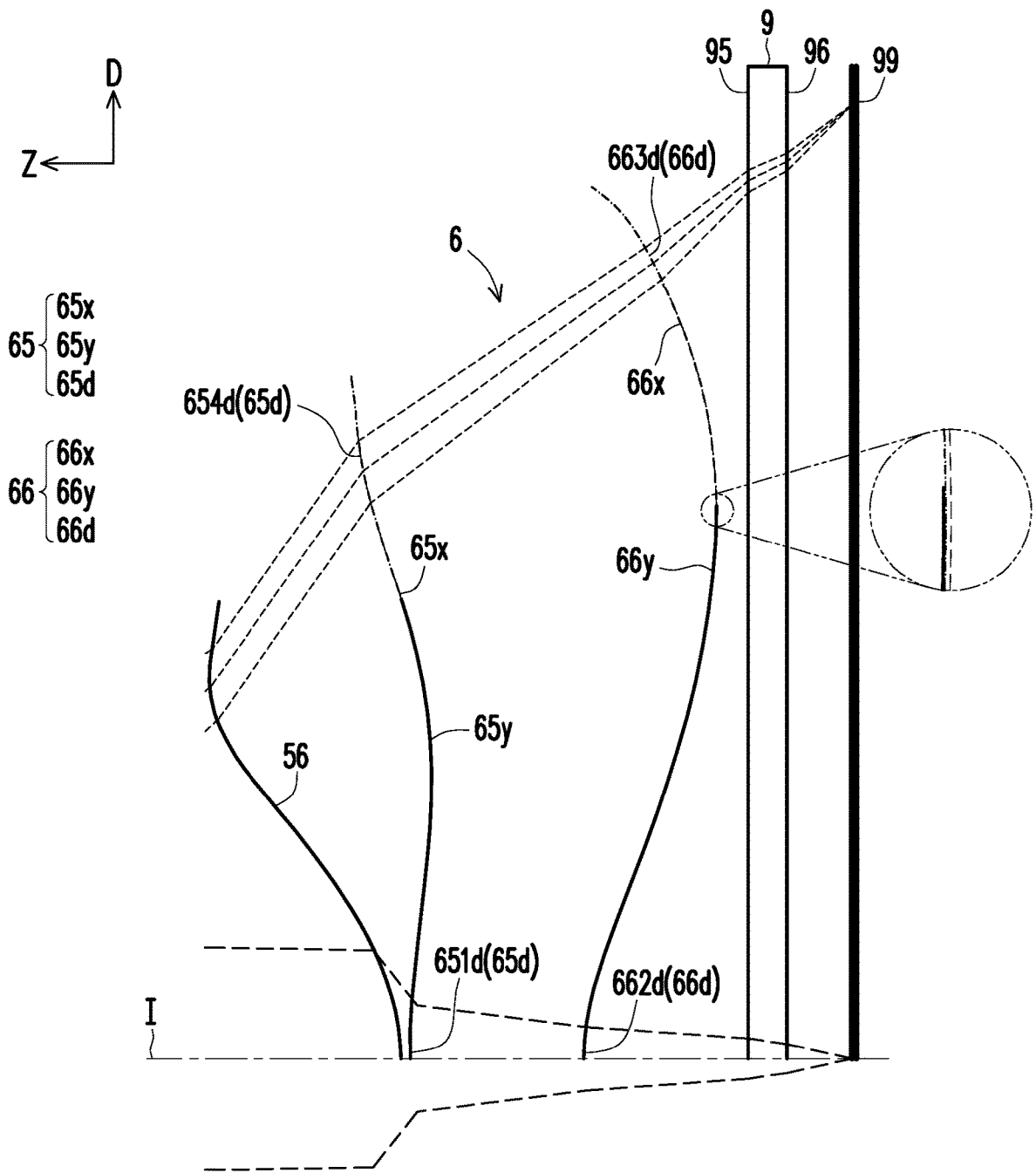
FIG. 7B is an enlarged radial cross-sectional view of the sixth lens element of FIG. 7A crossed by different planes.
Figure 7C:
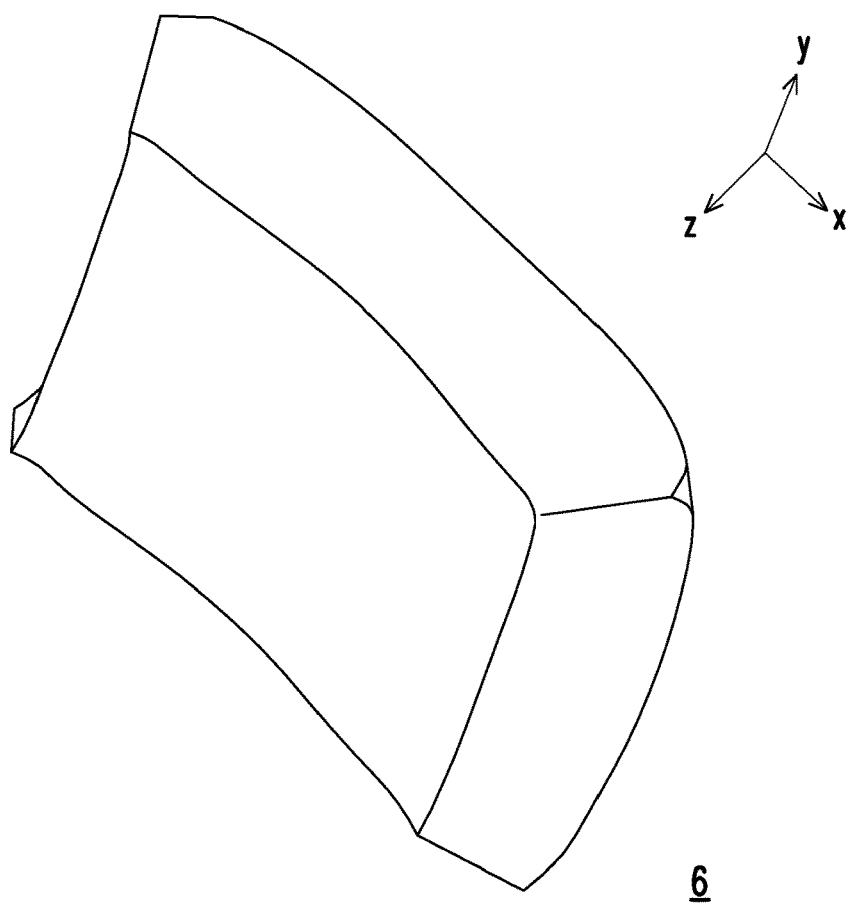
FIG. 7C is a schematic diagram of the appearance of the sixth lens element of FIG. 7A.

FIG. 7A is a schematic diagram of an optical imaging lens according to a first embodiment of the disclosure. FIG. 7A illustrates the surface structure of the optical imaging lens crossed by the third reference plane. The first reference plane is parallel to the XZ plane, the second reference plane is parallel to the YZ plane, and the third reference plane is parallel to the DZ plane, wherein the DZ plane is defined by the Z-axis and the diagonal direction D (not shown) of the image plane 99 (rotating from the XZ plane by 34.23 degrees about the optical axis). FIG. 7B is an enlarged radial cross-sectional view of the sixth lens element of FIG. 7A crossed by different planes. FIG. 7C is a schematic diagram of the appearance of the sixth lens element of FIG. 7A. FIG. 8A to FIG. 8D are diagrams of longitudinal spherical aberrations and astigmatic aberrations of the optical imaging lens according to the first embodiment. Referring to FIG. 7A, an optical imaging lens 10 in the first embodiment of the disclosure sequentially includes a first lens element 1, a second lens element 2, an aperture 0, a third lens element 3, a fourth lens element 4, a fifth lens element 5, a sixth lens element 6, and a filter 9 from an object side A1 to an image side A2 along an optical axis I of the optical imaging lens 10. After entering the optical imaging lens 10, rays emitted from a to-be-photographed object pass through the first lens element 1, the second lens element 2, the aperture 0, the third lens element 3, the fourth lens element 4, the fifth lens element 5, the sixth lens element 6, and the filter 9, and form an image on an image plane 99. The filter 9 is disposed between an image-side surface 66 of the sixth lens element 6 and the image plane 99. It should be noted that, the object side is a side facing the to-be-photographed object, and the image side is a side facing the image plane 99. In the present embodiment, the filter 9 is an infrared ray (IR) cut filter.

In the present embodiment, the first lens element 1, the second lens element 2, the third lens element 3, the fourth lens element 4, the fifth lens element 5, the sixth lens element 6, and the filter 9 of the optical imaging lens 10 include object-side surfaces 15, 25, 35, 45, 55, 65 and 95 facing the object side and allowing imaging rays to pass through and image-side surfaces 16, 26, 36, 46, 56, 66 and 96 facing the image side and allowing the imaging rays to pass through, respectively. In the present embodiment, the aperture 0 is disposed between the second lens element 2 and the third lens element 3.

The first lens element 1 has negative refracting power. The first lens element 1 is made from a plastic material. An optical axis region 152 of the object-side surface 15 of the first lens element 1 is concave, and a periphery region 153 of the object-side surface 15 of the first lens element 1 is convex. An optical axis region 162 of the image-side surface 16 of the first lens element 1 is concave, and a periphery region 164 of the image-side surface 16 of the first lens element 1 is concave. In the present embodiment, both the object-side surface 15 and the image-side surface 16 of the first lens element 1 are aspheric surfaces, but the disclosure is not limited thereto.

The second lens element 2 has positive refracting power. The second lens element 2 is made from a plastic material. An optical axis region 251 of the object-side surface 25 of the second lens element 2 is convex, and a periphery region 253 of the object-side surface 25 of the second lens element 2 is convex. An optical axis region 262 of the image-side surface 26 of the second lens element 2 is concave, and a periphery region 264 of the image-side surface 26 of the second lens element 2 is concave. In the present embodiment, both the object-side surface 25 and the image-side surface 26 of the second lens element 2 are aspheric surfaces, but the disclosure is not limited thereto.

The third lens element 3 has positive refracting power. The third lens element 3 is made from a plastic material. An optical axis region 352 of the object-side surface 35 of the third lens element 3 is concave, and a periphery region 354 of the object-side surface 35 of the third lens element 3 is concave. An optical axis region 361 of the image-side surface 36 of the third lens element 3 is convex, and a periphery region 363 of the image-side surface 36 of the third lens element 3 is convex. In the present embodiment, both the object-side surface 35 and the image-side surface 36 of the third lens element 3 are aspheric surfaces, but the disclosure is not limited thereto.

The fourth lens element 4 has negative refracting power. The fourth lens element 4 is made from a plastic material. An optical axis region 451 of the object-side surface 45 of the fourth lens element 4 is convex, and a periphery region 454 of the object-side surface 45 of the fourth lens element 4 is concave. An optical axis region 462 of the image-side surface 46 of the fourth lens element 4 is concave, and a periphery region 463 of the image-side surface 46 of the fourth lens element 4 is convex. In the present embodiment, both the object-side surface 45 and the image-side surface 46 of the fourth lens element 4 are aspheric surfaces, but the disclosure is not limited thereto.

The fifth lens element 5 has positive refracting power. The fifth lens element 5 is made from a plastic material. An optical axis region 552 of the object-side surface 55 of the fifth lens element 5 is concave, and a periphery region 553 of the object-side surface 55 of the fifth lens element 5 is convex. An optical axis region 561 of the image-side surface 56 of the fifth lens element 5 is convex, and a periphery region 564 of the image-side surface 56 of the fifth lens element 5 is concave. In the present embodiment, both the object-side surface 55 and the image-side surface 56 of the fifth lens element 5 are aspheric surfaces, but the disclosure is not limited thereto.

The sixth lens element 6 is arranged to be a lens element in a first order from the image side A2 to the object side A1. The sixth lens element 6 has negative refracting power. The sixth lens element 6 is made from a plastic material. The sixth lens element 6 is a free-form lens element, and the object-side surface 65 and the image-side surface 66 of the sixth lens element 6 are both free form surfaces. Referring to FIG. 7A, the projections of the intersection curves of the object-side surface 65 and the image-side surface 66 crossed by the first reference plane on the third reference plane are shown in dotted lines. The projections of the intersection curves of the object-side surface 65 and the image-side surface 66 crossed by the second reference plane on the third reference plane are shown in solid lines. Due to the limitation of optical software, the periphery region of the free form surface of the lens element cannot be completely presented when the projections of the intersection curves crossed by the first reference plane and the second reference plane on the third reference plane are presented at the same time. Referring to FIG. 7B, different intersection curves of the object-side surface 65 and the image-side surface 66 of the sixth lens element 6 crossed by the first reference plane, the second reference plane and the third reference plane, respectively, are shown. The first reference plane is parallel to the XZ plane, the second reference plane is parallel to the YZ plane, and the third reference plane is parallel to the DZ plane, wherein the DZ plane is defined by the Z-axis and the diagonal direction D (not shown) of the image plane 99. And these different intersection curves are all rotated about the optical axis I onto the third reference plane. In the third reference plane, the curves corresponding to the first reference plane are shown in a dotted line, the curves corresponding to the second reference plane are shown in a solid line, and the curves corresponding to the third reference plane are shown in a dot-and-dash line. The description herein may also be applied to the following embodiments and will not be repeated again.

Referring to FIG. 7B, the intersection curves 65*x*, 66*x* are the curves where the object-side surface 65 and image-side surface 66 are crossed by the first reference plane, the intersection curves 65*y*, 66*y* are the curves where the object-side surface 65 and image-side surface 66 are crossed by the second reference plane, and the intersection curves 65*d*, 66*d* are the curves where the object-side surface 65 and image-side surface 66 are crossed by the third reference plane. In the intersection curves 65*d*, 66*d* of the object-side surface 65 and the image-side surface 66 crossed by the third reference plane, an optical axis region 651*d* of the object-side surface 65 of the sixth lens element 6 is convex, and a periphery region 654*d* of the object-side surface 65 of the sixth lens element 6 is concave. An optical axis region 662*d* of the image-side surface 66 of the sixth lens element 6 is concave, and a periphery region 663*d* of the image-side surface 66 of the sixth lens element 6 is convex. It can be seen from FIG. 7B: the intersection curve 65*x* of the object-side surface 65 of the sixth lens element 6 crossed by the first reference plane, the intersection curve 65*y* of the object-side surface 65 of the sixth lens element 6 crossed by the second reference plane, and the intersection curve 65*d* of the object-side surface 65 of the sixth lens element 6 crossed by the third reference plane do not coincide with each other; and the intersection curve 66*x* of the image-side surface 66 of the sixth lens element 6 crossed by the first reference plane, the intersection curve 66*y* of the image-side surface 66 of the sixth lens element 6 crossed by the second reference plane, and the intersection curve 66*d* of the image-side surface 66 of the sixth lens element 6 crossed by the third reference plane do not coincide with each other. FIG. 7C specifically shows the overall appearance of the sixth lens element 6.

In the present embodiment, only the above six lens elements of the optical imaging lens 10 have refracting power.

Other detailed optical data of the first embodiment is shown in FIG. 9. The optical imaging lens 10 in the first embodiment has an effective focal length (EFL) of 3.405 millimeters (mm), an HFOV of 55.635°, a F-number (Fno) of 2.238, a system length (TTL) of 7.176 mm, and an image height of 5.233 mm. The TTL is a distance from the object-side surface 15 of the first lens element 1 to the image plane 99 along the optical axis I.

In addition, in the present embodiment, all the object-side surfaces 15, 25, 35, 45, and 55 and the image-side surfaces 16, 26, 36, 46, and 56 of the first lens element 1, the second lens element 2, the third lens element 3, the fourth lens element 4, and the fifth lens element 5 are aspheric surfaces, and are general even aspheric surfaces. The aspheric surfaces are defined by the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R is a curvature radius at a position, near the optical axis I, of a surface of a lens element;

Z is a depth of an aspheric surface (a perpendicular distance between a point on the aspheric surface and having a distance Y to the optical axis I and a plane, tangent to the aspheric surface, of a vertex on the optical axis I);

Y is distance between a point on an aspheric surface curve and the optical axis I;

K is a conic constant; and $a_{2i}$ is a $(2i)^{th}$-order aspheric surface coefficient.

Aspheric surface coefficients of the object-side surface 15 of the first lens element 1 to the image-side surface 56 of the fifth lens element 5 in Formula (1) are shown in FIG. 10A and FIG. 10B. In FIG. 10A and FIG. 10B, a field number 15 corresponds to aspheric surface coefficients of the object-side surface 15 of the first lens element 1, and other fields may be deduced by analogy.

In addition, at least one of the twelve surfaces of the object-side surfaces 15, 25, 35, 45, 55, 65 and the image-side surfaces 16, 26, 36, 46, 56, 66 of the first lens element 1, second lens element 2, third lens element 3, fourth lens element 4, fifth lens element 5 and sixth lens element 6 may be a free form surface. In the present embodiment, the two surfaces of the object-side surface 65 and the image-side surface 66 of the sixth lens element 6 are both free form surface. The free form surfaces are defined by the following formula (2)~(4):

$$Z = \frac{C(X^2 + Y^2)}{1 + \sqrt{1-(1+K)C^2(X^2+Y^2)}} + \sum_{j=2}^{66} C_j X^m Y^n \quad (2)$$

$$j = \frac{\{(m+n)^2 + m + 3n\}}{2} + 1 \quad (3)$$

$$C = \frac{1}{R} \quad (4)$$

where:

R is a curvature radius at a position, near the optical axis I, of a surface of a lens element;

Z is a depth of a free form surface (a perpendicular distance between a point on the free form surface and a tangent plane at a vertex of the free form surface on the optical axis I);

X is distance between a point on a free form surface and a Y-axis passing through the optical axis I;

Y is distance between a point on a free form surface and an X-axis passing through the optical axis I;

K is a conic constant;

$C_j$ are coefficients of each term of the $X^m Y^n$;

in addition, m and n are positive integers or zero.

Coefficients of each term of the $X^m Y^n$ of the object-side surface 65 and the image-side surface 66 of the sixth lens element 6 in Formula (2) are shown in FIG. 10C and FIG. 10D. In FIG. 10C and FIG. 10D, a field number 65 corresponds to coefficients $C_j$ of each term of the $X^m Y^n$ of the object-side surface 65 of the sixth lens element 6, and other fields may be deduced by analogy. In addition, in the present embodiment, coefficients $C_j$ of the $X^m Y^n$ terms missing in FIG. 10C and FIG. 10D are zero. FIG. 10E shows the corresponding Sag values of the sixth lens element of the first embodiment of the disclosure at the two selected coordinate values on the XY plane. Where the first coordinate value is, for example, X=3.000000, Y=1.000000, and the second coordinate value is, for example, X=−1.000000, Y=3.000000. The corresponding Sag values of the object-side surface 65 at the first and second coordinate values are −0.239578 and −0.218416, which are different from each other, and other fields may be deduced by analogy.

In addition, the relationships between important parameters of the optical imaging lens 10 in the first embodiment are shown in FIG. 47 and FIG. 48.

Where:

V1 is an Abbe number of the first lens element 1, wherein Abbe number may also be referred to as a dispersion coefficient;

V2 is an Abbe number of the second lens element 2;

V3 is an Abbe number of the third lens element 3;

V4 is an Abbe number of the fourth lens element 4;

V5 is an Abbe number of the fifth lens element 5;

V6 is an Abbe number of the sixth lens element 6;

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

T6 is a thickness of the sixth lens element 6 along the optical axis I;

G12 is a distance from the image-side surface 16 of the first lens element 1 to the object-side surface 25 of the second lens element 2 along the optical axis I, namely, an air gap between the first lens element 1 and the second lens element 2 along the optical axis I;

G23 is a distance from the image-side surface 26 of the second lens element 2 to the object-side surface 35 of the third lens element 3 along the optical axis I, namely, an air gap between the second lens element 2 and the third lens element 3 along the optical axis I;

G34 is a distance from the image-side surface 36 of the third lens element 3 to the object-side surface 45 of the fourth lens element 4 along the optical axis I, namely, an air gap between the third lens element 3 and the fourth lens element 4 along the optical axis I;

G45 is a distance from the image-side surface 46 of the fourth lens element 4 to the object-side surface 55 of the fifth lens element 5 along the optical axis I, namely, an air gap between the fourth lens element 4 and the fifth lens element 5 along the optical axis I;

G56 is a distance from the image-side surface 56 of the fifth lens element 5 to the object-side surface 65 of the sixth lens element 6 along the optical axis I;

G6F is a distance from the image-side surface 66 of the sixth lens element 6 to the object-side surface 95 of the filter 9 along the optical axis I, namely, an air gap between the sixth lens element 6 and the filter 9 along the optical axis I;

TF is a thickness of the filter 9 along the optical axis I;

GFP is a distance from the image-side surface 96 of the filter 9 to the image plane 99 along the optical axis I, namely, an air gap between the filter 9 and the image plane 99 along the optical axis I;

AAG is a sum of the distance from the image-side surface 16 of the first lens element 1 to the object-side surface 25 of the second lens element 2 along the optical axis I, the distance from the image-side surface 26 of the second lens element 2 to the object-side surface 35 of the third lens element 3 along the optical axis I, the distance from the image-side surface 36 of the third lens element 3 to the object-side surface 45 of the fourth lens element 4 along the optical axis I, distance from the image-side surface 46 of the fourth lens element 4 to the object-side surface 55 of the fifth lens element 5 along the optical axis I, and the distance from the image-side surface 56 of the fifth lens element 5 to the object-side surface 65 of the sixth lens element 6 along the optical axis I;

ALT is a sum of the lens element thicknesses of the first lens element 1, the second lens element 2, the third lens element 3, the fourth lens element 4, the fifth lens element 5 and the sixth lens element 6 along the optical axis I, namely, a sum of T1, T2, T3, T4, T5, and T6;

EFL is an effective focal length of the optical imaging lens 10;

BFL is a distance from the image-side surface 66 of the sixth lens element 6 to the image plane 99 along the optical axis I;

TTL is a distance from the object-side surface 15 of the first lens element 1 to the image plane 99 along the optical axis I;

TL is a distance from the object-side surface 15 of the first lens element 1 to the image-side surface 66 of the sixth lens element 6 along the optical axis I;

HFOV is a half field of view of the optical imaging lens 10;

ImgH is an image height of the optical imaging lens 10;

Fno is a F-number of the optical imaging lens 10.

Figures 8A, 8B, 8C, 8D:
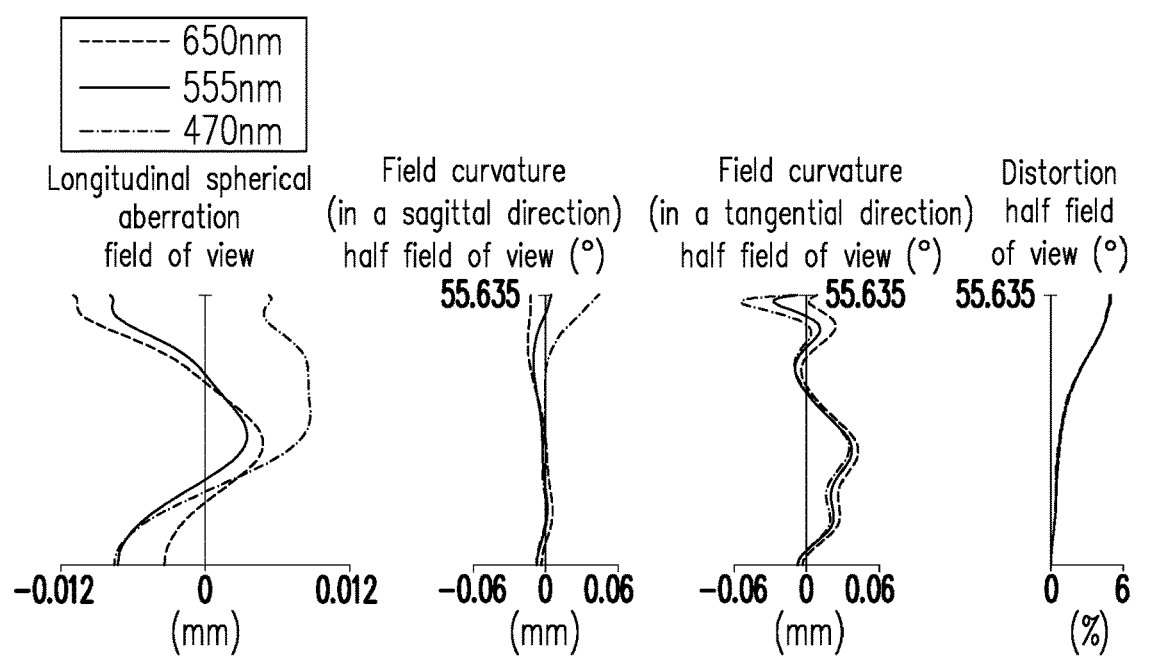
FIG. 8A to FIG. 8D are diagrams of longitudinal spherical aberrations and astigmatic aberrations of the optical imaging lens according to the first embodiment.

Further referring to FIG. 8A to FIG. 8D, FIG. 8A illustrates longitudinal spherical aberrations according to the first embodiment, FIG. 8B and FIG. 8C respectively illustrate field curvature aberrations in a sagittal direction and field curvature aberrations in a tangential direction on the image plane 99 in cases of wavelengths 470 nm, 555 nm, and 650 nm according to the first embodiment, and FIG. 8D illustrates distortion aberrations on the image plane 99 in cases of wavelengths 470 nm, 555 nm, and 650 nm according to the first embodiment. The longitudinal spherical aberrations of the first embodiment are shown in FIG. 8A, and curves of all the wavelengths are quite close to each other and approach the middle. It indicates that off-axis rays of all the wavelengths at different heights are focused near an imaging point. From deflection amplitude of the curves of all the wavelengths, it can be seen that imaging point deviations of the off-axis rays at different heights are controlled within a range of ±0.012 mm. Therefore, a spherical aberration of a same wavelength is definitely reduced in the first embodiment. In addition, the three representative wavelengths are also quite close to each other. It indicates that imaging positions of rays of different wavelengths are quite focused. Therefore, chromatic and astigmatic aberrations are also definitely reduced.

In the two field curvature aberration diagrams of FIG. 8B and FIG. 8C, focal length variations of the three representative wavelengths in an entire field of view fall within a range of ±0.06 mm. It indicates that astigmatic aberrations can be effectively eliminated by the optical system in the first embodiment. The distortion aberration diagram of FIG. 8D shows that the distortion aberrations of the first embodiment are retained within a range of ±6%. It indicates that the distortion aberrations of the first embodiment satisfy an imaging quality requirement of the optical system. To be specific, different from an existing optical lens, the first embodiment can still provide desired imaging quality when the TTL is reduced to approximately 7.176 mm. Therefore, the first embodiment can have a shorter length and achieve desired imaging quality while maintaining desired optical properties.

Figure 11A:
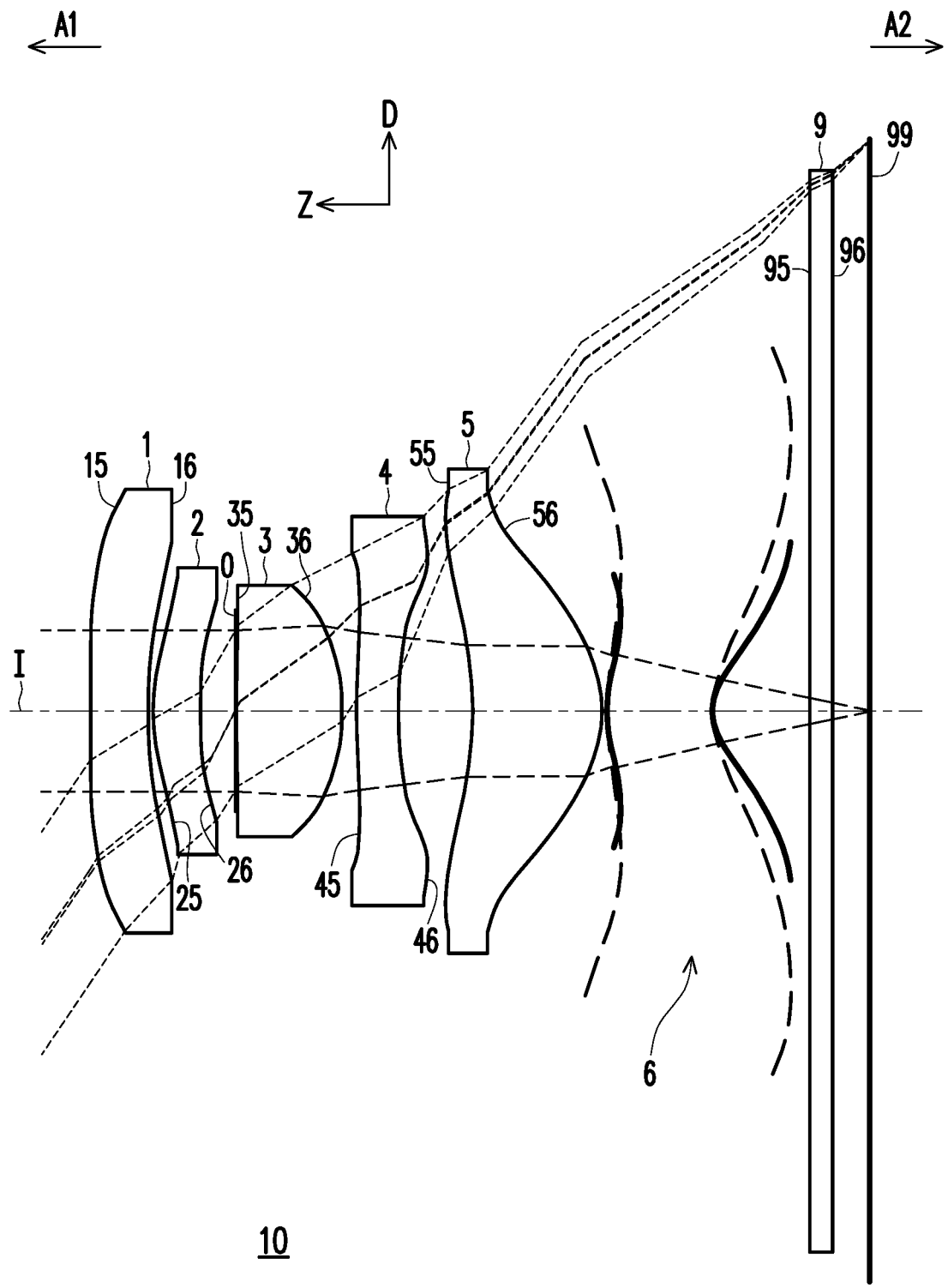
FIG. 11A is a schematic diagram of an optical imaging lens according to a second embodiment of the disclosure.
Figure 11B:
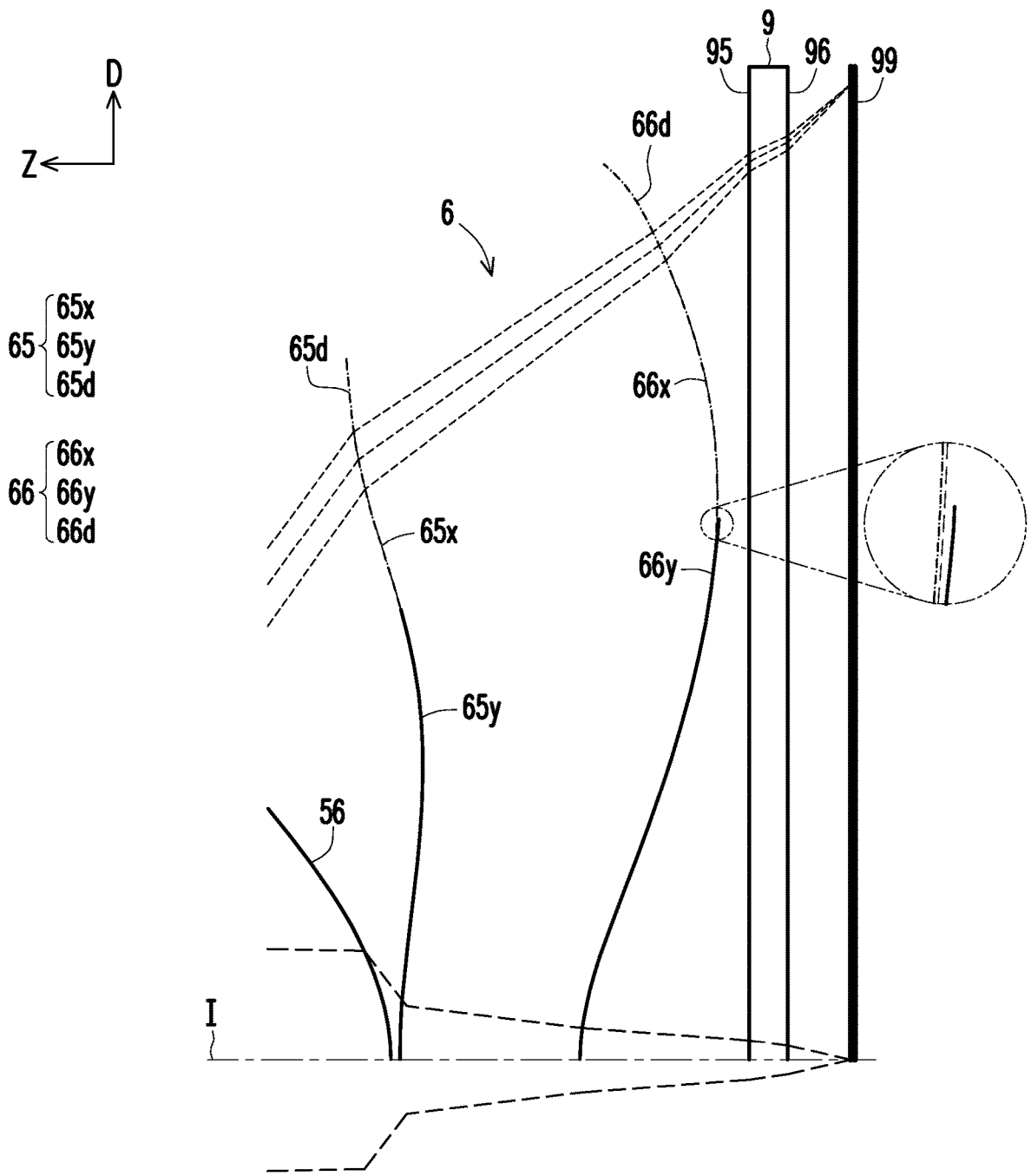
FIG. 11B is an enlarged radial cross-sectional view of the sixth lens element of FIG. 11A crossed by different planes.
Figure 11C:
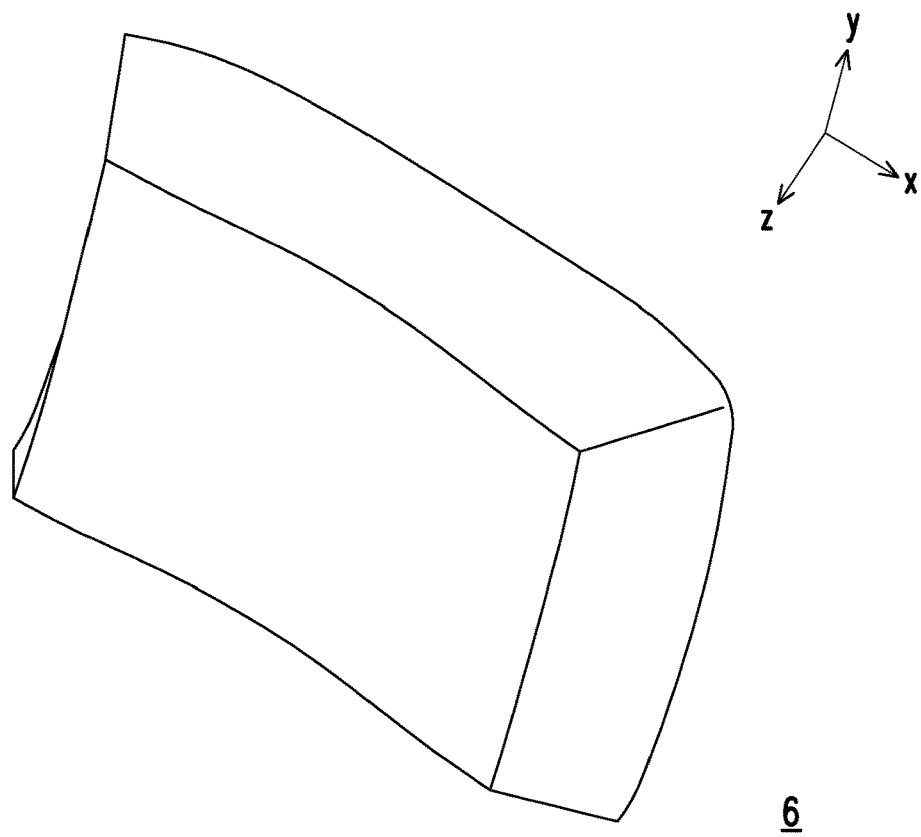
FIG. 11C is a schematic diagram of the appearance of the sixth lens element of FIG. 11A.

FIG. 11A is a schematic diagram of an optical imaging lens according to a second embodiment of the disclosure. FIG. 11B is an enlarged radial cross-sectional view of the sixth lens element of FIG. 11A crossed by different planes. FIG. 11C is a schematic diagram of the appearance of the sixth lens element of FIG. 11A. FIG. 12A to FIG. 12D are diagrams of longitudinal spherical aberrations and astigmatic aberrations of the optical imaging lens according to the second embodiment. Referring to FIG. 11A first, the second embodiment of the optical imaging lens 10 of the disclosure is basically similar to the first embodiment, which differs as follows: optical data, aspheric surface coefficients, and parameters between the lens elements 1, 2, 3, 4, 5, and 6 are different to some extent. Herein, it should be noted that, for clearly presenting the diagram, same reference numbers of optical axis regions and periphery regions in the two embodiments are omitted in FIG. 11A.

Detailed optical data of the optical imaging lens 10 in the second embodiment is shown in FIG. 13, and the optical imaging lens 10 in the second embodiment has an EFL of 3.358 mm, an HFOV of 55.989°, a Fno of 2.257, a TTL of 7.152 mm, and an image height of 5.233 mm.

Aspheric surface coefficients of the object-side surface 15 of the first lens element 1 to the image-side surface 56 of the fifth lens element 5 in the second embodiment in Formula (1) are shown in FIG. 14A and FIG. 14B. Coefficients of each term of the $X^mY^n$ of the object-side surface 65 and the image-side surface 66 of the sixth lens element 6 in the second embodiment in Formula (2) are shown in FIG. 10C and FIG. 10D. FIG. 14E shows the corresponding Sag values of the sixth lens element of the second embodiment of the disclosure at the two selected coordinate values on the XY plane.

In addition, the relationships between important parameters of the optical imaging lens 10 in the second embodiment is shown in FIG. 47 and FIG. 48.

Figures 12A, 12B, 12C, 12D:
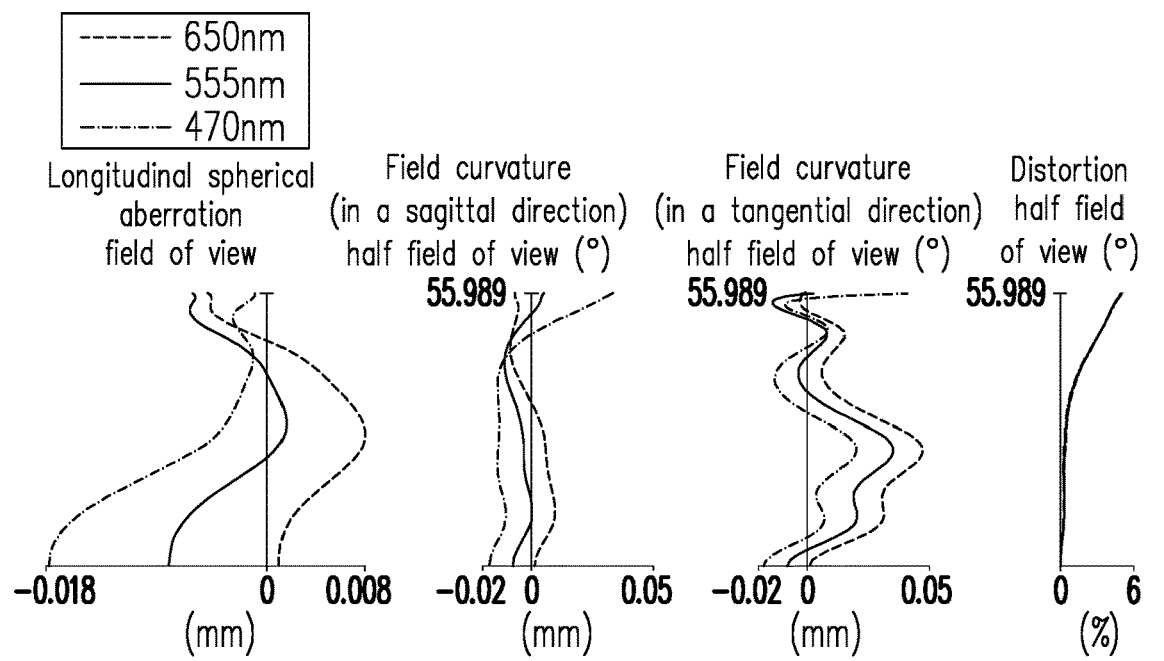
FIG. 12A to FIG. 12D are diagrams of longitudinal spherical aberrations and astigmatic aberrations of the optical imaging lens according to the second embodiment.

Longitudinal spherical aberrations of the second embodiment are shown in FIG. 12A, and imaging point deviations of off-axis rays at different heights are controlled within a range of ±0.018 mm. In two field curvature aberration diagrams of FIG. 12B and FIG. 12C, focal length variations of three representative wavelengths in an entire field of view fall within a range of ±0.05 mm. A distortion aberration diagram of FIG. 12D shows that distortion aberrations of the second embodiment are retained within a range of ±6%.

Based on the above, it can be seen that the HFOV in the second embodiment is greater than the HFOV in the first embodiment. Therefore, compared with the first embodiment, the second embodiment has a larger image receiving angle. In addition, the TTL of the second embodiment is shorter than the TTL of the first embodiment. The field curvature aberrations of the second embodiment are less than the field curvature aberrations of the first embodiment.

Figure 15A:
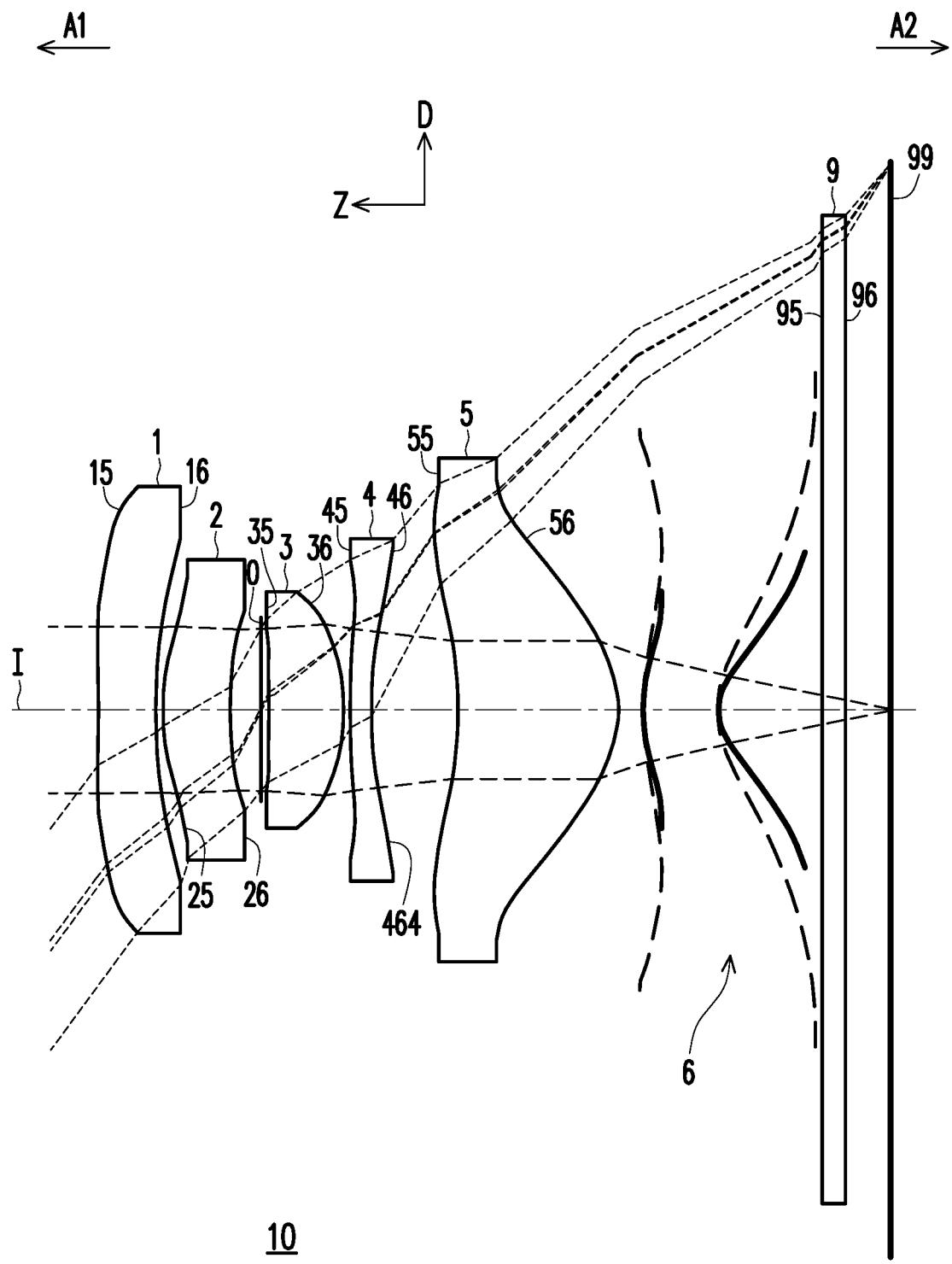
FIG. 15A is a schematic diagram of an optical imaging lens according to a third embodiment of the disclosure.
Figure 15B:
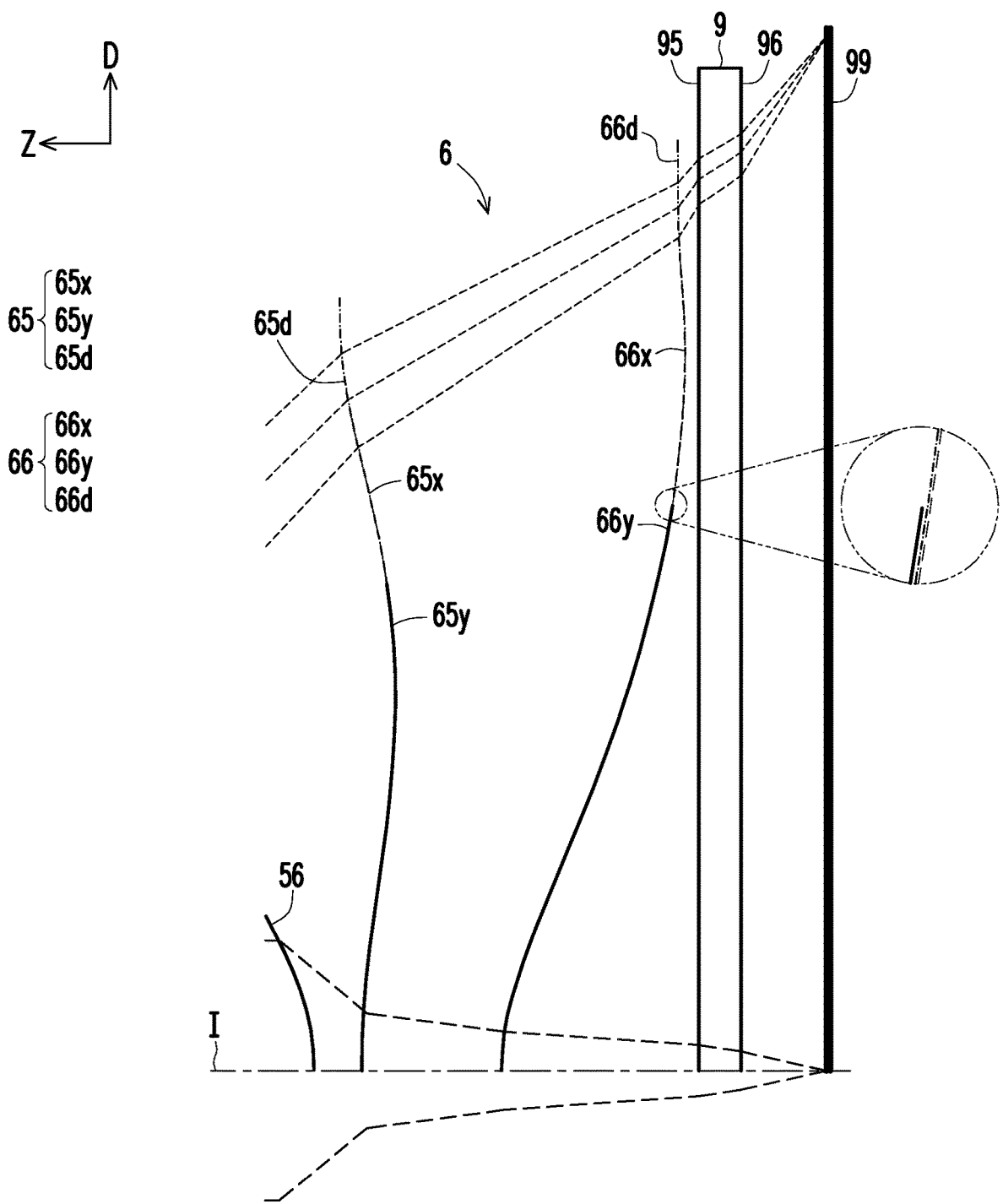
FIG. 15B is an enlarged radial cross-sectional view of the sixth lens element of FIG. 15A crossed by different planes.
Figure 15C:
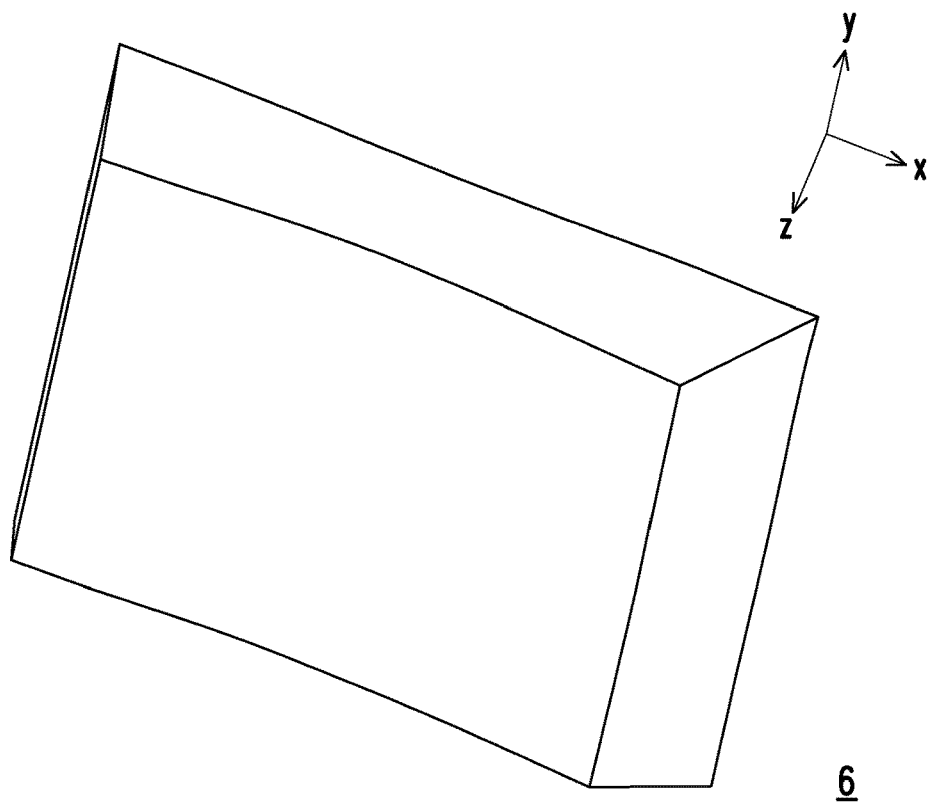
FIG. 15C is a schematic diagram of the appearance of the sixth lens element of FIG. 15A.

FIG. 15A is a schematic diagram of an optical imaging lens according to a third embodiment of the disclosure. FIG. 15B is an enlarged radial cross-sectional view of the sixth lens element of FIG. 15A crossed by different planes. FIG. 15C is a schematic diagram of the appearance of the sixth lens element of FIG. 15A. FIG. 16A to FIG. 16D are diagrams of longitudinal spherical aberrations and astigmatic aberrations of the optical imaging lens according to the third embodiment. Referring to FIG. 15A first, the third embodiment of the optical imaging lens 10 of the disclosure is basically similar to the first embodiment, which differs as follows: optical data, aspheric surface coefficients, and parameters between the lens elements 1, 2, 3, 4, 5, and 6 are different to some extent. In addition, in the present embodiment, the periphery region 464 of the image-side surface 46 of the fourth lens element 4 is concave. Herein, it should be noted that, for clearly presenting the diagram, reference numbers of optical axis regions and periphery regions with surface structures similar to that of in the first embodiment are omitted in FIG. 15A.

Detailed optical data of the optical imaging lens 10 in the third embodiment is shown in FIG. 17, and the optical imaging lens 10 in the third embodiment has an EFL of 3.633 mm, an HFOV of 53.888°, a Fno of 2.257, a TTL of 7.535 mm, and an image height of 5.233 mm.

Aspheric surface coefficients of the object-side surface 15 of the first lens element 1 to the image-side surface 56 of the fifth lens element 5 in the third embodiment in Formula (1) are shown in FIG. 18A and FIG. 18B. Coefficients of each term of the $X^mY^n$ of the object-side surface 65 and the image-side surface 66 of the sixth lens element 6 in the third embodiment in Formula (2) are shown in FIG. 18C and FIG. 18D. FIG. 18E shows the corresponding Sag values of the sixth lens element of the third embodiment of the disclosure at the two selected coordinate values on the XY plane.

In addition, the relationships between important parameters of the optical imaging lens 10 in the third embodiment is shown in FIG. 47 and FIG. 48.

Figures 16A, 16B, 16C, 16D:
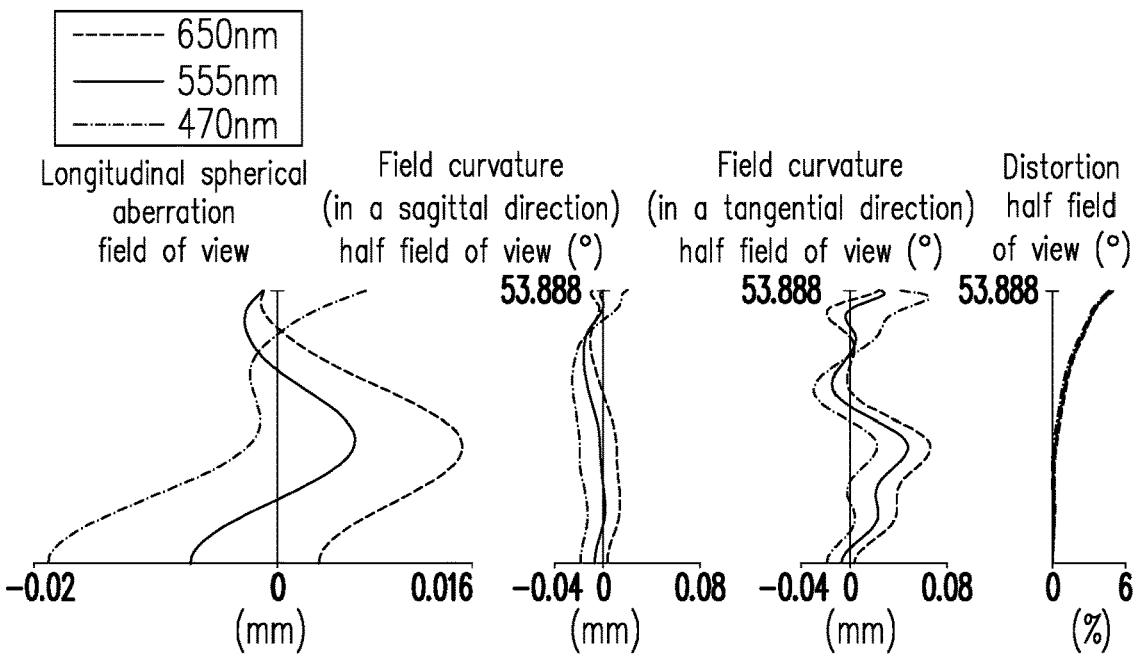
FIG. 16A to FIG. 16D are diagrams of longitudinal spherical aberrations and astigmatic aberrations of the optical imaging lens according to the third embodiment.

Longitudinal spherical aberrations of the third embodiment are shown in FIG. 16A, and imaging point deviations of off-axis rays at different heights are controlled within a range of ±0.02 mm. In two field curvature aberration diagrams of FIG. 16B and FIG. 16C, focal length variations of three representative wavelengths in an entire field of view fall within a range of ±0.08 mm. A distortion aberration diagram of FIG. 16D shows that distortion aberrations of the third embodiment are retained within a range of ±6%.

Figure 19A:
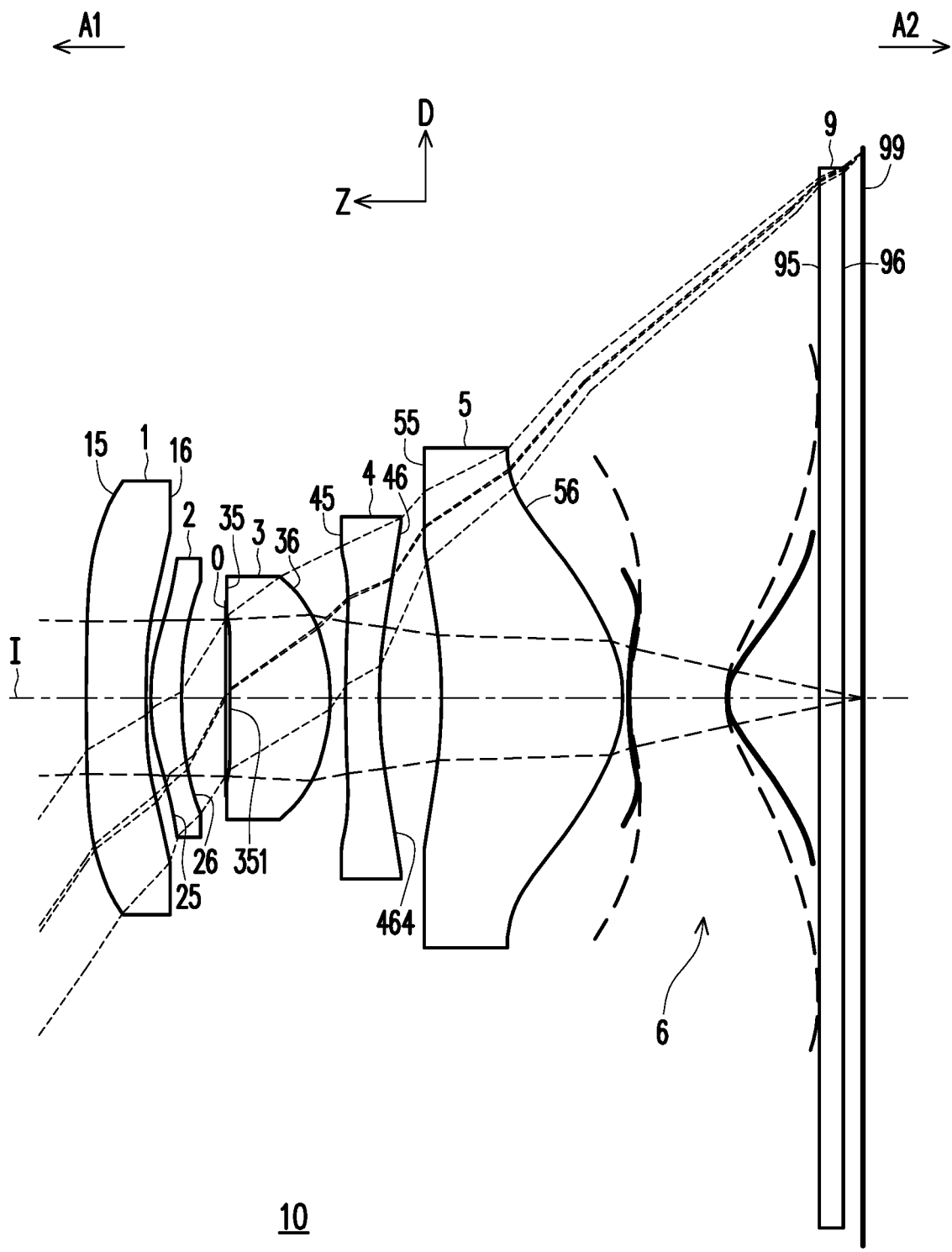
FIG. 19A is a schematic diagram of an optical imaging lens according to a fourth embodiment of the disclosure.
Figure 19B:
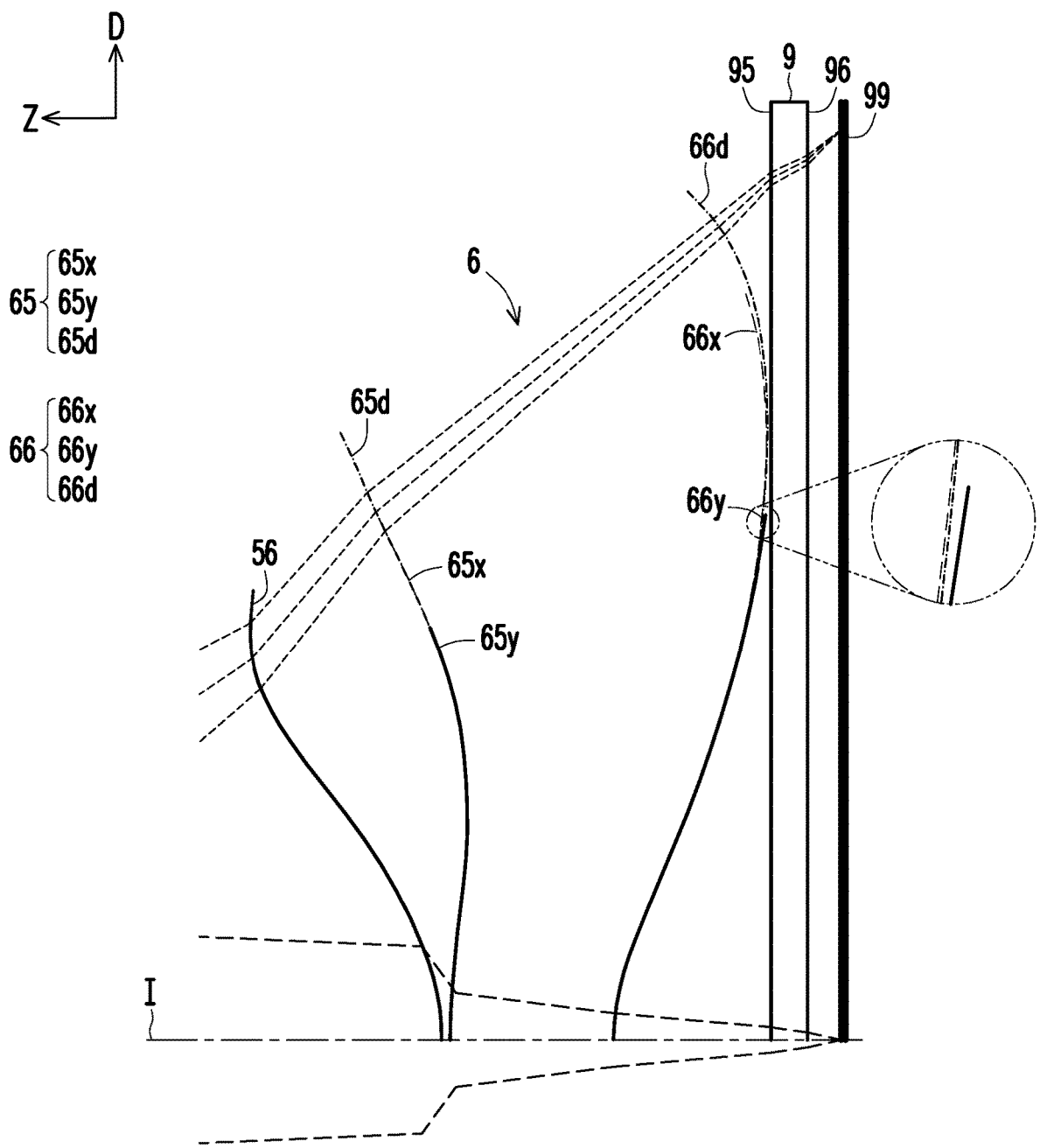
FIG. 19B is an enlarged radial cross-sectional view of the sixth lens element of FIG. 19A crossed by different planes.
Figure 19C:
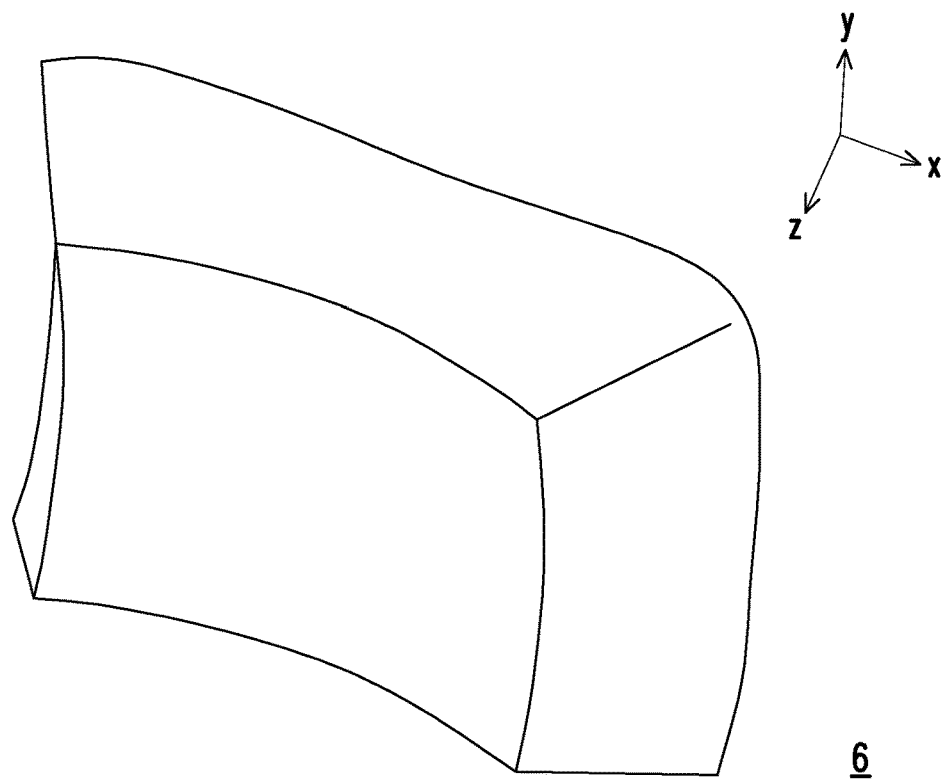
FIG. 19C is a schematic diagram of the appearance of the sixth lens element of FIG. 19A.

FIG. 19A is a schematic diagram of an optical imaging lens according to a fourth embodiment of the disclosure. FIG. 19B is an enlarged radial cross-sectional view of the sixth lens element of FIG. 19A crossed by different planes. FIG. 19C is a schematic diagram of the appearance of the sixth lens element of FIG. 19A. FIG. 20A to FIG. 20D are diagrams of longitudinal spherical aberrations and astigmatic aberrations of the optical imaging lens according to the fourth embodiment. Referring to FIG. 19A first, the fourth embodiment of the optical imaging lens 10 of the disclosure is basically similar to the first embodiment, which differs as follows: optical data, aspheric surface coefficients, and parameters between the lens elements 1, 2, 3, 4, 5, and 6 are different to some extent. In addition, in the present embodiment, the optical axis region 351 of the object-side surface 35 of the third lens element 3 is convex, and the periphery region 464 of the image-side surface 46 of the fourth lens element 4 is concave. Herein, it should be noted that, for clearly presenting the diagram, reference numbers of optical axis regions and periphery regions with surface structures similar to that of in the first embodiment are omitted in FIG. 19A.

Detailed optical data of the optical imaging lens 10 in the fourth embodiment is shown in FIG. 21, and the optical imaging lens 10 in the fourth embodiment has an EFL of 3.394 mm, an HFOV of 55.751°, a Fno of 2.257, a TTL of 7.421 mm, and an image height of 5.233 mm.

Aspheric surface coefficients of the object-side surface 15 of the first lens element 1 to the image-side surface 56 of the fifth lens element 5 in the fourth embodiment in Formula (1) are shown in FIG. 22A and FIG. 22B. Coefficients of each term of the X'''Y''' of the object-side surface 65 and the image-side surface 66 of the sixth lens element 6 in the fourth embodiment in Formula (2) are shown in FIG. 22C and FIG. 22D. FIG. 22E shows the corresponding Sag values of the sixth lens element of the fourth embodiment of the disclosure at the two selected coordinate values on the XY plane.

In addition, the relationships between important parameters of the optical imaging lens 10 in the fourth embodiment is shown in FIG. 47 and FIG. 48.

Figures 20A, 20B, 20C, 20D:
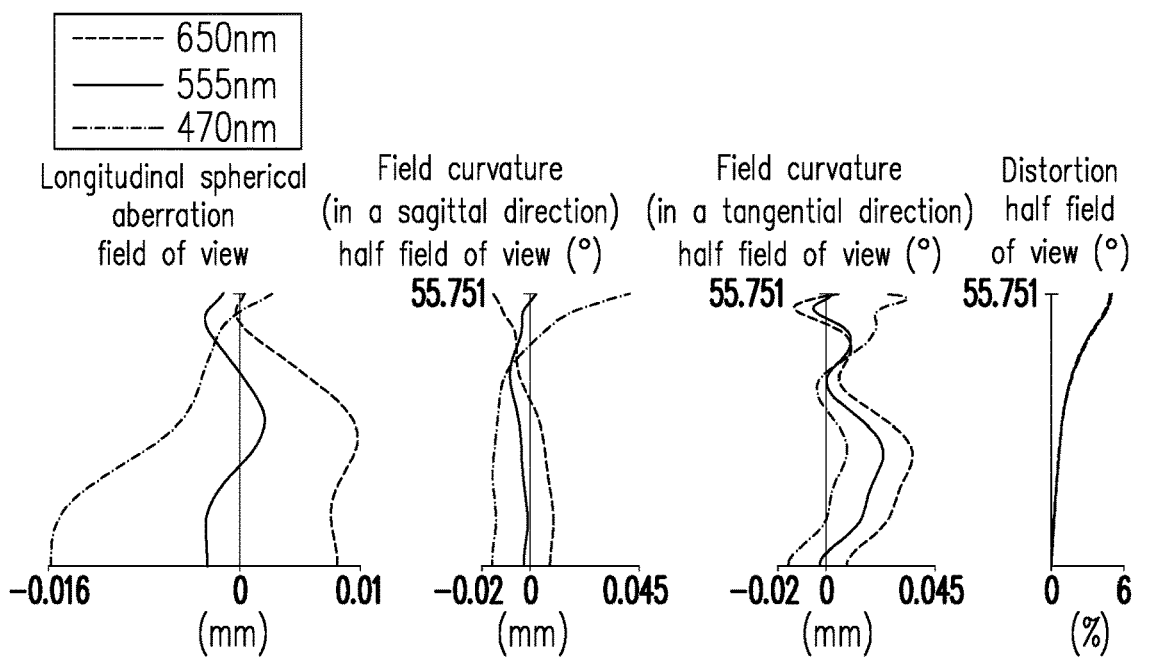
FIG. 20A to FIG. 20D are diagrams of longitudinal spherical aberrations and astigmatic aberrations of the optical imaging lens according to the fourth embodiment.

Longitudinal spherical aberrations of the fourth embodiment are shown in FIG. 20A, and imaging point deviations of off-axis rays at different heights are controlled within a range of ±0.016 mm. In two field curvature aberration diagrams of FIG. 20B and FIG. 20C, focal length variations of three representative wavelengths in an entire field of view fall within a range of ±0.045 mm. A distortion aberration diagram of FIG. 20D shows that distortion aberrations of the fourth embodiment are retained within a range of ±6%.

Based on the above, it can be seen that the HFOV in the fourth embodiment is greater than the HFOV in the first embodiment. Therefore, compared with the first embodiment, the fourth embodiment has a larger image receiving angle. The field curvature aberrations of the fourth embodiment are less than the field curvature aberrations of the first embodiment.

Figure 23A:
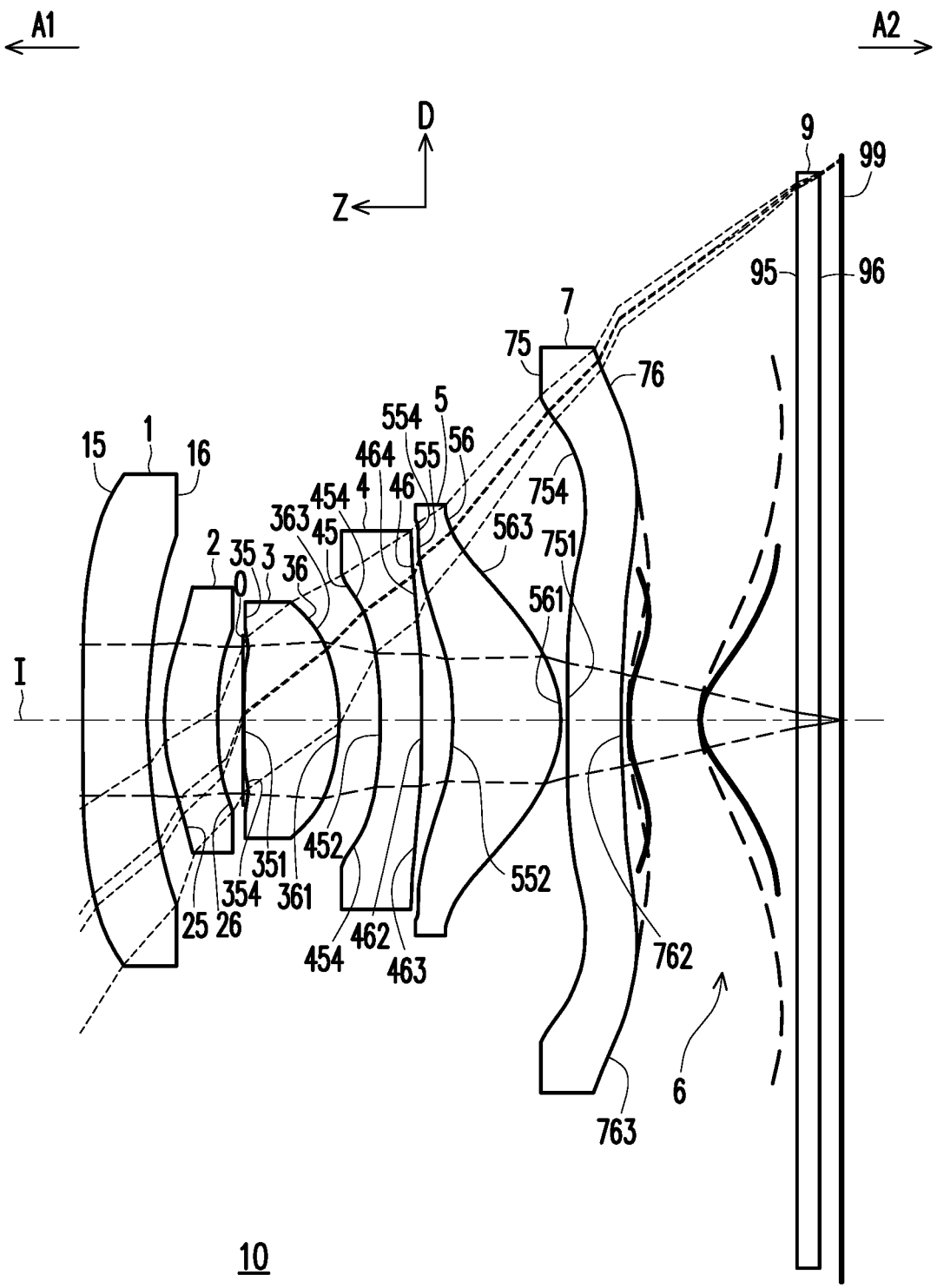
FIG. 23A is a schematic diagram of an optical imaging lens according to a fifth embodiment of the disclosure.
Figure 23B:
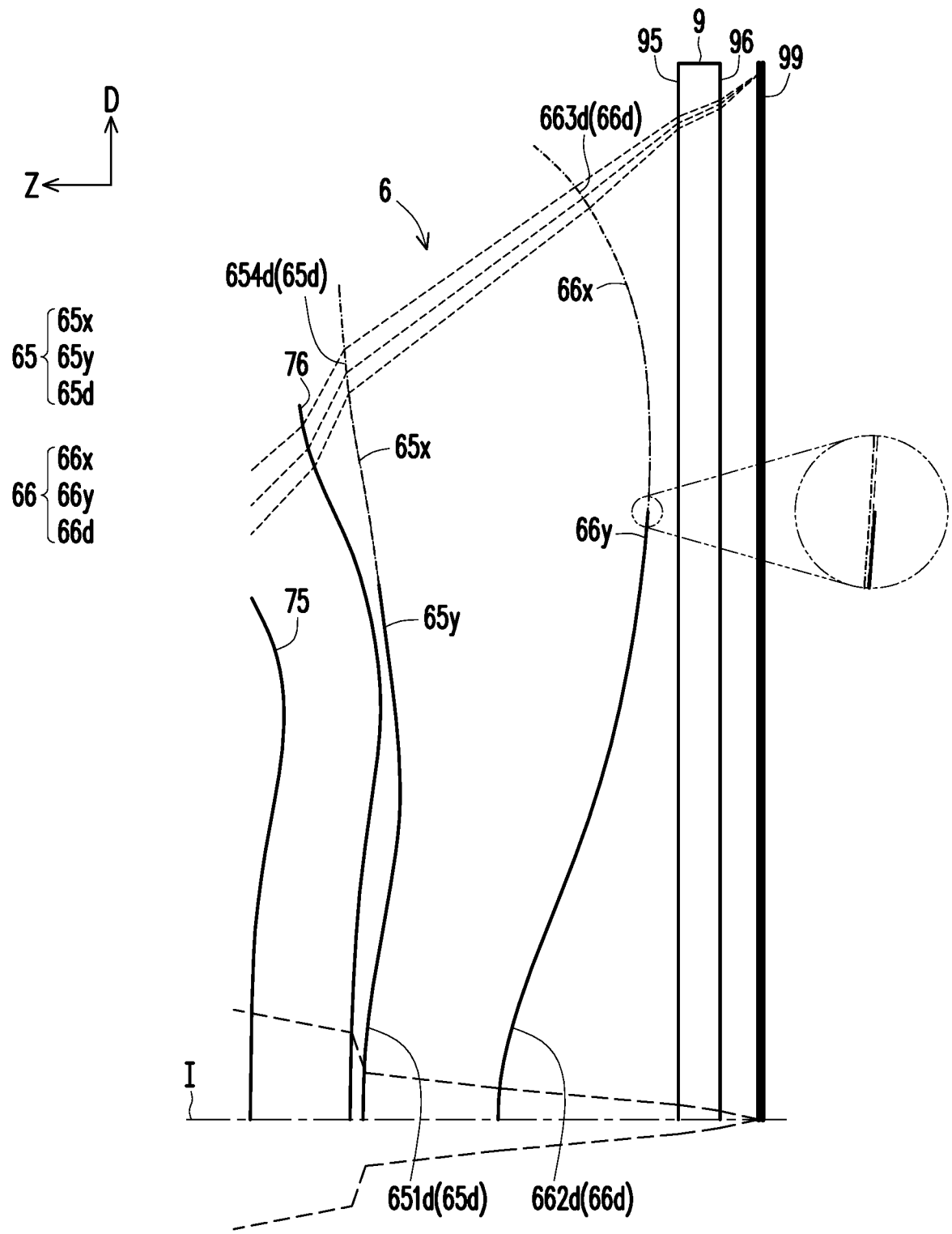
FIG. 23B is an enlarged radial cross-sectional view of the sixth lens element of FIG. 23A crossed by different planes.

FIG. 23A is a schematic diagram of an optical imaging lens according to a fifth embodiment of the disclosure. FIG. 23B is an enlarged radial cross-sectional view of the sixth lens element of FIG. 23A crossed by different planes. FIG. 23C is a schematic diagram of the appearance of the sixth lens element of FIG. 23A. FIG. 24A to FIG. 24D are diagrams of longitudinal spherical aberrations and astigmatic aberrations of the optical imaging lens according to the fifth embodiment. Referring to FIG. 23A, an optical imaging lens 10 in the fifth embodiment of the disclosure sequentially includes a first lens element 1, a second lens element 2, an aperture 0, a third lens element 3, a fourth lens element 4, a fifth lens element 5, a seventh lens element 7, a sixth lens element 6, and a filter 9 from an object side A1 to an image side A2 along an optical axis I of the optical imaging lens 10. After entering the optical imaging lens 10, rays emitted from a to-be-photographed object pass through the first lens element 1, the second lens element 2, the aperture 0, the third lens element 3, the fourth lens element 4, the fifth lens element 5, the seventh lens element 7, the sixth lens element 6, and the filter 9, and form an image on an image plane 99. The filter 9 is disposed between an image-side surface 66 of the sixth lens element 6 and the image plane 99. It should be noted that, the object side is a side facing the to-be-photographed object, and the image side is a side facing the image plane 99. In the present embodiment, the filter 9 is an IR cut filter.

In the present embodiment, the seventh lens element 7 of the optical imaging lens 10 includes an object-side surfaces 75 facing the object side and allowing imaging rays to pass through and an image-side surfaces 76 facing the image side and allowing the imaging rays to pass through.

The difference in the surface structures of the lens element between the fifth embodiment and the first embodiment will be described in detail in the following paragraphs. For brevity, the reference numbers omitted are as that of shown in the first embodiment.

The third lens element 3 has positive refracting power. The third lens element 3 is made from a plastic material. An optical axis region 351 of the object-side surface 35 of the third lens element 3 is convex, and a periphery region 354 of the object-side surface 35 of the third lens element 3 is concave. An optical axis region 361 of the image-side surface 36 of the third lens element 3 is convex, and a periphery region 363 of the image-side surface 36 of the third lens element 3 is convex. In the present embodiment, both the object-side surface 35 and the image-side surface 36 of the third lens element 3 are aspheric surfaces, but the disclosure is not limited thereto.

The fourth lens element 4 has negative refracting power. The fourth lens element 4 is made from a plastic material. An optical axis region 452 of the object-side surface 45 of the fourth lens element 4 is concave, and a periphery region 454 of the object-side surface 45 of the fourth lens element 4 is concave. An optical axis region 462 of the image-side surface 46 of the fourth lens element 4 is concave, and a periphery region 463 of the image-side surface 46 of the fourth lens element 4 is convex. In the present embodiment, both the object-side surface 45 and the image-side surface 46 of the fourth lens element 4 are aspheric surfaces, but the disclosure is not limited thereto.

The fifth lens element 5 has positive refracting power. The fifth lens element 5 is made from a plastic material. An optical axis region 552 of the object-side surface 55 of the fifth lens element 5 is concave, and a periphery region 554 of the object-side surface 55 of the fifth lens element 5 is concave. An optical axis region 561 of the image-side surface 56 of the fifth lens element 5 is convex, and a periphery region 563 of the image-side surface 56 of the fifth lens element 5 is convex. In the present embodiment, both the object-side surface 55 and the image-side surface 56 of the fifth lens element 5 are aspheric surfaces, but the disclosure is not limited thereto.

The seventh lens element 7 has positive refracting power. The seventh lens element 7 is made from a plastic material. An optical axis region 751 of the object-side surface 75 of the seventh lens element 7 is convex, and a periphery region 754 of the object-side surface 75 of the seventh lens element 7 is concave. An optical axis region 762 of the image-side surface 76 of the seventh lens element 7 is concave, and a periphery region 763 of the image-side surface 76 of the seventh lens element 7 is convex. In the present embodiment, both the object-side surface 75 and the image-side surface 76 of the seventh lens element 7 are aspheric surfaces, but the disclosure is not limited thereto.

The sixth lens element 6 has negative refracting power. The sixth lens element 6 is made from a plastic material. The sixth lens element 6 is a free-form lens element, and the object-side surface 65 and the image-side surface 66 of the sixth lens element 6 are both free form surfaces. Referring to FIG. 23B, in the intersection curves 65$d$, 66$d$ of the object-side surface 65 and the image-side surface 66 crossed by the third reference plane, an optical axis region 651$d$ of the object-side surface 65 of the sixth lens element 6 is convex, and a periphery region 654$d$ of the object-side surface 65 of the sixth lens element 6 is concave. An optical axis region 662$d$ of the image-side surface 66 of the sixth lens element 6 is concave, and a periphery region 663$d$ of the image-side surface 66 of the sixth lens element 6 is convex.

In the present embodiment, only the above seven lens elements of the optical imaging lens 10 have refracting power.

Detailed optical data of the optical imaging lens 10 in the fifth embodiment is shown in FIG. 25, and the optical imaging lens 10 in the fifth embodiment has an EFL of 3.193 mm, an HFOV of 57.314°, a Fno of 2.241, a TTL of 7.059 mm, and an image height of 5.233 mm.

Aspheric surface coefficients of the object-side surface 15 of the first lens element 1 to the image-side surface 56 of the fifth lens element 5 and the object-side surface 75 and image-side surface 76 of the seventh lens element 7 in the fifth embodiment in Formula (1) are shown in FIG. 26A and FIG. 26B. Coefficients of each term of the $X^m Y^n$ of the object-side surface 65 and the image-side surface 66 of the sixth lens element 6 in the fifth embodiment in Formula (2) are shown in FIG. 26C and FIG. 26D. FIG. 26E shows the corresponding Sag values of the sixth lens element of the fifth embodiment of the disclosure at the two selected coordinate values on the XY plane.

In addition, the relationships between important parameters of the optical imaging lens 10 in the fifth embodiment is shown in FIG. 47 and FIG. 48.

Where:

V7 is an Abbe number of the seventh lens element 7;

T7 is a thickness of the seventh lens element 7 along the optical axis I;

G57 is a distance from the image-side surface 56 of the fifth lens element 5 to the object-side surface 75 of the seventh lens element 7 along the optical axis I;

G76 is a distance from the image-side surface 76 of the seventh lens element 7 to the object-side surface 65 of the sixth lens element 6 along the optical axis I;

Longitudinal spherical aberrations of the fifth embodiment are shown in FIG. 24A, and imaging point deviations of off-axis rays at different heights are controlled within a range of ±0.016 mm. In two field curvature aberration diagrams of FIG. 24B and FIG. 24C, focal length variations of three representative wavelengths in an entire field of view fall within a range of ±0.04 mm. A distortion aberration diagram of FIG. 24D shows that distortion aberrations of the fifth embodiment are retained within a range of ±5%.

Based on the above, it can be seen that the HFOV in the fifth embodiment is greater than the HFOV in the first embodiment. Therefore, compared with the first embodiment, the fifth embodiment has a larger image receiving angle. In addition, the TTL of the fifth embodiment is shorter than the TTL of the first embodiment. The field curvature aberrations of the fifth embodiment are less than the field curvature aberrations of the first embodiment. The distortion aberration of the fifth embodiment is less than the distortion aberration of the first embodiment.

Figure 27A:
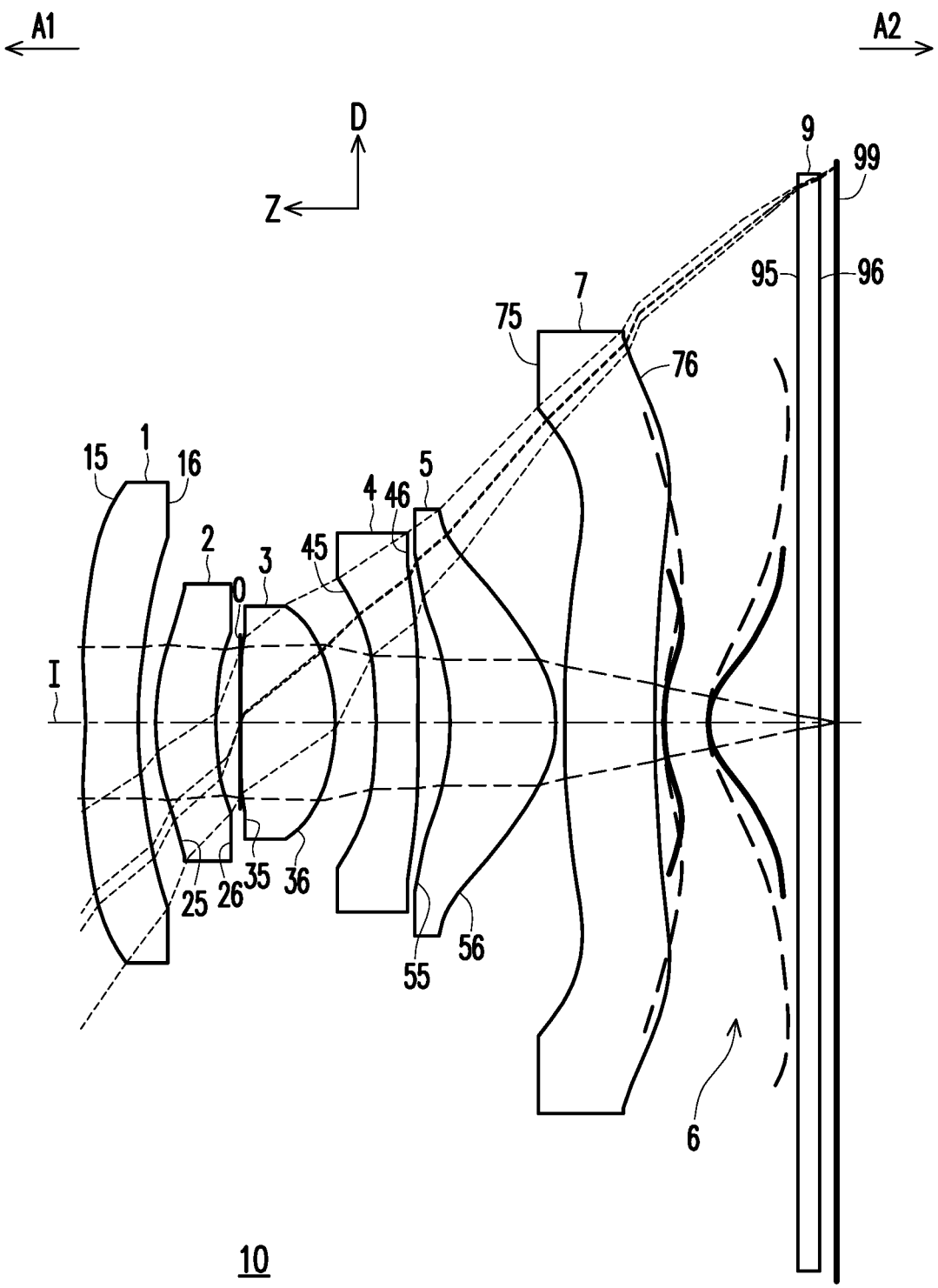
FIG. 27A is a schematic diagram of an optical imaging lens according to a sixth embodiment of the disclosure.
Figure 27B:
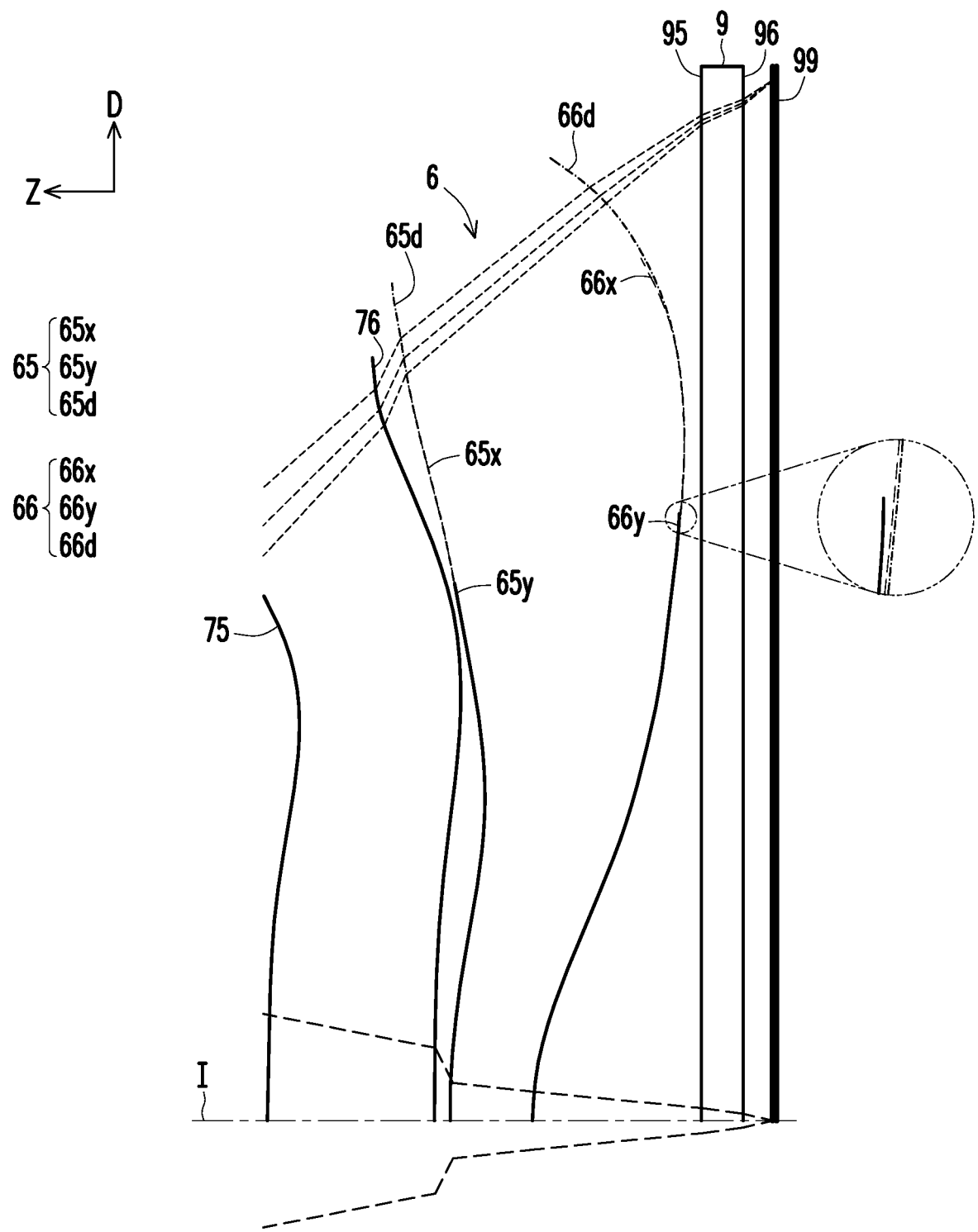
FIG. 27B is an enlarged radial cross-sectional view of the sixth lens element of FIG. 27A crossed by different planes.

FIG. 27A is a schematic diagram of an optical imaging lens according to a sixth embodiment of the disclosure. FIG. 27B is an enlarged radial cross-sectional view of the sixth lens element of FIG. 27A crossed by different planes. FIG. 27C is a schematic diagram of the appearance of the sixth lens element of FIG. 27A. FIG. 28A to FIG. 28D are diagrams of longitudinal spherical aberrations and astigmatic aberrations of the optical imaging lens according to the sixth embodiment. Referring to FIG. 27A first, the sixth embodiment of the optical imaging lens 10 of the disclosure is basically similar to the fifth embodiment, which differs as follows: optical data, aspheric surface coefficients, and parameters between the lens elements 1, 2, 3, 4, 5, 6, and 7 are different to some extent. Herein, it should be noted that, for clearly presenting the diagram, reference numbers of optical axis regions and periphery regions with surface structures similar to that of in the fifth embodiment are omitted in FIG. 27A.

Detailed optical data of the optical imaging lens 10 in the sixth embodiment is shown in FIG. 29, and the optical imaging lens 10 in the sixth embodiment has an EFL of 3.235 mm, an HFOV of 56.972°, a Fno of 2.241, a TTL of 7.076 mm, and an image height of 5.233 mm.

Aspheric surface coefficients of the object-side surface 15 of the first lens element 1 to the image-side surface 56 of the fifth lens element 5 and the object-side surface 75 and image-side surface 76 of the seventh lens element 7 in the sixth embodiment in Formula (1) are shown in FIG. 30A and FIG. 30B. Coefficients of each term of the $X^m Y^n$ of the object-side surface 65 and the image-side surface 66 of the sixth lens element 6 in the sixth embodiment in Formula (2) are shown in FIG. 30C and FIG. 30D. FIG. 30E shows the corresponding Sag values of the sixth lens element of the sixth embodiment of the disclosure at the two selected coordinate values on the XY plane.

In addition, the relationships between important parameters of the optical imaging lens 10 in the sixth embodiment is shown in FIG. 49 and FIG. 50.

Longitudinal spherical aberrations of the sixth embodiment are shown in FIG. 28A, and imaging point deviations of off-axis rays at different heights are controlled within a range of ±0.02 mm. In two field curvature aberration diagrams of FIG. 28B and FIG. 28C, focal length variations of three representative wavelengths in an entire field of view fall within a range of ±0.09 mm. A distortion aberration diagram of FIG. 28D shows that distortion aberrations of the sixth embodiment are retained within a range of ±5%.

Based on the above, it can be seen that the HFOV in the sixth embodiment is greater than the HFOV in the first embodiment. Therefore, compared with the first embodiment, the sixth embodiment has a larger image receiving angle. In addition, the TTL of the sixth embodiment is shorter than the TTL of the first embodiment. The distortion aberration of the sixth embodiment is less than the distortion aberration of the first embodiment.

Figure 31A:
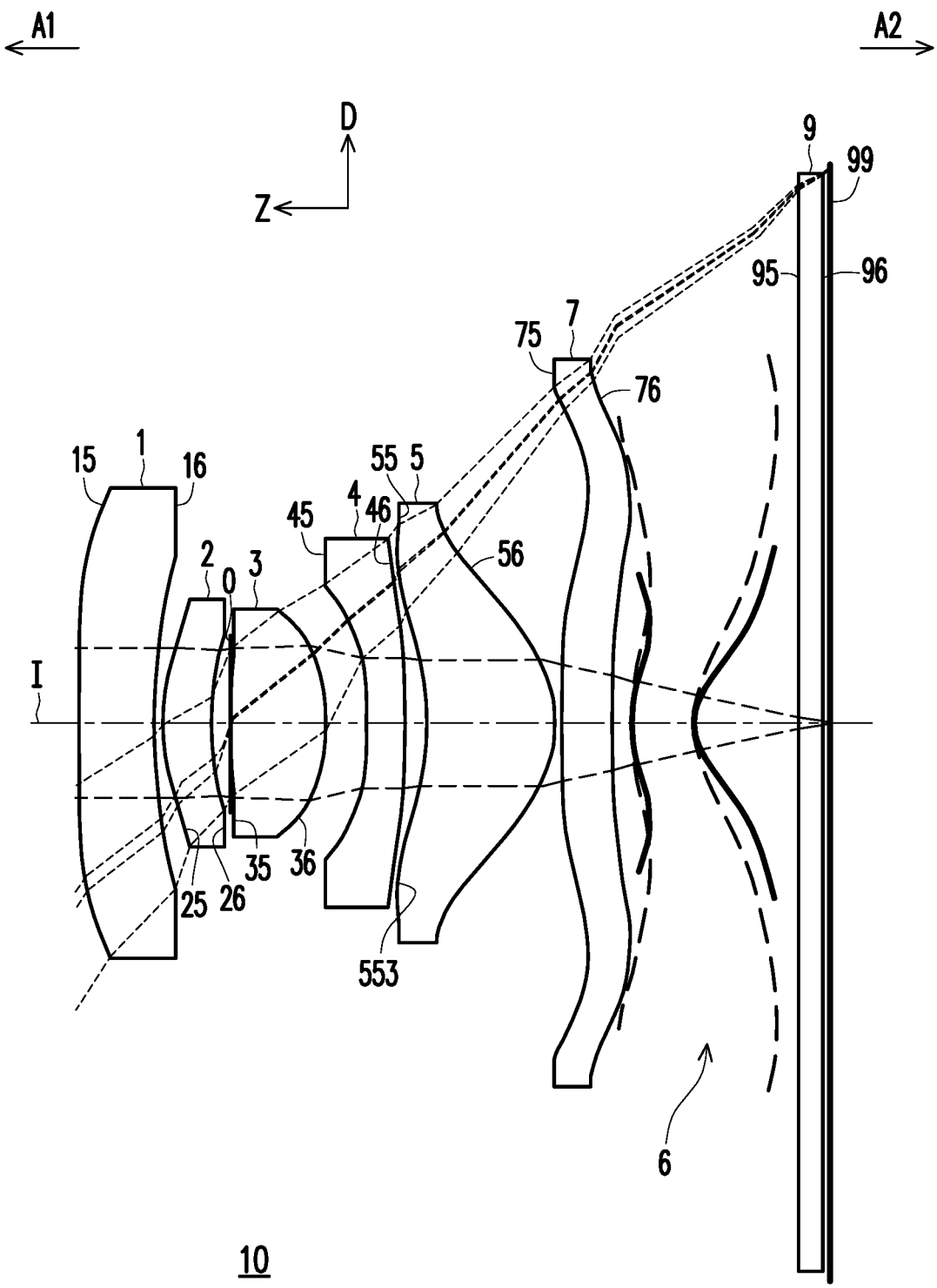
FIG. 31A is a schematic diagram of an optical imaging lens according to a seventh embodiment of the disclosure.
Figure 31B:
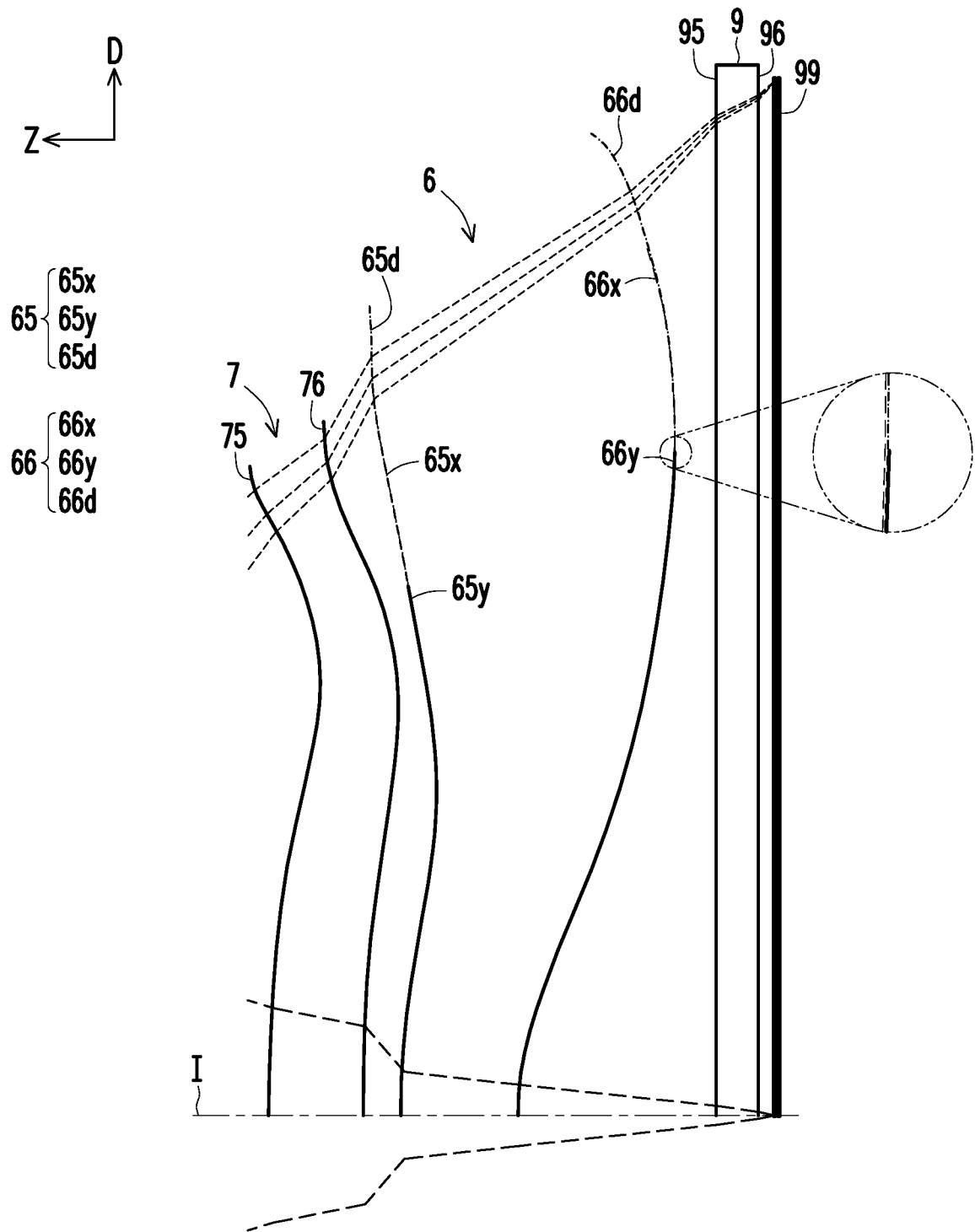
FIG. 31B is an enlarged radial cross-sectional view of the sixth lens element of FIG. 31A crossed by different planes.

FIG. 31A is a schematic diagram of an optical imaging lens according to a seventh embodiment of the disclosure. FIG. 31B is an enlarged radial cross-sectional view of the sixth lens element of FIG. 31A crossed by different planes. FIG. 31C is a schematic diagram of the appearance of the sixth lens element of FIG. 31A. FIG. 32A to FIG. 32D are diagrams of longitudinal spherical aberrations and astigmatic aberrations of the optical imaging lens according to the seventh embodiment. Referring to FIG. 31A first, the seventh embodiment of the optical imaging lens 10 of the disclosure is basically similar to the fifth embodiment, which differs as follows: optical data, aspheric surface coefficients, and parameters between the lens elements 1, 2, 3, 4, 5, 6, and 7 are different to some extent. In addition, in the present embodiment, the periphery region 553 of the object-side surface 55 of the fifth lens element 5 is convex. Herein, it should be noted that, for clearly presenting the diagram, reference numbers of optical axis regions and periphery regions with surface structures similar to that of in the first embodiment are omitted in FIG. 31A.

Detailed optical data of the optical imaging lens 10 in the seventh embodiment is shown in FIG. 33, and the optical imaging lens 10 in the seventh embodiment has an EFL of 3.197 mm, an HFOV of 57.281°, a Fno of 2.241, a TTL of 7.095 mm, and an image height of 5.233 mm.

Aspheric surface coefficients of the object-side surface 15 of the first lens element 1 to the image-side surface 56 of the fifth lens element 5 and the object-side surface 75 and image-side surface 76 of the seventh lens element 7 in the seventh embodiment in Formula (1) are shown in FIG. 34A and FIG. 34B. Coefficients of each term of the $X^m Y^n$ of the object-side surface 65 and the image-side surface 66 of the sixth lens element 6 in the seventh embodiment in Formula (2) are shown in FIG. 34C and FIG. 34D. FIG. 34E shows the corresponding Sag values of the sixth lens element of the seventh embodiment of the disclosure at the two selected coordinate values on the XY plane.

In addition, the relationships between important parameters of the optical imaging lens 10 in the seventh embodiment is shown in FIG. 49 and FIG. 50.

Longitudinal spherical aberrations of the seventh embodiment are shown in FIG. 32A, and imaging point deviations of off-axis rays at different heights are controlled within a range of ±0.018 mm. In two field curvature aberration diagrams of FIG. 32B and FIG. 32C, focal length variations of three representative wavelengths in an entire field of view fall within a range of ±0.06 mm. A distortion aberration diagram of FIG. 32D shows that distortion aberrations of the seventh embodiment are retained within a range of ±5%.

Based on the above, it can be seen that the HFOV in the seventh embodiment is greater than the HFOV in the first embodiment. Therefore, compared with the first embodiment, the seventh embodiment has a larger image receiving angle. In addition, the TTL of the seventh embodiment is shorter than the TTL of the first embodiment. The distortion aberration of the seventh embodiment is less than the distortion aberration of the first embodiment.

Figure 35A:
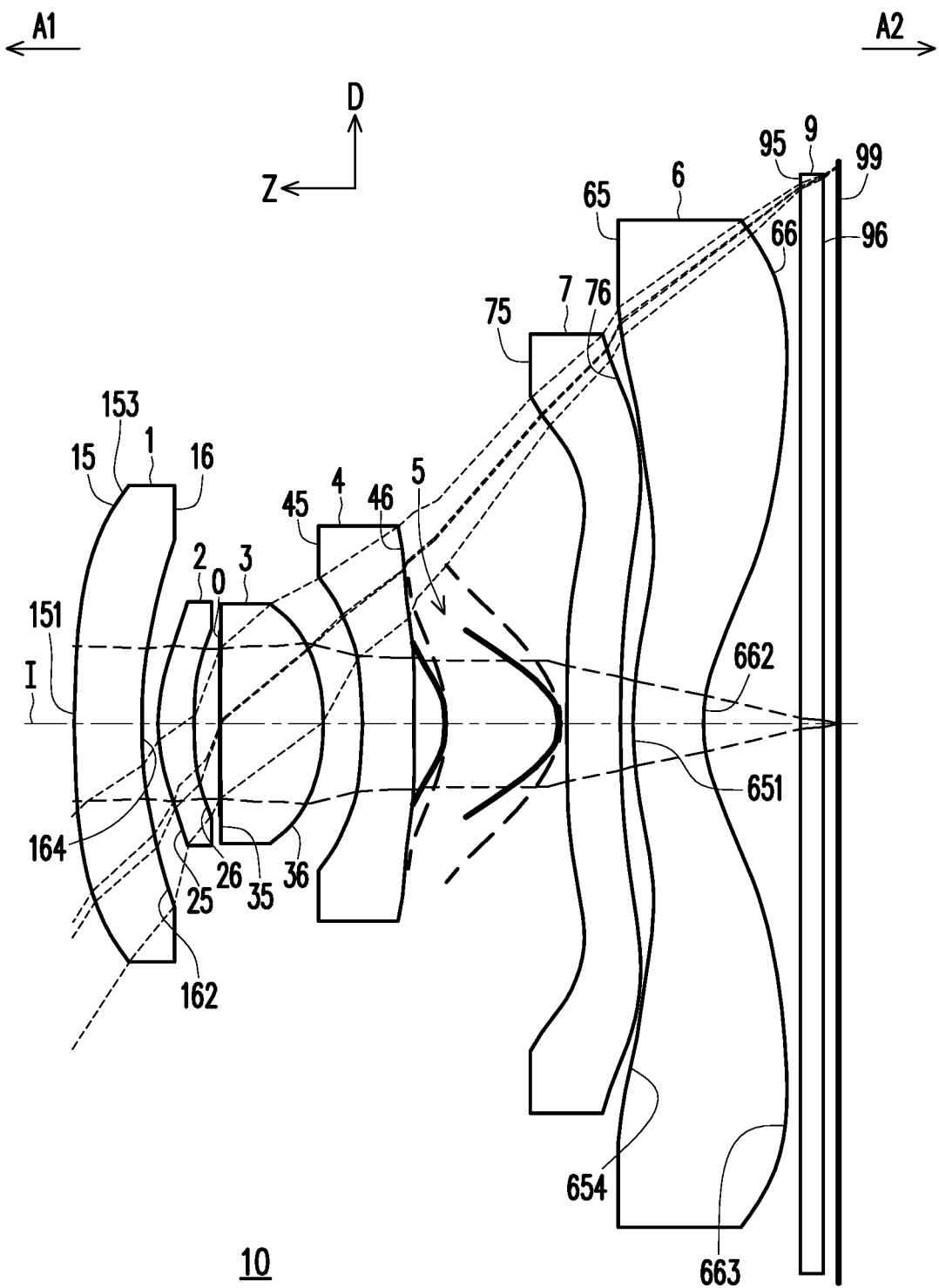
FIG. 35A is a schematic diagram of an optical imaging lens according to an eighth embodiment of the disclosure.
Figure 35B:
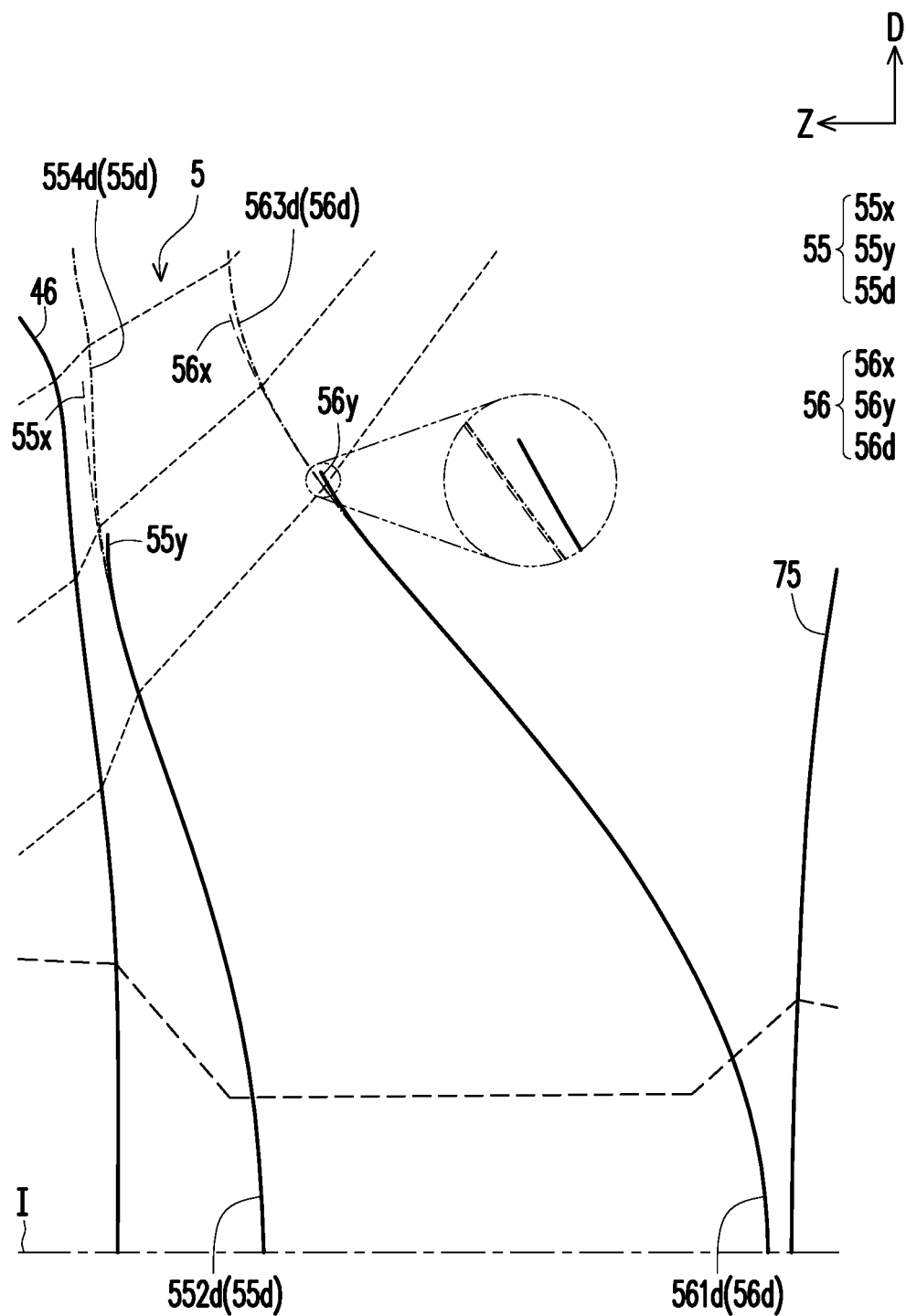
FIG. 35B is an enlarged radial cross-sectional view of the fifth lens element of FIG. 35A crossed by different planes.

FIG. 35A is a schematic diagram of an optical imaging lens according to an eighth embodiment of the disclosure. FIG. 35B is an enlarged radial cross-sectional view of the fifth lens element of FIG. 35A crossed by different planes. FIG. 35C is a schematic diagram of the appearance of the fifth lens element of FIG. 35A. FIG. 36A to FIG. 36D are diagrams of longitudinal spherical aberrations and astigmatic aberrations of the optical imaging lens according to the eighth embodiment. Referring to FIG. 35A first, the eighth embodiment of the optical imaging lens 10 of the disclosure is basically similar to the fifth embodiment. The difference in the surface structures of the lens element between the eighth embodiment and the fifth embodiment will be described in detail in the following paragraphs. For brevity, the reference numbers omitted are as that of shown in the fifth embodiment.

The first lens element 1 has negative refracting power. The first lens element 1 is made from a plastic material. An optical axis region 151 of the object-side surface 15 of the first lens element 1 is convex, and a periphery region 153 of the object-side surface 15 of the first lens element 1 is convex. An optical axis region 162 of the image-side surface 16 of the first lens element 1 is concave, and a periphery region 164 of the image-side surface 16 of the first lens element 1 is concave.

The fifth lens element 5 has positive refracting power. The fifth lens element 5 is made from a plastic material. The fifth lens element 5 is a free-form lens element, and the object-side surface 55 and the image-side surface 56 of the fifth lens element 5 are both free form surfaces. Referring to FIG. 35B, the intersection curves 55$x$, 56$x$ are the curves where the object-side surface 55 and image-side surface 56 are crossed by the first reference plane, the intersection curves 55$y$, 56$y$ are the curves where the object-side surface 55 and image-side surface 56 are crossed by the second reference plane, and the intersection curves 55$d$, 56$d$ are the curves where the object-side surface 55 and image-side surface 56 are crossed by the third reference plane. And these different intersection curves are all rotated about the optical axis I onto the third reference plane. It can be seen from FIG. 35A to FIG. 35B: the intersection curve 55$x$ of the object-side surface 55 of the fifth lens element 5 crossed by the first reference plane, the intersection curve 55$y$ of the object-side surface 55 of the fifth lens element 5 crossed by the second reference plane, and the intersection curve 55$d$ of the object-side surface 55 of the fifth lens element 5 crossed by the third reference plane do not coincide with each other; and the intersection curve 56$x$ of the image-side surface 56 of the fifth lens element 5 crossed by the first reference plane, the intersection curve 56$y$ of the image-side surface 56 of the fifth lens element 5 crossed by the second reference plane, and the intersection curve 56$d$ of the image-side surface 56 of the fifth lens element 5 crossed by the third reference plane do not coincide with each other. In the intersection curves 55$d$, 56$d$ of the object-side surface 55 and the image-side surface 56 crossed by the third reference plane, an optical axis region 552$d$ of the object-side surface 55 of the fifth lens element 5 is concave, and a periphery region 554$d$ of the object-side surface 55 of the fifth lens element 5 is concave. An optical axis region 561$d$ of the image-side surface 56 of the fifth lens element 5 is convex, and a periphery region 563$d$ of the image-side surface 56 of the fifth lens element 5 is convex.

The sixth lens element 6 has negative refracting power. The sixth lens element 6 is made from a plastic material. An optical axis region 651 of the object-side surface 65 of the sixth lens element 6 is convex, and a periphery region 654 of the object-side surface 65 of the sixth lens element 6 is concave. An optical axis region 662 of the image-side surface 66 of the sixth lens element 6 is concave, and a periphery region 663 of the image-side surface 66 of the sixth lens element 6 is convex. In the present embodiment, both the object-side surface 65 and the image-side surface 66 of the sixth lens element 6 are aspheric surfaces, but the disclosure is not limited thereto.

Detailed optical data of the optical imaging lens 10 in the eighth embodiment is shown in FIG. 37, and the optical imaging lens 10 in the eighth embodiment has an EFL of 3.281 mm, an HFOV of 57.735°, a Fno of 2.241, a TTL of 7.143 mm, and an image height of 5.233 mm.

Aspheric surface coefficients of the object-side surface 15 of the first lens element 1 to the image-side surface 46 of the fourth lens element 4 and the object-side surface 75 of the seventh lens element 7 to the image-side surface 66 of the sixth lens element 6 in the eighth embodiment in Formula (1) are shown in FIG. 38A and FIG. 38B. Coefficients of each term of the $X^m Y^n$ of the object-side surface 55 and the image-side surface 56 of the fifth lens element 5 in the eighth embodiment in Formula (2) are shown in FIG. 38C and FIG. 38D. FIG. 38E shows the corresponding Sag values of the fifth lens element of the eighth embodiment of the disclosure at the two selected coordinate values on the XY plane.

In addition, the relationships between important parameters of the optical imaging lens 10 in the eighth embodiment is shown in FIG. 49 and FIG. 50.

Longitudinal spherical aberrations of the eighth embodiment are shown in FIG. 36A, and imaging point deviations of off-axis rays at different heights are controlled within a range of ±0.012 mm. In two field curvature aberration diagrams of FIG. 36B and FIG. 36C, focal length variations of three representative wavelengths in an entire field of view fall within a range of ±0.12 mm. A distortion aberration diagram of FIG. 36D shows that distortion aberrations of the eighth embodiment are retained within a range of ±5%.

Based on the above, it can be seen that the HFOV in the eighth embodiment is greater than the HFOV in the first embodiment. Therefore, compared with the first embodiment, the eighth embodiment has a larger image receiving angle. In addition, the TTL of the eighth embodiment is shorter than the TTL of the first embodiment. The distortion aberration of the eighth embodiment is less than the distortion aberration of the first embodiment.

Figure 39A:
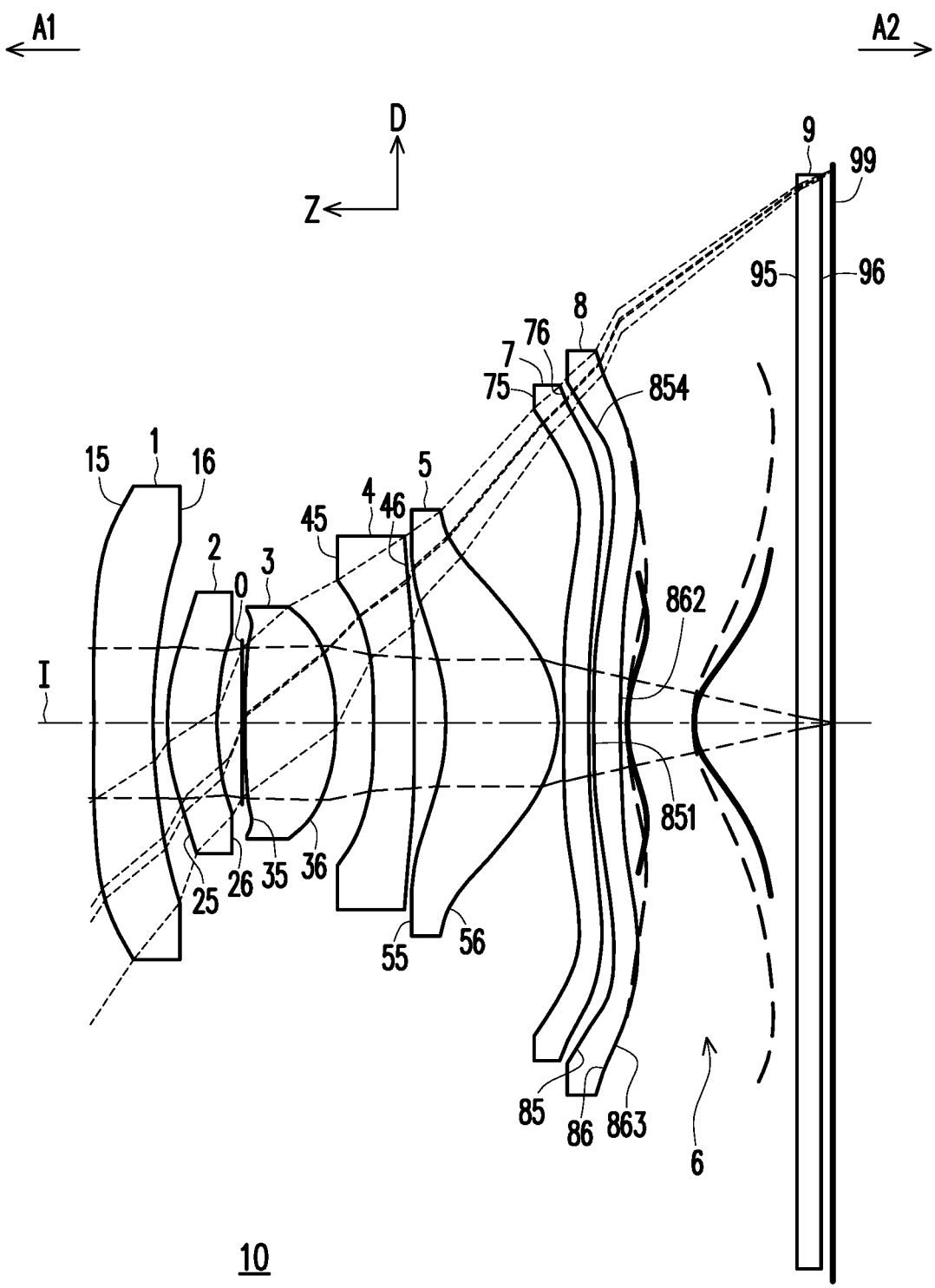
FIG. 39A is a schematic diagram of an optical imaging lens according to a ninth embodiment of the disclosure.
Figure 39B:
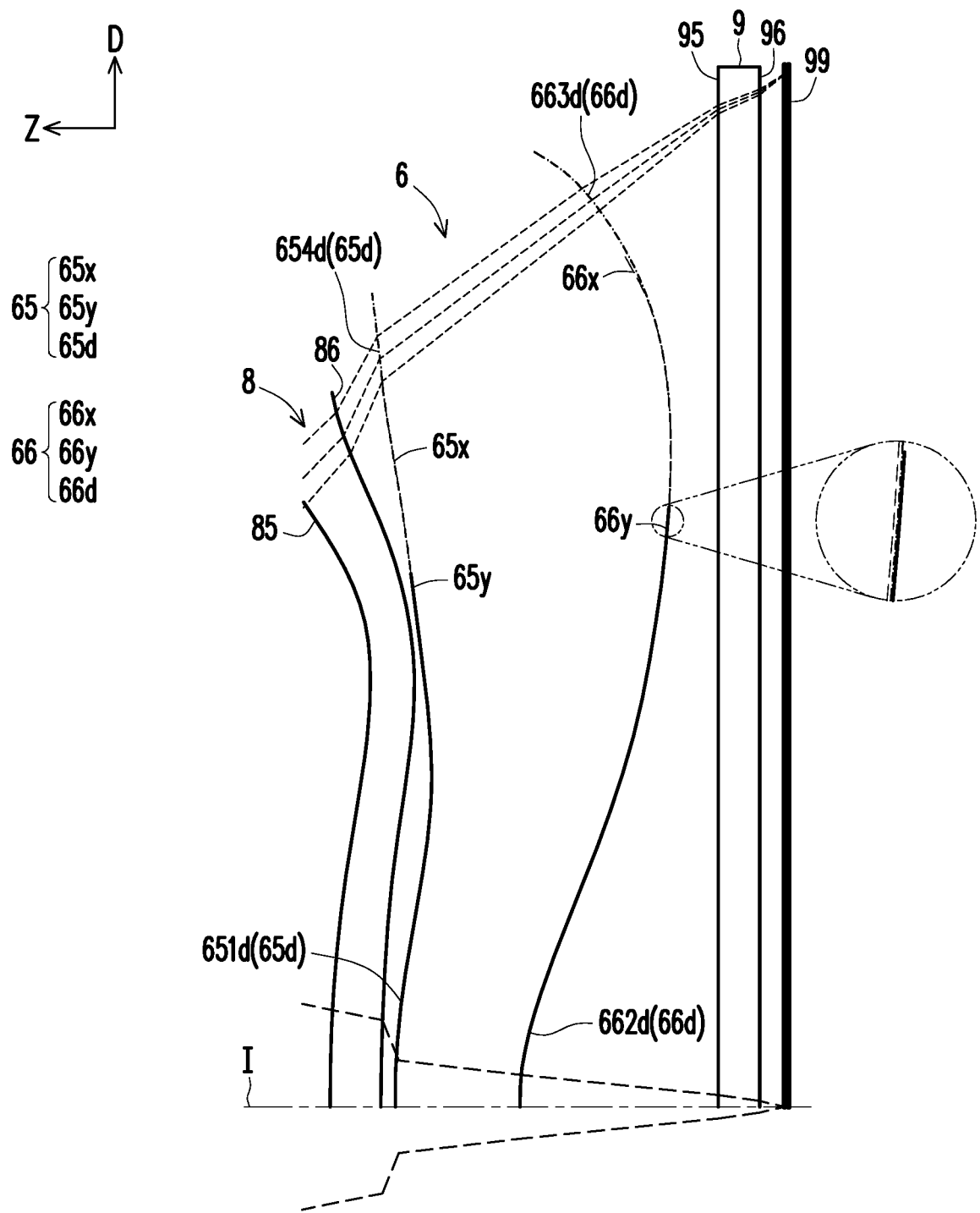
FIG. 39B is an enlarged radial cross-sectional view of the sixth lens element of FIG. 39A crossed by different planes.

FIG. 39A is a schematic diagram of an optical imaging lens according to a ninth embodiment of the disclosure. FIG. 39B is an enlarged radial cross-sectional view of the sixth lens element of FIG. 39A crossed by different planes. FIG. 39C is a schematic diagram of the appearance of the sixth lens element of FIG. 39A. FIG. 40A to FIG. 40D are diagrams of longitudinal spherical aberrations and astigmatic aberrations of the optical imaging lens according to the ninth embodiment. Referring to FIG. 39A, an optical imaging lens 10 in the ninth embodiment of the disclosure sequentially includes a first lens element 1, a second lens element 2, an aperture 0, a third lens element 3, a fourth lens element 4, a fifth lens element 5, a seventh lens element 7, an eighth lens element 8, a sixth lens element 6, and a filter 9 from an object side A1 to an image side A2 along an optical axis I of the optical imaging lens 10. After entering the optical imaging lens 10, rays emitted from a to-be-photographed object pass through the first lens element 1, the second lens element 2, the aperture 0, the third lens element 3, the fourth lens element 4, the fifth lens element 5, the seventh lens element 7, the eighth lens element 8, the sixth lens element 6, and the filter 9, and form an image on an image plane 99. The filter 9 is disposed between an image-side surface 66 of the sixth lens element 6 and the image plane 99. It should be noted that, the object side is a side facing the to-be-photographed object, and the image side is a side facing the image plane 99. In the present embodiment, the filter 9 is an IR cut filter.

In the present embodiment, the eighth lens element 8 of the optical imaging lens 10 includes an object-side surfaces 85 facing the object side and allowing imaging rays to pass through and an image-side surfaces 86 facing the image side and allowing the imaging rays to pass through.

The difference in the surface structures of the lens element between the ninth embodiment and the fifth embodiment will be described in detail in the following paragraphs. For brevity, the reference numbers omitted are as that of shown in the first embodiment.

The eighth lens element 8 has positive refracting power. The eighth lens element 8 is made from a plastic material. An optical axis region 851 of the object-side surface 85 of the eighth lens element 8 is convex, and a periphery region 854 of the object-side surface 85 of the eighth lens element 8 is concave. An optical axis region 862 of the image-side surface 86 of the eighth lens element 8 is concave, and a periphery region 863 of the image-side surface 86 of the eighth lens element 8 is convex. In the present embodiment, both the object-side surface 85 and the image-side surface 86 of the eighth lens element 8 are aspheric surfaces, but the disclosure is not limited thereto.

The sixth lens element 6 has negative refracting power. The sixth lens element 6 is made from a plastic material. The sixth lens element 6 is a free-form lens element, and the object-side surface 65 and the image-side surface 66 of the sixth lens element 6 are both free form surfaces. Referring to FIG. 39B, in the intersection curves 65d, 66d of the object-side surface 65 and the image-side surface 66 crossed by the third reference plane, an optical axis region 651d of the object-side surface 65 of the sixth lens element 6 is convex, and a periphery region 654d of the object-side surface 65 of the sixth lens element 6 is concave. An optical axis region 662d of the image-side surface 66 of the sixth lens element 6 is concave, and a periphery region 663d of the image-side surface 66 of the sixth lens element 6 is convex.

In the present embodiment, only the above eight lens elements of the optical imaging lens 10 have refracting power.

Detailed optical data of the optical imaging lens 10 in the ninth embodiment is shown in FIG. 41, and the optical imaging lens 10 in the ninth embodiment has an EFL of 3.227 mm, an HFOV of 57.041°, a Fno of 2.241, a TTL of 7.041 mm, and an image height of 5.233 mm.

Aspheric surface coefficients of the object-side surface 15 of the first lens element 1 to the image-side surface 56 of the fifth lens element 5 and the object-side surface 75 of the seventh lens element 7 to the image-side surface 86 of the eighth lens element 8 in the ninth embodiment in Formula (1) are shown in FIG. 42A and FIG. 42B. Coefficients of each term of the $X^m Y^n$ of the object-side surface 65 and the image-side surface 66 of the sixth lens element 6 in the ninth embodiment in Formula (2) are shown in FIG. 42C and FIG. 42D. FIG. 42E shows the corresponding Sag values of the sixth lens element of the ninth embodiment of the disclosure at the two selected coordinate values on the XY plane.

In addition, the relationships between important parameters of the optical imaging lens 10 in the ninth embodiment is shown in FIG. 49 and FIG. 50.

Where:

V8 is an Abbe number of the eighth lens element 8;

T8 is a thickness of the eighth lens element 8 along the optical axis I;

G78 is a distance from the image-side surface 76 of the seventh lens element 7 to the object-side surface 85 of the eighth lens element 8 along the optical axis I;

G86 is a distance from the image-side surface 86 of the eighth lens element 8 to the object-side surface 65 of the sixth lens element 6 along the optical axis I.

Longitudinal spherical aberrations of the ninth embodiment are shown in FIG. 40A, and imaging point deviations of off-axis rays at different heights are controlled within a range of ±0.018 mm. In two field curvature aberration diagrams of FIG. 40B and FIG. 40C, focal length variations of three representative wavelengths in an entire field of view fall within a range of ±0.05 mm. A distortion aberration diagram of FIG. 40D shows that distortion aberrations of the ninth embodiment are retained within a range of ±5%.

Based on the above, it can be seen that the HFOV in the ninth embodiment is greater than the HFOV in the first embodiment. Therefore, compared with the first embodiment, the ninth embodiment has a larger image receiving angle. In addition, the TTL of the ninth embodiment is shorter than the TTL of the first embodiment. The field curvature aberrations of the ninth embodiment are less than the field curvature aberrations of the first embodiment. The distortion aberration of the ninth embodiment is less than the distortion aberration of the first embodiment.

Figure 43A:
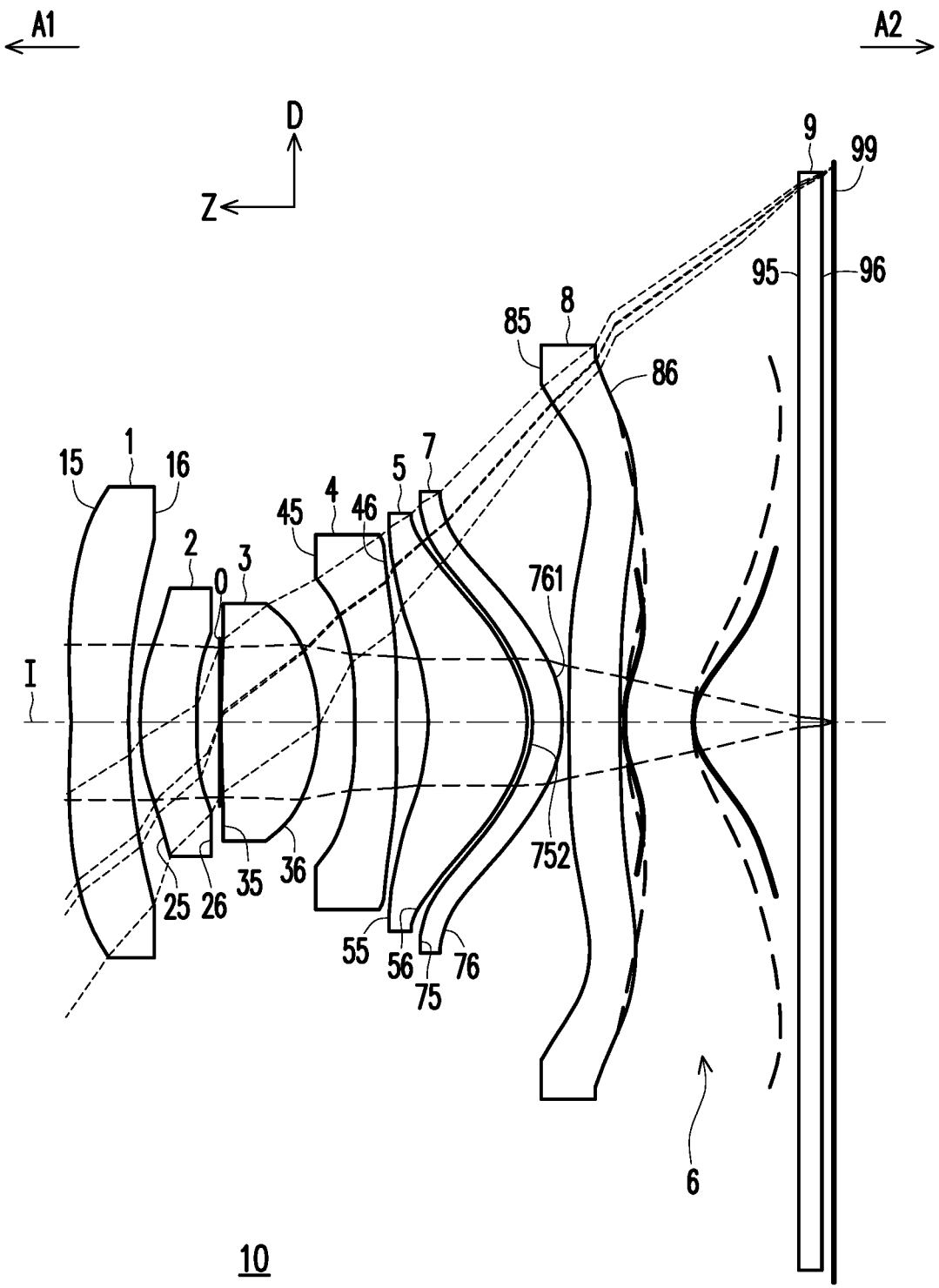
FIG. 43A is a schematic diagram of an optical imaging lens according to a tenth embodiment of the disclosure.
Figure 43B:
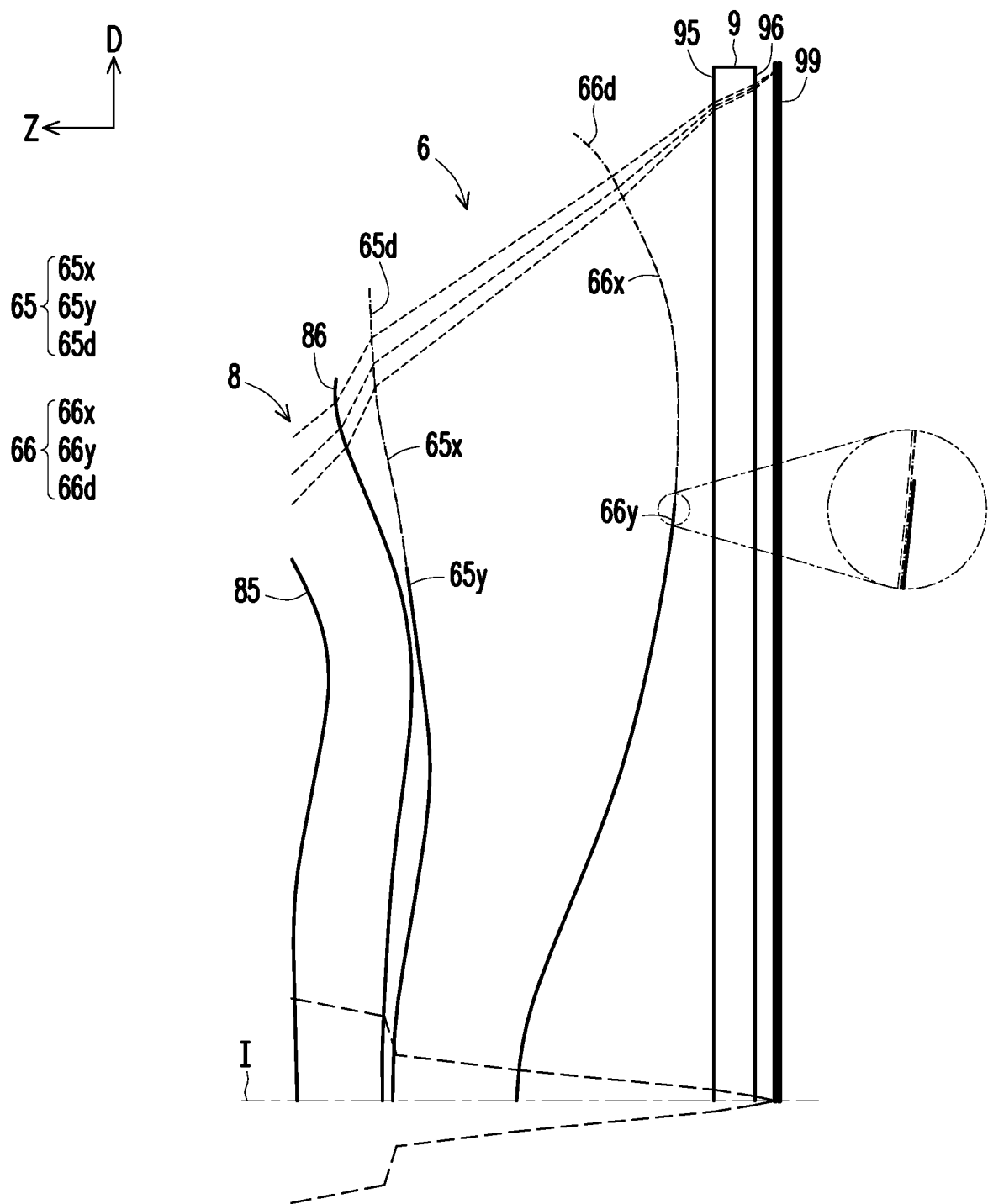
FIG. 43B is an enlarged radial cross-sectional view of the sixth lens element of FIG. 43A crossed by different planes.
Figure 43C:
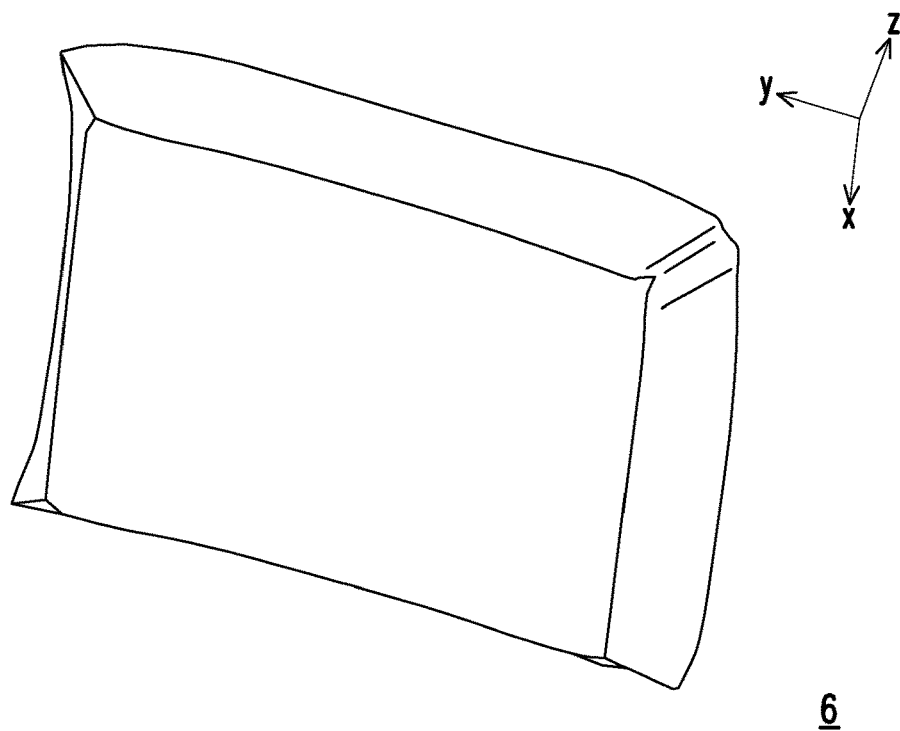
FIG. 43C is a schematic diagram of the appearance of the sixth lens element of FIG. 43A.

FIG. 43A is a schematic diagram of an optical imaging lens according to a tenth embodiment of the disclosure. FIG. 43B is an enlarged radial cross-sectional view of the sixth lens element of FIG. 43A crossed by different planes. FIG. 43C is a schematic diagram of the appearance of the sixth lens element of FIG. 43A. FIG. 44A to FIG. 44D are diagrams of longitudinal spherical aberrations and astigmatic aberrations of the optical imaging lens according to the tenth embodiment. Referring to FIG. 43A first, the tenth embodiment of the optical imaging lens 10 of the disclosure is basically similar to the ninth embodiment, which differs as follows: optical data, aspheric surface coefficients, and parameters between the lens elements 1, 2, 3, 4, 5, 6, 7, and 8 are different to some extent. In addition, in the present embodiment, the optical axis region 752 of the object-side surface 75 of the seventh lens element 7 is concave. An optical axis region 761 of the image-side surface 76 of the seventh lens element 7 is convex. Herein, it should be noted that, for clearly presenting the diagram, reference numbers of optical axis regions and periphery regions with surface structures similar to that of in the first embodiment are omitted in FIG. 43A.

Detailed optical data of the optical imaging lens 10 in the tenth embodiment is shown in FIG. 45, and the optical imaging lens 10 in the tenth embodiment has an EFL of 3.292 mm, an HFOV of 56.508°, a Fno of 2.241, a TTL of 7.162 mm, and an image height of 5.233 mm.

Aspheric surface coefficients of the object-side surface 15 of the first lens element 1 to the image-side surface 56 of the fifth lens element 5 and the object-side surface 75 of the seventh lens element 7 to the image-side surface 86 of the eighth lens element 8 in the tenth embodiment in Formula (1) are shown in FIG. 46A and FIG. 46B. Coefficients of each term of the $X^m Y^n$ of the object-side surface 65 and the image-side surface 66 of the sixth lens element 6 in the tenth embodiment in Formula (2) are shown in FIG. 46C and FIG. 46D. FIG. 46E shows the corresponding Sag values of the sixth lens element of the tenth embodiment of the disclosure at the two selected coordinate values on the XY plane.

In addition, the relationships between important parameters of the optical imaging lens 10 in the tenth embodiment is shown in FIG. 49 and FIG. 50.

Figures 44A, 44B, 44C, 44D:
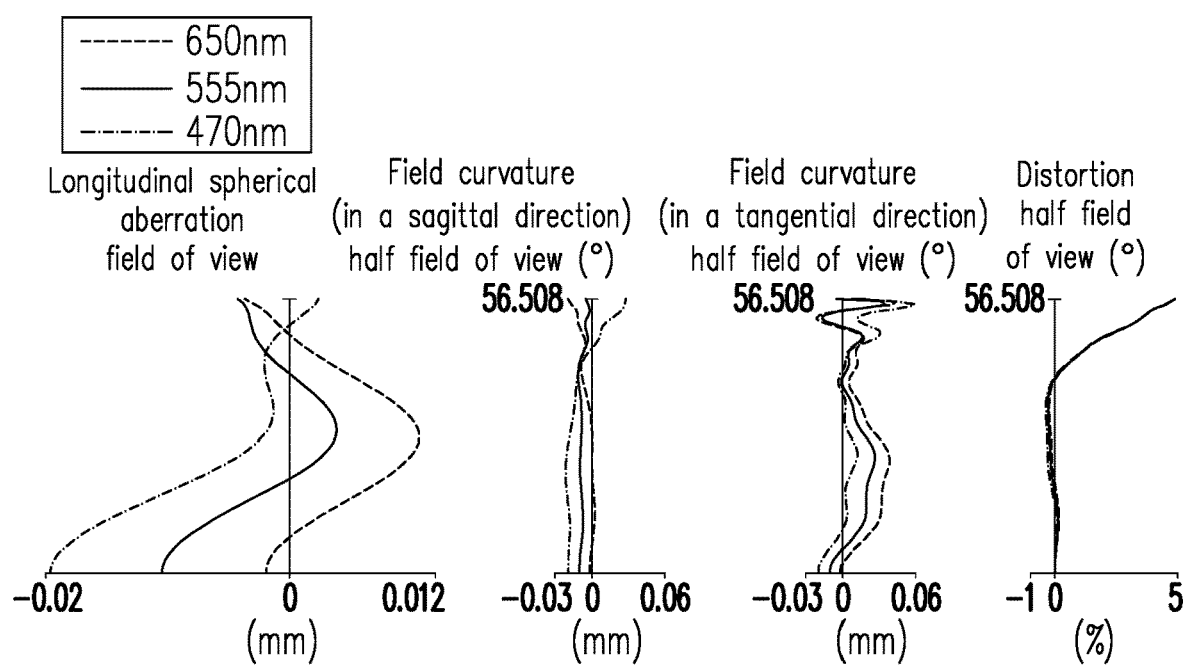
FIG. 44A to FIG. 44D are diagrams of longitudinal spherical aberrations and astigmatic aberrations of the optical imaging lens according to the tenth embodiment.

Longitudinal spherical aberrations of the tenth embodiment are shown in FIG. 44A, and imaging point deviations of off-axis rays at different heights are controlled within a range of ±0.02 mm. In two field curvature aberration diagrams of FIG. 44B and FIG. 44C, focal length variations of three representative wavelengths in an entire field of view fall within a range of ±0.06 mm. A distortion aberration diagram of FIG. 44D shows that distortion aberrations of the tenth embodiment are retained within a range of ±5%.

Based on the above, it can be seen that the HFOV in the tenth embodiment is greater than the HFOV in the first embodiment. Therefore, compared with the first embodiment, the tenth embodiment has a larger image receiving angle. In addition, the TTL of the tenth embodiment is shorter than the TTL of the first embodiment. The distortion aberration of the tenth embodiment is less than the distortion aberration of the first embodiment.

Based on the above, the optical imaging lens 10 in the embodiments of the disclosure can achieve the following effects and advantages:

1. The embodiments of the disclosure may provide an optical imaging lens with a large field of view angle while maintaining desired imaging quality that the absolute value of the distortion aberration is less than 6.000% through features of the lens element such as: the first lens element has negative refracting power or the fourth lens element has negative refracting power with at least one of the surfaces of the first lens element to the sixth lens element is a free form surface. The free form surface is crossed by a first reference plane at a first curve, wherein the first reference plane contains the optical axis; the free form surface is crossed by a second reference plane at a second curve, wherein the second reference plane contains the optical axis; and the first reference plane and the second reference plane intersect at the optical axis without overlapping, and when the first curve on the first reference plane is rotated onto the second reference plane with the optical axis as the rotation axis, the first curve and the second curve do not coincide. And when the optical imaging lens further satisfies the conditional expression ImgH/(T1+G12+T2)≥4.200, this may also contribute to shorten the system length of the optical imaging lens while maintaining a large image height. A preferable range is 4.200 ImgH/(T1+G12+T2)≥6.000.

2. The embodiments of the disclosure may provide an optical imaging lens with a large field of view angle while maintaining desired imaging quality that the absolute value of the distortion aberration is less than 6.000% through features of the lens element such as: the first lens element has negative refracting power with at least one of the surfaces of the first lens element to the sixth lens element is a free form surface. The free form surface is crossed by a first reference plane at a first curve, wherein the first reference plane contains the optical axis; the free form surface is crossed by a second reference plane at a second curve, wherein the second reference plane contains the optical axis; and the first reference plane and the second reference plane intersect at the optical axis without overlapping, and when the first curve on the first reference plane is rotated onto the second reference plane with the optical axis as the rotation axis, the first curve and the second curve do not coincide. And when the optical imaging lens further satisfies the conditional expression ImgH/(G12+T2+T4) ≥4.700, this may also contribute to shorten the system length of the optical imaging lens while maintaining a large image height. A preferable range is 4.700≤ImgH/(G12+T2+T4)≤8.000.

3. The optical imaging lens in the embodiments of the disclosure satisfies V1+V3+V4≤110.000, which contributes to reduce the chromatic aberration. A preferable range is 95.000≤V1+V3+V4≤110.000.

4. When the sixth lens element (the lens element in a first order from the image side to the object side) of the optical imaging lens is designed with free form surface, better imaging quality and more effective control of the field curvature in a sagittal direction and a tangential direction and the distortion aberration may be achieved.

5. In the above free form surfaces in the embodiments of the disclosure, when the first curve on the first reference plane is rotated onto the second reference plane with the optical axis as the rotation axis, the maximum difference between the first curve and the second curve in a direction along the optical axis is greater than 1.000 μm, which contributes to better reduce aberrations such as distortion rate. In the above free form surfaces in the embodiments of the disclosure, when the free form surfaces satisfy: the difference between the corresponding Sag values at the two selected coordinate values on the XY plane is greater than 1.000 μm, this may contribute to reduce distortion and other aberrations through designing different curvatures in different directions. After the free form surface is introduced into the lens element in the embodiments of the disclosure, more parameters may further be used for designing the surface structures of the lens element (i.e., the flexibility of design is increased) to facilitate the reducing of distortion aberration.

6. To reduce the TTL of the optical imaging lens and ensure imaging quality, reducing an air gap between lens elements or properly reducing a thickness of a lens element is also encompassed in the disclosure. However, considering the difficulty in manufacturing, the embodiments of the disclosure may satisfy the following conditional expression for preferable configurations.

The optical imaging lens 10 in the embodiments of the disclosure may satisfy the following conditional expression: (T5+T6)/T4≥3.600. A preferable range is 3.600≤(T5+T6)/T4≤11.000.

The optical imaging lens 10 in the embodiments of the disclosure may satisfy the following conditional expression: EFL/(G23+G45)≤7.500 A preferable range is 3.000≤EFL/(G23+G45)≤7.500.

The optical imaging lens 10 in the embodiments of the disclosure may satisfy the following conditional expression: (G23+T3)/T1≥1.500. A preferable range is 1.500≤(G23+T3)/T1≤2.700.

The optical imaging lens 10 in the embodiments of the disclosure may satisfy the following conditional expression: T6/(G12+G23)≥1.000. A preferable range is 1.000≤T6/(G12+G23)≤2.500.

The optical imaging lens 10 in the embodiments of the disclosure may satisfy the following conditional expression: (G45+T5)/G23≥5.000. A preferable range is 5.000≤(G45+T5)/G23≤6.700.

The optical imaging lens 10 in the embodiments of the disclosure may satisfy the following conditional expression: (AAG+BFL)/T3≤4.500. A preferable range is 2.500≤(AAG+BFL)/T3≤4.500.

The optical imaging lens 10 in the embodiments of the disclosure may satisfy the following conditional expression: ALT/(T1+G34)≥3.800. A preferable range is 3.800≤ALT/(T1+G34)≤7.500.

The optical imaging lens 10 in the embodiments of the disclosure may satisfy the following conditional expression: TL/(G56+T6)≤6.200. A preferable range is 3.600≤TL/(G56+T6)≤6.200.

The optical imaging lens 10 in the embodiments of the disclosure may satisfy the following conditional expression: (T3+T5)/G23≥5.900. A preferable range is 5.900≤(T3+T5)/G23≤9.800.

The optical imaging lens 10 in the embodiments of the disclosure may satisfy the following conditional expression: TTL/(AAG+T4)≥2.800. A preferable range is 2.800≤TTL/(AAG+T4)≤4.600.

The optical imaging lens 10 in the embodiments of the disclosure may satisfy the following conditional expression: (T1+T5)/(G12+T2)≥2.100. A preferable range is 2.100≤(T1+T5)/(G12+T2)≤6.700.

The optical imaging lens 10 in the embodiments of the disclosure may satisfy the following conditional expression: AAG/(T2+G34)≤3.000. A preferable range is 1.900≤AAG/(T2+G34)≤3.000.

The optical imaging lens 10 in the embodiments of the disclosure may satisfy the following conditional expression: T5/(G12+G23)≥2.400. A preferable range is 2.400≤T5/(G12+G23)≤4.200.

The optical imaging lens 10 in the embodiments of the disclosure may satisfy the following conditional expression: (T4+G45)/G23≥2.000. A preferable range is 2.000≤(T4+G45)/G23≤3.200.

The optical imaging lens 10 in the embodiments of the disclosure may satisfy the following conditional expression: ALT/(G45+G56)≤7.500. A preferable range is 2.800≤ALT/(G45+G56)≤7.500.

The optical imaging lens 10 in the embodiments of the disclosure may satisfy the following conditional expression: T5/T1≥1.700. A preferable range is 1.700≤T5/T1≤3.200.

7. The embodiments of the disclosure may provide an optical imaging lens with a large field of view angle while maintaining desired imaging quality that the absolute value of the distortion aberration is less than 6.000% through features of the lens element such as: the first lens element has negative refracting power or the fourth lens element has negative refracting power with at least one of the surfaces of the first lens element to the sixth lens element is a free form surface. The free form surface satisfies the following conditions: a perpendicular distance between the free form surface at X=a and Y=b, and a tangent plane at a vertex of the free form surface on the optical axis I constitutes a SagA. And a perpendicular distance between the free form surface at X=−b and Y=a, and a tangent plane at a vertex of the free form surface on the optical axis I constitutes a SagB. Where SagA is not equal to SagB. And when the optical imaging lens further satisfies the conditional expression ImgH/(T1+G12+T2)≥4.200, this may also contribute to shorten the system length of the optical imaging lens while maintaining a large image height. A preferable range is 4.200≤ImgH/(T1+G12+T2)≤6.000.

8. The embodiments of the disclosure may provide an optical imaging lens with a large field of view angle while maintaining desired imaging quality that the absolute value of the distortion aberration is less than 6.000% through features of the lens element such as: the first lens element has negative refracting power or the fourth lens element has negative refracting power with at least one of the surfaces of the first lens element to the sixth lens element is a free form surface. The free form surface satisfies the following conditions: a perpendicular distance between the free form surface at X=a and Y=b, and a tangent plane at a vertex of the free form surface on the optical axis I constitutes a SagA. And a perpendicular distance between the free form surface at X=−b and Y=a, and a tangent plane at a vertex of the free form surface on the optical axis I constitutes a SagB. Where SagA is not equal to SagB. And when the optical imaging lens further satisfies the conditional expression ImgH/(G12+T2+T4)≥4.700, this may also contribute to shorten the system length of the optical imaging lens while maintaining a large image height. A preferable range is 4.700≤ImgH/(G12+T2+T4)≤8.000.

9. When the number of the lens elements having refracting power in the optical imaging lens in the embodiments of the disclosure is six, seven or eight, better optical imaging quality may be achieved.

A numerical range including maximum and minimum values that is obtained based on combination and proportional relationships of the optical parameters disclosed in the embodiments of the disclosure may be implemented according thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through;

the first lens element is arranged to be a lens element in a first order from the object side to the image side and the first lens element has negative refracting power;

the second lens element is arranged to be a lens element in a second order from the object side to the image side;

the third lens element is arranged to be a lens element in a third order from the object side to the image side;

the fourth lens element is arranged to be a lens element in a fourth order from the object side to the image side;

the fifth lens element is arranged to be a lens element in a fifth order from the object side to the image side;

the sixth lens element is arranged to be a lens element in a first order from the image side to the object side;

wherein at least one of the object-side surfaces and the image-side surfaces of the first lens element to the sixth lens element is a free form surface, the free form surface is crossed by a first reference plane at a first curve, wherein the first reference plane contains the optical axis; the free form surface is crossed by a second reference plane at a second curve, wherein the second reference plane contains the optical axis; and the first reference plane and the second reference plane intersect at the optical axis without overlapping, and when the first curve on the first reference plane is rotated onto the second reference plane with the optical axis as the rotation axis, the first curve and the second curve do not coincide;

the optical imaging lens satisfies the following conditional expression: ImgH/(T1+G12+T2)≥4.200, wherein ImgH is an image height of the optical imaging lens, T1 is a thickness of the first lens element along the optical axis, G12 is a distance from the image-side surface of the first lens element to the object-side surface of the second lens element along the optical axis, and T2 is a thickness of the second lens element along the optical axis.

2. The optical imaging lens according to claim 1, wherein the optical imaging lens further satisfies the following conditional expression: (T5+T6)/T4≥3.600, wherein T5 is a thickness of the fifth lens element along the optical axis, T6 is a thickness of the sixth lens element along the optical axis, and T4 is a thickness of the fourth lens element along the optical axis.

3. The optical imaging lens according to claim 1, wherein the optical imaging lens further satisfies the following conditional expression: (G23+T3)/T1≥1.500, wherein G23 is a distance from the image-side surface of the second lens element to the object-side surface of the third lens element along the optical axis, and T3 is a thickness of the third lens element along the optical axis.

4. The optical imaging lens according to claim 1, wherein the optical imaging lens further satisfies the following conditional expression: ALT/(T1+G34)≥3.800, wherein ALT is a sum of thicknesses of the first lens element, the second lens element, the third lens element, the fourth lens element, the fifth lens element and the sixth lens element along the optical axis, and G34 is a distance from the image-side surface of the third lens element to the object-side surface of the fourth lens element along the optical axis.

5. The optical imaging lens according to claim 1, wherein the optical imaging lens further satisfies the following conditional expression: TTL/(AAG+T4)≥2.800, wherein TTL is a distance from the object-side surface of the first lens element to an image plane along the optical axis, AAG is a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, and a distance from the image-side surface of the fifth lens element to the object-side surface of the sixth lens element along the optical axis, and T4 is a thickness of the fourth lens element along the optical axis.

6. The optical imaging lens according to claim 1, wherein the optical imaging lens further satisfies the following conditional expression: (T1+T5)/(G12+T2)≥2.100, wherein T5 is a thickness of the fifth lens element along the optical axis.

7. The optical imaging lens according to claim 1, wherein the optical imaging lens further satisfies the following conditional expression: (T4+G45)/G23≥2.000, wherein T4 is a thickness of the fourth lens element along the optical axis, G45 is a distance from the image-side surface of the fourth lens element to the object-side surface of the fifth lens element along the optical axis, G23 is a distance from the image-side surface of the second lens element to the object-side surface of the third lens element along the optical axis.

8. An optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through;

the first lens element is arranged to be a lens element in a first order from the object side to the image side;

the second lens element is arranged to be a lens element in a second order from the object side to the image side;

the third lens element is arranged to be a lens element in a third order from the object side to the image side;

the fourth lens element is arranged to be a lens element in a fourth order from the object side to the image side and the fourth lens element has negative refracting power;

the fifth lens element is arranged to be a lens element in a fifth order from the object side to the image side;

the sixth lens element is arranged to be a lens element in a first order from the image side to the object side;

wherein at least one of the object-side surfaces and the image-side surfaces of the first lens element to the sixth lens element is a free form surface, the free form surface is crossed by a first reference plane at a first curve, wherein the first reference plane contains the optical axis; the free form surface is crossed by a second reference plane at a second curve, wherein the second reference plane contains the optical axis; and the first reference plane and the second reference plane intersect at the optical axis without overlapping, and when the first curve on the first reference plane is rotated onto the second reference plane with the optical axis as the rotation axis, the first curve and the second curve do not coincide;

the optical imaging lens satisfies the following conditional expression: ImgH/(T1+G12+T2)≥4.200, wherein ImgH is an image height of the optical imaging lens, T1 is a thickness of the first lens element along the optical axis, G12 is a distance from the image-side surface of the first lens element to the object-side surface of the second lens element along the optical axis, T2 is a thickness of the second lens element along the optical axis.

9. The optical imaging lens according to claim 8, wherein the optical imaging lens further satisfies the following conditional expression: T5/T1≥1.700, wherein T5 is a thickness of the fifth lens element along the optical axis.

10. The optical imaging lens according to claim 8, wherein the optical imaging lens further satisfies the following conditional expression: EFL/(G23+G45)≤7.500, wherein EFL is an effective focal length of the optical imaging lens, G23 is a distance from the image-side surface of the second lens element to the object-side surface of the third lens element along the optical axis, G45 is a distance from the image-side surface of the fourth lens element to the object-side surface of the fifth lens element along the optical axis.

11. The optical imaging lens according to claim 8, wherein when the first curve on the first reference plane is rotated onto the second reference plane with the optical axis as the rotation axis, the maximum difference between the first curve and the second curve in a direction along the optical axis is greater than 1.000 μm.

12. The optical imaging lens according to claim 8, wherein the optical imaging lens further satisfies the following conditional expression: $(G45+T5)/G23 \geq 5.000$, wherein G45 is a distance from the image-side surface of the fourth lens element to the object-side surface of the fifth lens element along the optical axis, T5 is a thickness of the fifth lens element along the optical axis, G23 is a distance from the image-side surface of the second lens element to the object-side surface of the third lens element along the optical axis.

13. The optical imaging lens according to claim 8, wherein the optical imaging lens further satisfies the following conditional expression: $(AAG+BFL)/T3 \leq 4.500$, wherein AAG is a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, and a distance from the image-side surface of the fifth lens element to the object-side surface of the sixth lens element along the optical axis, BFL is a distance from the image-side surface of the sixth lens element to an image plane along the optical axis, T3 is a thickness of the third lens element along the optical axis.

14. The optical imaging lens according to claim 8, wherein the optical imaging lens further satisfies the following conditional expression: $TL/(G56+T6) \leq 6.200$, wherein TL is a distance from the object-side surface of the first lens element to the image-side surface of the sixth lens element along the optical axis, G56 is a distance from the image-side surface of the fifth lens element to the object-side surface of the sixth lens element along the optical axis, T6 is a thickness of the sixth lens element along the optical axis.

15. An optical imaging lens, sequentially comprising a first lens element, a second lens element, a third lens element, a fourth lens element, a fifth lens element, and a sixth lens element from an object side to an image side along an optical axis, wherein each of the first lens element to the sixth lens element comprises an object-side surface facing the object side and allowing imaging rays to pass through and an image-side surface facing the image side and allowing the imaging rays to pass through;

the first lens element is arranged to be a lens element in a first order from the object side to the image side and the first lens element has negative refracting power;
the second lens element is arranged to be a lens element in a second order from the object side to the image side;
the third lens element is arranged to be a lens element in a third order from the object side to the image side;
the fourth lens element is arranged to be a lens element in a fourth order from the object side to the image side;
the fifth lens element is arranged to be a lens element in a fifth order from the object side to the image side;
the sixth lens element is arranged to be a lens element in a first order from the image side to the object side;
wherein at least one of the object-side surfaces and the image-side surfaces of the first lens element to the sixth lens element is a free form surface, the free form surface is crossed by a first reference plane at a first curve, wherein the first reference plane contains the optical axis; the free form surface is crossed by a second reference plane at a second curve, wherein the second reference plane contains the optical axis; and the first reference plane and the second reference plane intersect at the optical axis without overlapping, and when the first curve on the first reference plane is rotated onto the second reference plane with the optical axis as the rotation axis, the first curve and the second curve do not coincide;
the optical imaging lens satisfies the following conditional expression: $ImgH/(G12+T2+T4) \geq 4.700$ and $AAG/(T2+G34) \leq 3.000$, wherein ImgH is an image height of the optical imaging lens, G12 is a distance from the image-side surface of the first lens element to the object-side surface of the second lens element along the optical axis, T2 is a thickness of the second lens element along the optical axis, T4 is a thickness of the fourth lens element along the optical axis, AAG is a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, and a distance from the image-side surface of the fifth lens element to the object-side surface of the sixth lens element along the optical axis, G34 is a distance from the image-side surface of the third lens element to the object-side surface of the fourth lens element along the optical axis.

16. The optical imaging lens according to claim 15, wherein the optical imaging lens further satisfies the following conditional expression: $(T3+T5)/G23 \geq 5.900$, wherein T3 is a thickness of the third lens element along the optical axis, T5 is a thickness of the fifth lens element along the optical axis, G23 is a distance from the image-side surface of the second lens element to the object-side surface of the third lens element along the optical axis.

17. The optical imaging lens according to claim 15, wherein the optical imaging lens further satisfies the following conditional expression: $T5/(G12+G23) \geq 2.400$, wherein T5 is a thickness of the fifth lens element along the optical axis, G23 is a distance from the image-side surface of the second lens element to the object-side surface of the third lens element along the optical axis.

18. The optical imaging lens according to claim 15, wherein the optical imaging lens further satisfies the following conditional expression: $ALT/(G45+G56) \leq 7.500$, wherein ALT is a sum of thicknesses of the first lens element, the second lens element, the third lens element, the fourth lens element, the fifth lens element and the sixth lens element along the optical axis, G45 is a distance from the image-side surface of the fourth lens element to the object-side surface of the fifth lens element along the optical axis, G56 is a distance from the image-side surface of the fifth lens element to the object-side surface of the sixth lens element along the optical axis.

19. The optical imaging lens according to claim 15, wherein the optical imaging lens further satisfies the following conditional expression: $V1+V3+V4 \leq 110.000$, wherein V1 is an Abbe number of the first lens element, V3 is an Abbe number of the third lens element, V4 is an Abbe number of the fourth lens element.

* * * * *